(12) United States Patent
Putz et al.

(10) Patent No.: US 12,624,737 B2
(45) Date of Patent: May 12, 2026

(54) BRAKING DEVICE

(71) Applicant: STOP-IN-TIME GMBH, Bad Waltersdorf (AT)

(72) Inventors: Michael Putz, Sebersdorf (AT); Thomas Zipper, Vienna (AT)

(73) Assignee: Remmen Technologies, Port Perry (CA)

( * ) Notice: Subject to any disclaimer, the term of this patent is extended or adjusted under 35 U.S.C. 154(b) by 540 days.

(21) Appl. No.: 18/023,031

(22) PCT Filed: Aug. 24, 2021

(86) PCT No.: PCT/AT2021/060294
§ 371 (c)(1),
(2) Date: Feb. 24, 2023

(87) PCT Pub. No.: WO2022/040713
PCT Pub. Date: Mar. 3, 2022

(65) Prior Publication Data
US 2023/0392659 A1 Dec. 7, 2023

(30) Foreign Application Priority Data

| | | |
|---|---|---|
| Aug. 24, 2020 | (AT) | A 60260/2020 |
| Dec. 8, 2020 | (AT) | A 60363/2020 |
| Jul. 14, 2021 | (AT) | A 60191/2021 |

(51) Int. Cl.
*F16D 65/18* (2006.01)
*F16D 65/38* (2006.01)
(Continued)

(52) U.S. Cl.
CPC ............ *F16D 65/18* (2013.01); *F16D 65/38* (2013.01); *F16D 66/00* (2013.01);
(Continued)

(58) Field of Classification Search
CPC .................... F16D 65/16; F16D 65/18; F16D 65/38–2065/386; F16D 66/00–2066/005;
(Continued)

(56) References Cited

U.S. PATENT DOCUMENTS 6,279,691 B1 * 8/2001 Takahashi ............. F16D 65/567
188/71.9
2004/0026184 A1 2/2004 Baumann et al.
(Continued)

FOREIGN PATENT DOCUMENTS

CN 1207798 A 2/1999
EP 1775494 A1 4/2007
(Continued)

*Primary Examiner* — David R Morris
(74) *Attorney, Agent, or Firm* — Miller Canfield

(57) ABSTRACT

A brake device and a machine including the brake device. The brake device includes an actuator, a transmission, an expander device, a brake lining and a frictional surface. The actuator moves in a limited actuator actuation region, and in at least part of the actuator actuation region, the actuator turns the expander device about at least one fulcrum via the transmission. In at least part of the actuator actuation region, for the purpose of braking, the actuator presses the brake lining, via the expander device, in the direction of and onto the frictional surface to generate a pressing force and a braking torque resulting therefrom. The transmission has a non-linear transmission ratio that is not constant over at least part of the actuator actuation region. The transmission turns the expander device in accordance with the non-linearity.

15 Claims, 20 Drawing Sheets

(51) Int. Cl.

| | |
|---|---|
| *F16D 66/00* | (2006.01) |
| *F16D 121/24* | (2012.01) |
| *F16D 121/26* | (2012.01) |
| *F16D 125/30* | (2012.01) |
| *F16D 125/36* | (2012.01) |
| *F16D 125/58* | (2012.01) |
| *F16D 125/64* | (2012.01) |

(52) U.S. Cl.

CPC .. *F16D 2065/386* (2013.01); *F16D 2066/001* (2013.01); *F16D 2066/005* (2013.01); *F16D 2121/24* (2013.01); *F16D 2121/26* (2013.01); *F16D 2125/30* (2013.01); *F16D 2125/36* (2013.01); *F16D 2125/582* (2013.01); *F16D 2125/64* (2013.01)

(58) Field of Classification Search

CPC ............. F16D 2121/24; F16D 2121/26; F16D 2125/30; F16D 2125/36; F16D 2125/582; F16D 2125/64

See application file for complete search history.

(56) References Cited

U.S. PATENT DOCUMENTS

| | | | | |
|---|---|---|---|---|
| 2007/0273198 A1* | 11/2007 | Tonoli | ..................... | F16D 65/18 |
| | | | | 303/3 |
| 2009/0057074 A1* | 3/2009 | Tsuruta | ................... | F16D 65/14 |
| | | | | 188/71.8 |
| 2015/0377309 A1* | 12/2015 | Putz | ..................... | F16D 55/225 |
| | | | | 188/156 |
| 2020/0062230 A1 | 2/2020 | Henning et al. | | |
| 2020/0284311 A1* | 9/2020 | Henning | .............. | F16D 66/023 |

FOREIGN PATENT DOCUMENTS

| | | | | |
|---|---|---|---|---|
| EP | 1798123 | | 6/2007 | |
| EP | 2574817 | A1 * | 4/2013 | ............ F16D 65/18 |
| EP | 3064797 | A1 | 9/2016 | |
| WO | 2019068794 | A1 | 4/2019 | |
| WO | 2019076426 | A1 | 4/2019 | |
| WO | 2020058284 | A1 | 3/2020 | |

* cited by examiner

057

057

057

033

032

0321

0322

0323

032

0322

0321

0323

0324

0325

03241

0325

032221

Fig. 13C
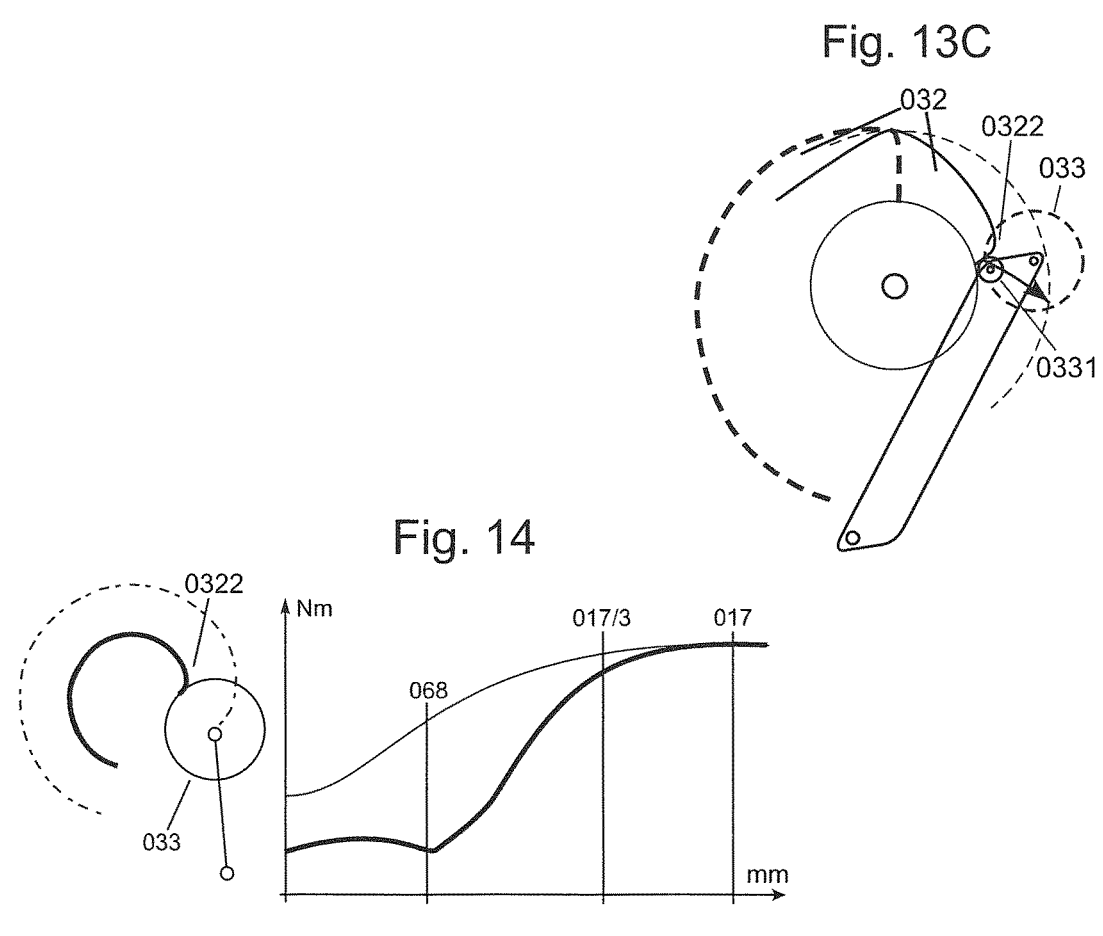
Fig. 14
Fig. 15
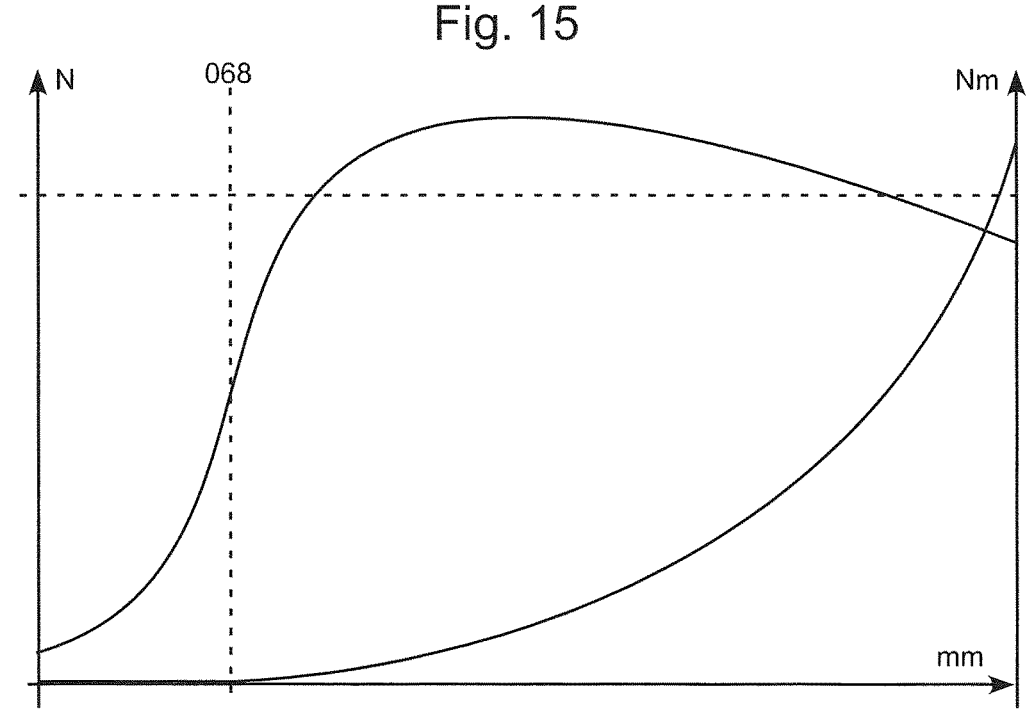

Fig. 18
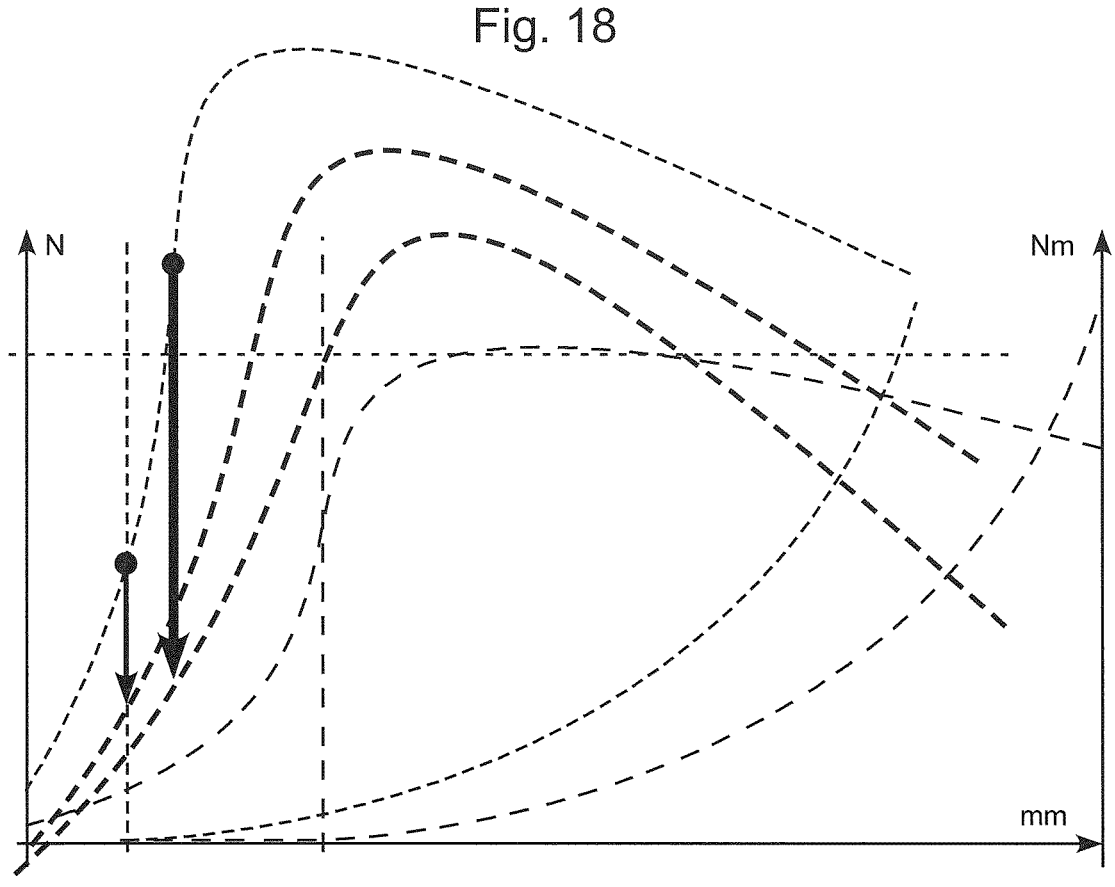
Fig. 19A
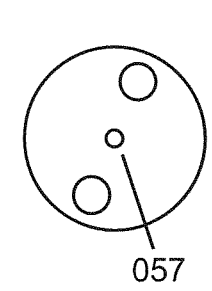
057
Fig. 19B
057
Fig. 19C
057

Fig. 24
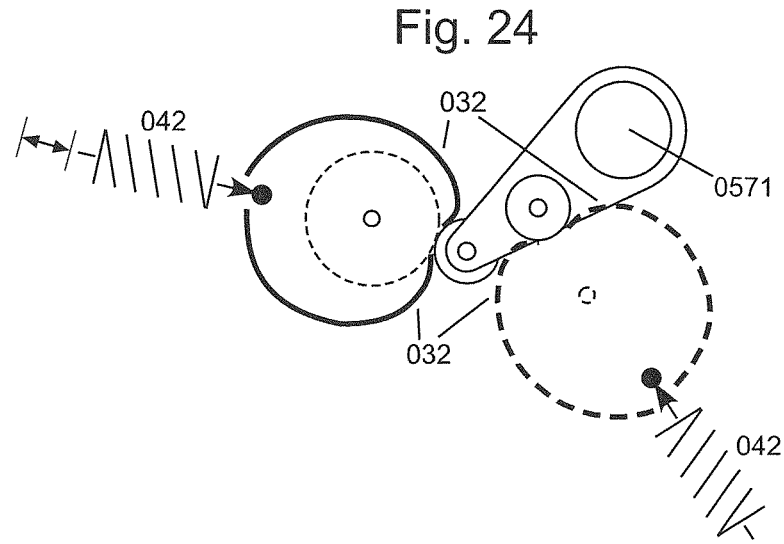
Fig. 25
Fig. 26
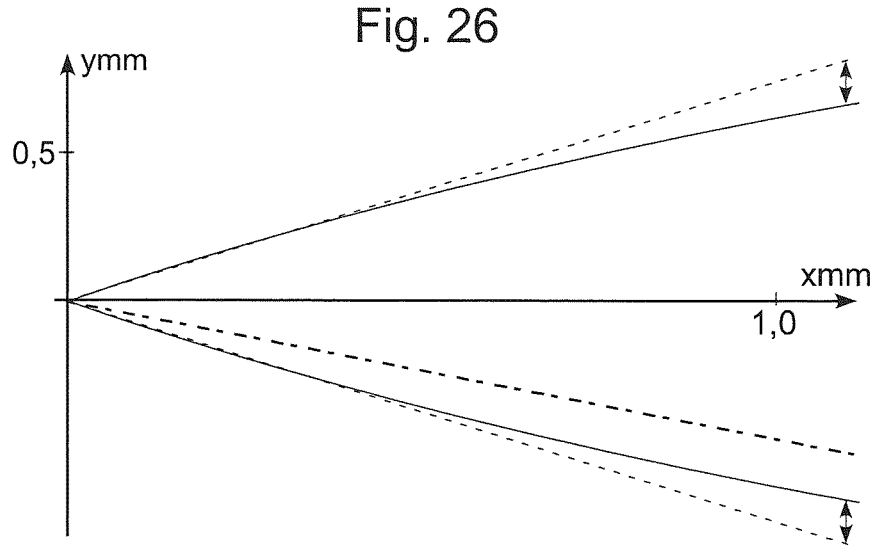

Fig. 33A
Fig. 33B
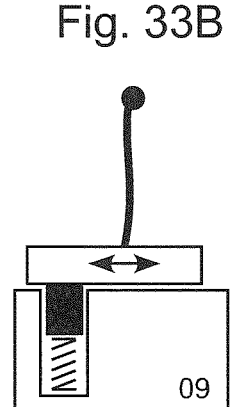
Fig. 34
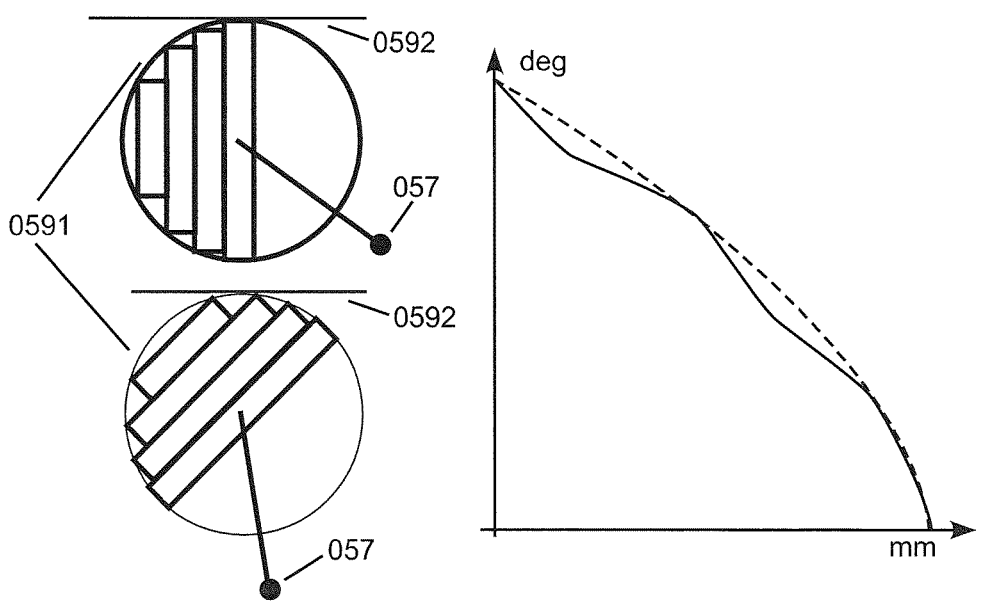

BRAKING DEVICE

TECHNICAL FIELD

The invention relates to a braking device and a machine in accordance with to the general terms of the independent patent claims.

BACKGROUND OF THE INVENTION

Various types of brakes with spreading devices are known from the status of technology. For example, brakes are known in which the pressed-on parts, especially the brake lining, are guided along a straight line and in which the spreading device indicates a special type of geometry which, as a result, when it rotates, the spreading device rolls onto the pressed-on parts. The disadvantage of such types of brakes is, however, that the required geometry of the spreading device indicates not only mechanical disadvantages but also production-related technical disadvantages and therefore cannot be produced efficiently and cost effectively. Furthermore, the durability of such types of spreading devices is limited due to the special geometry which is involved.

SUMMARY OF THE INVENTION

The task of the invention is to overcome the disadvantages creates by this status of technology. In particular, it is a task for the invention to create a braking device equipped with a spreading device which enables efficient operation of the braking device, one which possesses a long service life and can be produced simply and efficiently. Furthermore, it can be a task of the invention to provide a braking device which enables the utilization a spreading device with a conventional geometry.

The task according to the invention will be solved in particular by the features of the independent patent claims.

In particular, the invention relates to a braking device, whereby the braking device comprises an actuator, in particular an electric actuator, a transmission unit, a spreading device, a brake lining and a friction surface.

Preferably, it is to be provided that the actuator moves in a limited actuator operating range.

Preferably, it is to be provided that the actuator is able to rotate and/or move the spreading device about at least one rotational point in at least one part of its actuator operating range via the transmission unit.

Preferably, it is to be provided that the actuator is able to press the brake lining in the direction of and/or against the friction surface via the spreading device in at least a part of its actuator operating range.

Preferably, it is to be provided that the actuator is able to press the brake lining in the direction of and/or against the friction surface and therefore generate a press-on force as well as a resulting braking torque via the spreading device for braking in at least a part of its actuator operating range.

In other words, the spreading device can therefore be moved or rotated by the actuator in such a way that the spreading device presses the brake lining in the direction of and against the friction surface for generating a press-on force as well as a resulting braking torque in at least a part of the actuator actuation area for braking.

A lining stroke can be executed by this rotation and/or movement of the spreading device. Within the context of the present invention, a lining stroke can be understood to mean that the brake lining is selectively moved, in particular in the direction of the friction surface. In other words, a lining stroke can also be considered to be relevant to braking action.

Within the context of the present invention, a lining stroke which is relevant to the braking effect can be understood as a lining stroke by which the brake lining is moved, in particular in the direction of the friction surface, in particular the friction surface.

If applicable, it is provided that the actuator effects a lining stroke, in particular one which is relevant to the braking effect, at least in one part of its actuator actuation range via the transmission unit.

Preferably, it is to be provided that the transmission unit indicates a non-linearity i.e. a transference ratio which is not constant over at least one part of the actuator operating range.

Preferably, it is to be provided that the transmission unit rotates and/or moves the spreading device according to the non-linearity.

The spreading device can be rotated and/or moved by the actuator as relative to the brake lining, parts of the brake device pressing on the brake lining, the actuator and/or the, in particular fixed, transmission unit parts.

The braking device can also be created as an electromechanical unit.

If applicable, it is provided that when the actuator is moved, then the transmission unit and, if applicable, the spreading device will be actuated. Subsequently, it can be provided that the actuation of the transmission unit and, if applicable, of the spreading device will cause a lining stroke to be executed and, in particular, the brake lining will execute a movement.

If applicable, the transmission unit or at least a part of the transmission unit is to be designed or configured to be non-linear. In particular, the transmission unit comprises at least one non-linear feature.

The transmission unit can comprise a plurality of transmission unit parts. In particular, the transmission unit can comprise at least one gear train and/or at least one transmission unit, which in particular comprises at least one non-linear transference ratio which will vary over the actuation path. Furthermore, the transmission unit can comprise at least one gear ratio for driving or not driving various parts.

If applicable, the movement of the actuator can be non-linearly related to the resulting movement of the brake lining, particularly the lining stroke. If applicable, the movement of the actuator in some areas can also not generate any lining stroke.

Within the context of the present invention, the terms "no lining stroke" and/or "lining stroke-free" can be understood to mean that no significant alteration in the braking effect and/or bridging the air gap will be executed in the process, but if applicable, for example, movements within the scope of, for example, production tolerances or mechanical peculiarities are not therefore excluded. In particular, it can be provided that at the beginning and at the end of the limited actuator operating range, i.e. in particular at the beginning and at the end of the actuator movement range, the movement of the actuator does not cause any lining stroke and/or is free of lining stroke.

If applicable, it is provided that the transmission unit will be adapted in areas based on different requirements for the braking device, such as moderate deceleration, full braking, continuous braking and/or the like, as well as internal functionalities. In other words, the transmission unit and in particular the non-linearities, can be optimized to the operating conditions which will occur during the operation of an electromechanical braking device.

If applicable, it is provided that this adaptation and/or optimization of the transmission unit is to be executed with the overriding objective of achieving the highest possible functional safety of the braking device and for the braking system as a whole. In other words, this adaptation and/or optimization of the transmission unit will not be executed on the basis of individual components, such as for example the electric actuator.

If applicable, it is provided that at least two areas of the transmission unit with, in particular, brake effect-relevant, lining stroke will be optimized and/or adapted differently.

If applicable, it is provided that at least two areas of the transmission unit with, in particular, brake effect-relevant, lining stroke will indicate two different non-linearities.

Within the context of the present invention, the term "conveying device or transporting device" can be understood to mean any device and/or machine with which it is possible to drive and/or with which it is possible to transport people and/or loads while driving.

If applicable, it is provided that the transference for the transmission unit will be selected and/or designed in such a way that at least one section with a non-linearity is created, provided and/or arranged along the actuator operating range.

If applicable, it is provided that the transference for the transmission unit will be selected and/or designed in such a way that two, three, four, five, six, seven, eight, nine, ten or more subsections with differently acting non-linearities are created, provided and/or arranged along the actuator operating range.

Within the context of the present invention, a reference to brake can therefore be understood to mean the braking device.

Within the context of the present invention, a reference to rotated contact surface can therefore be understood to mean a contact surface of the spreading device, wherein the spreading device and the rotated contact surface can rotate. Furthermore, within the context of the present invention, contact pressure surface can also be understood to include the rotated contact pressure surface.

Within the context of the present invention, a reference to non-rotated contact surface can therefore be understood to mean a contact surface of a component of the braking devices which is different from the spreading device. Furthermore, within the context of the present invention, a reference to abutment surface can also be understood to mean the non-rotated contact surface.

Within the context of the present invention, a spreading member can therefore be understood to mean the spreading device, in particular also together with the at least one rotated contact surface and/or with the at least one non-rotated contact surface.

Within the context of the present invention, a reference to the actuator rotating area can therefore be understood to mean the actuator operating range.

Within the context of the present invention, EMB can be understood to mean the, in particular electromechanical braking device and/or the, in particular electromechanical brake.

If applicable, it is provided that the spreading device is at least partially surrounded by the braking device, in particular the transmission unit, so that the spreading device cannot fall out of the braking device, where appropriate.

If applicable, it is provided that the spreading device is to be loosely arranged in the braking device.

If applicable, it is provided that the spreading device is to be arranged in the braking device.

If applicable, it is provided that in at least one part of the actuator operating range, and in particular in one first actuation point of the actuator or first actuation area of the actuator, that the spreading device executes a relative movement with respect to the brake lining, parts of the brake device which are pressing against the brake lining, the actuator and/or the, in particular fixed, transmission unit parts.

If applicable, it is provided that the relative movement of the spreading device will optionally, in particular exclusively, be executed along or in the plane of rotation of the spreading device.

If applicable, it is provided that the relative movement of the spreading device will optionally, in particular exclusively, be executed as substantially normal to the direction of rotation, in particular the pressing direction of the spreading device. If applicable, it is provided that the relative movement of the spreading device will optionally, in particular exclusively, be executed in at least one direction of extension, preferably in the longitudinal direction and/or transverse direction of the spreading device.

If applicable, it is provided that the relative movement of the spreading device will optionally be executed in all directions, in particular in all directions of extension of the spreading device.

The minimum of one rotated and the at least one non-rotated rolling surface, in particular one rotated and the at least one non-rotated pressing surface, are permitted to have any initial position e.g. due to weight or due to e.g. vibrations also randomly. They can also be frictionally engaged, or substantially frictionally engaged, also with no appreciable or appreciable relative movement in the transverse direction. The frictional engagement can also be overloaded and a sliding compensation movement can therefore occur between the at least one rotated and the at least one non-rotated rolling surface, and a mixed form between sliding and rolling can also occur in such cases. An additional relative movement in the transverse direction can also occur and vibrations can be superimposed on the movements and/or the relative movement in the transverse direction can be utilized up in the freedom of movement and therefore cause sliding of the at least one rotated rolling surface on the non-rotated rolling surface.

The movement of rotated rolling surfaces and non-rotated rolling surfaces can also additionally follow geometrical alterations or deformations.

If applicable, it is provided that the spreading device will comprise at least one, in particular rotated, contact surface.

If applicable, it is provided that the braking device, in particular the transmission unit and/or parts of the braking device which will press against the brake lining, comprises at least one abutment surface, in particular a non-rotated contact surface.

If applicable, it is provided that the at least one contact pressure surface presses against the at least one abutment surface in at least a part of the actuator operating range, whereby the spreading device optionally rotates and/or moves.

If applicable, it is provided that the at least one rotated contact surface, in particular the contact surface, is pressed against the at least one non-rotated contact surface, in particular the abutment surface, in at least part of the actuator operating range by rotation of the spreading device and, if necessary, a press-on force is generated between the pairs of contact surfaces which are therefore present.

If applicable, it is provided that the contact pressure surface, in particular the rotated contact pressure surface, and/or the abutment surface, in particular the non-rotated contact pressure surface, are to be configured in such a way that these surfaces execute a relative movement, in particular a sliding and/or rolling movement with respect to one another, in particular during the rotation and/or movement of the spreading device.

If applicable, it is provided that the braking device is designed in such a way that the brake lining follows a path of movement which will be deviating from a straight line during pressing on.

If applicable, it is provided that the contact pressure surface and the abutment surface are to be designed in such a way that the brake lining follows a path of movement which will be deviating from a straight line during pressing on.

This path of movement will be defined, if necessary, by the interaction of the transmission unit and/or the spreading device with the brake lining.

Within the context of the present invention, a rolling relative motion can therefore be understood to mean that the rotated contact surface executes a rolling motion on the non-rotated contact surface like a wheel which is positioned on a substrate. Due to the frictional connection and/or the static friction, the surfaces can therefore have essentially the same surface speeds, as a result of which the rolling motion is considered to be particularly low-slip in this case. If the frictional and/or static friction is exceeded, then the rolling can be altered into a sliding motion with reduced slip, possibly up to the behavior of a locked wheel on a surface, which is referred to as sliding.

In between, transition areas are also possible. Transition areas are also possible in between these. The ideal theoretical objective, especially when, as in the case of the braking device, high forces are present on small parts and therefore high surface pressure are also involved, would be to achieve a geometry which permits essentially, especially exclusively, a rolling motion. In other words, the spreading device can be designed in such a way that the geometry of the spreading device provides for rolling motion wherever possible, even when a rectilinear guide directs the movement of the pressed-on part.

In the case of the braking device, this geometry, which actually makes the so-called ideal rolling behavior possible, can be pursued only to a limited extent or not at all in favor of other advantages, such as the most favorable manufacturability possible, use of well-rounded parts of suitable surface hardness and surface quality, avoidance of unfavorable production or manufacturing methods such as chamfering of curves etc. A straight-line or other guidance can also be dispensed with in the braking device if applicable and a compensating movement transverse to the pressing direction can be permitted instead, with which the unrolling condition can be demanded due to the lack of forced guidance.

The movements which are affected by the spreading device are, if necessary, on the one hand those intended in the pressing direction and, on the other hand, those with a different movement component, which can also be essentially normal (also referred to here as transverse) to the pressing direction, although spatially preferably in the plane of the spreading mechanism rotation. Within the context of the present invention, transverse can therefore also be referred to as high, according to "up" in figures and a frequent installation position for brakes. A deviation from the intended press-on direction is also referred to as a height error, if applicable. The transverse movement can be prevented by a guide e.g. a straight-line guide. However, it can also be made possible e.g., by creating play in the guide or by foregoing an effective guide. The transverse movement can also occur as compensated with a gliding movement instead of rolling off, especially when a guide forces this movement.

These movements can be caused by the movement of the spreading device but can also occur independently of it, for example, when they are triggered by vibrations. Even in the case of a rolling movement, the contact point (point, line, surface area) between the rotated contact surface and the non-rotated contact surface can move transverse to the contact direction in the contact pressure process.

If applicable, it is provided that the actuator is to rotate the spreading device about a first rotational point via the transmission unit in at least one portion of its actuator actuation range, particularly in a second actuation point of the actuator or second actuation range of the actuator.

If applicable, it is provided that the actuator, in at least a part of its actuator actuation range, in particular in an additional actuation point of the actuator or additional actuation range of the actuator, rotates the spreading device via the transmission unit around an additional pivot point or rotational point.

If applicable, it is provided that the position of at least two rotational points deviates from each other and/or differs.

If applicable, it is provided that the position of the rotational points is limited by the design of the braking device.

If applicable, it is provided that the braking device is designed in such a way that the rotational point displacement of at least two rotational points of the spreading device is opposed by an elastic resistance, in particular a resistance device.

If applicable, it is provided that at least one rotational point is supported and/or freely movable, in particular unsupported.

In the context of the invention, a supported rotational point can therefore be understood to mean that the supported rotational point is arranged as stationary, in particular without a degree of freedom of movement, with respect to the brake lining, the parts of the braking device pressing against the brake lining, the actuator and/or the, in particular fixed, transmission unit parts.

Within the context of the invention, an unmounted rotational point can therefore be understood to mean that the unmounted rotational point is freely movable as relative to the brake lining, the parts of the braking device which are pressing on the brake lining, the actuator and/or the, in particular fixed, transmission parts, and in particular has at least one freedom of movement relative to these parts.

If applicable, it is provided that in at least one part of the actuator operating range, and in particular in a third actuation point of the actuator or third actuation range of the actuator, that the spreading device executes a relative movement with respect to the brake lining, the parts of the brake device which are pressing against the brake lining, the actuator and/or the, in particular fixed, transmission unit parts.

If applicable, it is provided that the spreading device comprises at least two spreading device parts, whereby at least one spreading device part is optionally a pin, a peg, and/or a prefabricated part.

If applicable, it is provided that the at least one contact pressure surface of the spreading device is at least partially created from a spreading device part.

If applicable, it is provided that the at least one contact pressure surface of the spreading device is arranged at least partially on one spreading device part.

If applicable, it is provided that the spreading device parts are connected to each other, in particular connected as frictionally, materially, pressed on and/or welded.

The spreading device can comprise at least two spreading device parts, in particular at least one spreading device holder and at least one spreading device roller which is arranged thereon. The one spreading device part, in particular the spreading device roller, can be a pin, in particular a cylindrical pin, or a peg, in particular a cylindrical peg.

The one spreading device part in particular the spreading device roller, can be connected to the other part of the spreading device, in particular the spreading device holder, in a frictional and/or material-locking manner, in particular pressed on and/or welded.

At least one spreading device part, in particular the spreading device roller, can be a cylindrical pin with a diameter of 6 to 10 mm inclusive, in particular 8 mm.

The spreading device can be designed as a cam or lever.

If applicable, it is provided that the spreading device is designed as non-linear.

If applicable, it is provided that the spreading device is rotated by the actuator via the transmission unit by a limited range of rotation.

In particular, it can be provided that the spreading device is rotated by the actuator via the transmission unit in a limited range of rotation. Within the context of the present invention, range of rotation can therefore be understood as the angular range around which the spreading device is rotated.

The cam or the lever of the spreading device can be designed as non-linear.

At least one non-linearity can be arranged on the cam or the lever of the spreading device.

If applicable, it is to be provided that the spreading device indicates at least one non-linearity i.e. a transference ratio which is not constant over at least one part of the actuator operating range.

Within the context of the present invention, a non-linearity can therefore be understood to mean the non-linear transference.

Where applicable, it is provided that the at least one non-linearity of the spreading device is matched to the at least one non-linearity of the transmission.

If applicable, it is provided that the at least one non-linearity, in particular the non-linear transference effect, of the spreading device is taken into account in the design of at least one non-linearity, in particular the non-linear transference for the transmission unit.

If applicable, it is provided that the actuator is operated in at least one partial range of its actuator operating range at an operating point which deviates from the optimum operating point of the actuator.

If applicable, it is provided that the actuator is operated in at least one a partial range of its actuator operating range in one operating point which deviates from an operating point with a maximum power of the actuator.

If applicable, it is provided that the transmission unit, in particular the spreading device, executes or converts a movement of the actuator in an initial direction starting from an initial position, in particular a zero position, of the transmission unit for braking.

If applicable, it is provided that the transmission unit, in particular the spreading device, starting from an initial position, in particular a zero position, executes or converts a movement of the actuator in a second direction, in particular opposite to the initial direction, for adjusting an air gap, in particular for actuating a wear adjustment and/or wear adjustment device.

If applicable, it is provided that at least one part of the actuator rotates once in an initial direction of rotation and once in a second direction of rotation. The second direction of rotation can be opposite to the first direction.

The transmission unit, in particular the spreading device can, if applicable, convert the initial direction of rotation of the actuator into a movement in the initial direction. The transmission unit, in particular the spreading device can, if applicable, convert the second direction of rotation of the actuator into a movement in the second direction.

The zero position of the transmission unit can be determined geometrically and/or mechanically by the transmission unit, in particular the non-linearities. Accordingly and also within the context of the invention, the zero position of the transmission unit can therefore be understood to be the position from which an actuation of the actuator in an initial direction thereby causes a lining stroke. The zero position of the transmission unit can also be determined, among other things, by the geometry of the transmission unit, in particular the start of the pitch.

If applicable, the actuator can be brought into a rest position, in particular by starting from the zero position of the transmission unit with lining stroke and without braking effect. From the rest position, the actuator can be moved, if applicable, in the direction of an initial direction in order to overcome the air gap and/or in order to increase the braking effect and/or in the direction of a second actuation direction in order to execute other tasks.

The rest position of the transmission unit can be a position of the transmission unit in which the air gap indicates a defined size. If applicable, the rest position can be identical to the zero position.

If applicable, it is provided that a wear adjustment device is provided in the rotational point of the spreading device.

If applicable, it is provided that the spreading device comprises a drive unit.

If applicable, it is provided that a wear adjustment device is provided in the drive unit of the spreading device.

In particular, if applicable, it is provided to alter and/or adjust the angle between the spreading device and the transmission unit for wear adjustment, in particular with at least one non-linearity of the transmission unit.

If applicable, this alteration and/or adjustment is to be executed via an adjustment device such as, in particular, a toothing. In particular, the adjusting device can be utilized in order to alter and/or adjust the spreading device with respect to the transmission unit, in particular with respect to at least one non-linearity of the transmission unit.

If applicable, a wear readjustment device is provided between the actuator and the transmission unit or between the transmission unit and the spreading device.

In particular, a bracket can be provided to retain the actuator. If applicable, a wear adjustment device is to be arranged between the actuator bracket and the actuator.

If applicable, it is provided that the transmission unit comprises a wear adjustment device for adjusting any existing wear.

If applicable, it is provided that the braking device comprises a wear adjustment device which is thereby actuated, in particular exclusively by the actuator, the transmission unit and/or the spreading device.

If applicable, it is provided that the braking device is set up for manual wear adjustment The wear adjustment device can be a ratchet device and/or a worm-screw device.

If applicable, it is provided that the actuator, the transmission unit and/or the spreading device is set up for braking adjustment and wear adjustment, in particular for actuating a wear adjustment device.

If applicable, it is provided that the braking device comprises only a single actuator for braking and for wear adjustment, in particular for actuating a wear adjustment device.

If applicable, it is provided that the actuator comprises several parts.

If applicable, it is provided that the actuator comprises a spring and an electric motor, whereby, if applicable, the spring and the electric motor are created as independent of each other with respect to the component and/or the direction for effect.

If applicable, it is provided that the spring interacts with the electric motor via at least one additional component and/or via the transmission unit.

If applicable, it is provided that the actuator comprises two electric motors.

If applicable, it is provided that the braking device cooperates jointly with at least one electric machine, in particular at least one electromagnetically excited electric machine.

If applicable, it is provided that the transmission unit comprises kinematic devices.

If applicable, it is provided that the transmission unit comprises a cam, a ball ramp, and/or a lever.

If applicable, it is provided that the transference for the transmission unit is to be variable, in particular during braking operation.

If applicable, it is provided that the transference for the transmission unit can be altered, in particular actively, preferably by turning a ratchet.

If applicable, it is provided that the transference for the transmission unit can be altered, in particular passively, preferably by spring-loaded retraction of components or by the elastic deformation of components.

Within the context of the present invention, braking operation can therefore be understood as the period between commissioning and switching off for the braking device, during which the braking device is ready to acquire and implement braking commands. In other words, the braking device is ready for operation for braking in braking mode.

If applicable, it is provided that the transmission unit will be selected and/or designed in such a way that at least one section with a non-linearity is created and/or arranged along the actuator operating range.

If applicable, it is provided that the transmission unit will be selected and/or designed in such a way that at least two sections, with differently acting non-linearities, are created and/or arranged along the actuator operating range.

Where applicable, it is provided that the at least one non-linearity is selected from the following non-linearities: non-linearity for overcoming an air gap between the brake lining and the friction surface, non-linearity for determining the contact point of the friction surface and the brake lining, non-linearity for achieving a minimum braking effect, non-linearity for generating an increasing braking torque, non-linearity for operating with lowered electrical power requirements, non-linearity to quickly achieve high braking efficiencies, non-linearity to measure and/or adjust parameters, non-linearity to reduce electrical stresses and mechanical stresses in lining stroke start, non-linearity to compensate for brake fade, non-linearity for wear re-adjustment.

In particular, the invention relates to a conveying device, a transporting device, a machine, a vehicle, an elevator and/or a bicycle, which comprises an electromechanical brake according to the invention.

Where applicable, the invention relates to a part of a conveying device, transporting device or a part of a machine, such as in particular a propeller shaft, which comprises an electromechanical brake according to the invention or is created from an electromechanical brake according to the invention.

If applicable, it is provided that the machine, in particular the conveying device or transporting device, comprises an additional, in particular electronic, braking device.

If applicable, it is provided that the additional braking device is designed as a parking brake, in particular a spring-loaded parking brake.

In particular, the invention relates to a method of operating a braking device according to the invention.

If applicable, it is provided that the transmission unit and/or the spreading device converts only a part of the movement of the actuator, in particular only a part of the actuator operating range, into a lining stroke.

If applicable, it is provided that the actuator is moved in the initial direction and the second direction via the transmission unit and/or the spreading device, if necessary, before and/or after the part of the actuator actuation range which is relevant for the lining stroke, without generating a lining stroke which is relevant for the braking effect.

If applicable, it is provided that the transference for the transmission unit is selected and/or designed in such a way that, starting from an initial position, in particular the zero position of the transmission unit along the movement of the actuator, in particular of the lining stroke, in the initial direction, that the non-linearities are arranged in.

If applicable, it is provided that at least two non-linearities are arranged along the initial direction according to the sequence which is provided below: non-linearity for reducing electrical stresses and mechanical stresses at lining stroke start, non-linearity for overcoming the air gap between the brake lining and the friction surface, non-linearity for determining the contact point of the friction surface and the brake lining, non-linearity for achieving a minimum braking effect, non-linearity for operation with reduced electrical power requirement, non-linearity for rapidly achieving high braking effects, non-linearity for generating an increasing braking torque, the braking torque therefore being adapted to the respective braking dynamics if necessary, non-linearity for compensating for brake fade.

If applicable, it is provided that the aforementioned non-linearities are arranged successively on the transmission unit along the initial direction. In particular, the aforementioned non-linearities can be stepped through and/or traversed sequentially as the actuator moves.

If applicable, it is provided that the non-linearities are arranged along the initial direction in any preferred sequence.

If applicable, it is provided that the aforementioned non-linearities are arranged in any order on the transmission unit along the initial direction.

If applicable, it is provided that the transference for the transmission unit is selected and/or designed in such a way that, starting from the initial position, in particular the zero position, of the transmission unit along the movement of the actuator in the second direction, that the non-linearity for measuring and/or setting parameters and/or the non-linearity for wear adjustment will be arranged.

If applicable, it is provided that the non-linearities for measuring and/or setting parameters and/or the non-linearities for wear adjustment are arranged successively on the transmission unit along the second direction. In particular, the non-linearity for measuring and/or setting parameters and/or the non-linearity for wear adjustment can be stepped through and/or traversed in succession during the movement of the actuator.

If applicable, it is provided that the non-linearity is designed for measuring and/or adjusting parameters if applicable, for measuring mechanical losses, the zero position of the transmission unit, the zero position of the actuator position and/or at least one spring action.

If necessary, it is provided that the non-linearity for measuring and/or setting parameters is designed in such a way that the actuator, starting from the zero position of the transmission unit, is moved in its initial direction.

If applicable, it is provided that at least one parameter of the braking device, in particular motor losses, transmission unit losses, mechanical losses and/or the effect of any springs present, is measured by the movement of the actuator in its initial direction.

If applicable, it is provided that the torque of the actuator which is generated and/or results from the movement is detected.

If applicable, it is provided that the assessment of whether an adjustment of the braking device is necessary is to be implemented on the basis of a comparison of the at least one parameter of the braking device, in particular the torque of the actuator, with expected values and/or with measured values of the torque of the actuator at other operating points and/or in other operating statuses.

If applicable, it is provided that the non-linearity for measuring and/or setting parameters is designed in such a way that the actuator, starting from the zero position of the transmission unit, is moved in its second direction.

If applicable, it is provided that a force measuring device, in particular a spring and/or an end stop, is provided in the second direction, against which at least a part of the transmission unit, in particular the actuator abuts, whereby, if applicable, the zero position of the actuator position can be measured and/or adjusted.

Where applicable, it is provided that the at least one parameter of the braking device is obtained by comparing the torque, motor current and/or motor voltage in normal operation and the torque, motor current and/or motor voltage in measurement operation.

If applicable, it is provided that the non-linearity for reducing electrical stresses and mechanical stresses at the lining stroke start is such that the transference ratio of this non-linearity in the first half of the air gap is more than double as large as the speed transference which is present in the second half of the air gap.

If applicable, it is provided that the non-linearity for the reduction of electrical stresses and mechanical stresses at the lining stroke is designed in such a way that the transference ratio, in particular the speed transference, of this non-linearity, preferably the ratio between the speed of the actuator and the speed of the lining stroke, in the first half of the air gap, in particular in the first half of the path for overcoming the air gap, is more than double as large as the speed transference in the second half of the air gap.

If applicable, it is provided that the non-linearity for overcoming the air gap between the brake lining and the friction surface is such that the transference ratio of this non-linearity over more than half of the air gap is less than half the maximum speed transference in the lining stroke range adjacent to the air gap, so that, if applicable, the air gap is overcome more quickly as when compared to normal operation.

If applicable, it is provided that the non-linearity for overcoming the air gap between the brake lining and friction surface is designed in such a way that the transference ratio, in particular the speed transference of this non-linearity, preferably the ratio between the speed of the actuator and the speed of the lining stroke, over more than half of the air gap, in particular more than half of the distance for overcoming the air gap, is less than half as large as the maximum speed transference in the lining stroke area which is adjoining the air gap, so that, if necessary, the air gap is overcome more quickly in comparison with normal operation.

If applicable, it is provided that the non-linearity for overcoming the air gap between the brake lining and the friction surface is such that the actuator is operated with the maximum actuator power, whereby the air gap is overcome as quickly as possible.

If applicable, it is provided that the non-linearity for overcoming the air gap between brake lining and friction surface is to be designed in such a way that the air gap is overcome as quickly as possible by a device, in particular a cam or a ramp, which indicates a pitch which is designed in such a way that, if necessary, starting current peaks and starting current loads can be prevented and/or reduced at the start of the lining stroke.

If applicable, it is provided that the non-linearity for determining the contact point of the friction surface and the brake lining is designed in such a way that the contact point of the brake lining and the friction surface can be recognized, in particular, from the energy, current and/or power consumption of the actuator and/or from the course of the actuator load, in particular the torque.

If applicable, it is provided that by means of non-linearity for determining the point of contact of the friction surface and the brake lining, it is possible to inspect whether an adjustment of the braking device, in particular an adjustment of the brake lining and/or an adjustment of the air gap, is necessary.

If applicable, it is provided that the transference for the transmission unit for the non-linearity for determining the contact point of the friction surface and the brake lining, in the possible range of the contact point of the brake lining and the friction surface, will generate an evaluable combination of transference ratio and actuator torque, in particular an interpretable curve from the energy, current and/or power consumption of the actuator.

If applicable, it is provided that the evaluable combination of transference ratio and actuator torque is an interpretable progression from the energy, current and/or power consumption of the actuator, the actuator load and/or the actuator torque, over the actuation, in particular taking into account the respective transference ratio.

If applicable, it is envisaged that in the range of non-linearity for determining the point of contact between the friction surface and the brake lining, there is a significant difference from the behavior in the air gap from the point of contact between the friction surface and the brake lining.

If applicable, it is provided that the non-linearity for achieving a minimum braking effect is designed in such a way that a certain required minimum braking effect, in particular for emergency braking, is achieved within a minimum effective time, the minimum effective time being only at most 20% above the time which, in particular for achieving the minimum braking effect, is technically possible with the braking device.

If applicable, it is provided that the non-linearity for generating an increasing braking torque, whereby the braking torque being adapted to the braking dynamics if applicable, is designed in such a way that the speed of the braking torque build-up is adapted to the dynamic weight shift of the vehicle caused thereby, so that a locking of the wheels of the vehicle is counteracted if applicable.

If applicable, it is provided that the non-linearity for operation with reduced electrical power requirement is designed in such a way that the power consumption of the actuator during operation of the transmission unit at low rpm and/or when the actuator is at a standstill is at least 20% lower than in comparison with a non-linearity, which is designed in particular according to the criteria of the maximum achievable motor output power, for the same or a similar operation and/or operating point, in particular for operation at low rpm and/or with the actuator at a standstill, so that the power consumption of the actuator is reduced, in particular during longer continuous braking.

If applicable, it is provided that the transference for the transmission unit is selected and/or designed in such a way that, starting from the initial position, in particular the zero position of the transmission unit along the movement of the actuator, in particular of the lining stroke in the initial direction, the non-linearity for operation with reduced electrical power requirement is arranged in such a way that, in operating statuses which have a long holding time and/or a high temperature load, a low consumption of electrical energy and/or a low heat loss of the, in particular electrical, actuator result.

If applicable, it is provided that the non-linearity for compensation for brake fade is designed in such a way that the actuator is operated with a motor torque which, under the same operating conditions, in particular the operating temperature is higher, in particular higher than the maximum permissible motor torque and/or higher than the maximum permissible shaft power, than that with a non-linearity which is designed according to the criteria of the maximum achievable motor output power, so that a braking effect is also achieved in the event of brake fade.

If applicable, it is provided that at least one non-linearity, in particular over the lining stroke, for compensation of air gap errors is designed in such a way that an air gap error, in particular a deviation of the size of the air gap from the assumed dimension, is compensated for whereby the air gap error preferably results from wear.

If applicable, it is provided that, if applicable, the braking device is operated up to a certain deviation of the magnitude of the air gap error, in particular by adjusting the movement of the actuator, preferably without wear adjustment and/or without a wear adjustment device.

If applicable, it is provided that the non-linearity for wear re-adjustment is designed in such a way that the actuator, in particular starting from the zero position of the transmission unit, executes a movement against the direction of movement or direction of rotation which is utilized for braking, in particular a movement in the second direction and that, by this movement of the actuator, in particular without braking effect, the wear adjustment device is thereby actuated.

If applicable, it is provided that the non-linearity for wear adjustment is designed in such a way that the actuator executes a movement in the direction of braking, in particular a movement in the initial direction, that the wear adjustment device is actuated by this movement of the actuator, in that, if necessary, after reaching a maximum position of the actuator which is required for braking, in particular for parking braking, an additional movement of the actuator, in particular without a functional lining stroke, will result in actuation of the wear adjustment device or prepares this.

If applicable, it is provided that the non-linearity for rapidly achieving high braking effects is designed in such a way that the actuator is operated with a motor torque which is equal to the maximum permissible motor torque and/or which is equal to the maximum permissible shaft power.

If applicable, it is provided that at least one actuator position of the actuator is retained with a lowered, in particular very low, electrical power requirement or as current free by a corresponding design of at least one non-linearity and, if applicable, by the interaction of this at least one non-linearity with a spring, in particular a spring action.

If applicable, it is provided that the effective range of at least one non-linearity/or non-linear acting component is distributed over several, in particular non-linear designed and/or non-linear acting, parts of the transmission unit, in particular several transmission unit components, preferably cams and/or ball ramps twisted against each other.

The effective range of at least one non-linearity/or non-linear component, in particular the effective range and/or the design of the transmission unit components, can each be assigned to a specific actuator operating range.

By using additional non-linear acting components, it can be possible to increase and/or enlarge the overall actuator operating range, which is predetermined and/or limited by the non-linearity of the individual components. In particular, the effective range of the existing non-linearities, preferably the actuator operating range which is limited by the operating range and/or range of movement of the transmission unit components, can thereby be increased and/or enlarged.

Where applicable, it is provided that an initial transmission unit component, in particular an initial non-linearity of the initial transmission unit component, is associated with an initial actuator operating region. In order to be able to increase the scope of movement and/or actuation range, a second transmission unit component can be provided, which is assigned to a second actuator operating range. This second transmission unit component can indicate another portion of the first non-linearity and/or a second non-linearity. The second actuator operating area can be adjacent to the first actuator operating area.

If applicable, it is provided that the transference for the transmission unit will be selected and/or designed in such a way that an actuator movement without braking effect causes a movement of brake components, such as in particular the brake lining carrier.

If applicable, it is provided that this movement causes no and/or only a minimized residual drag torque.

If applicable, it is provided that a movement of brake components, such as in particular the brake lining carrier, is affected by an actuator movement without braking effect i.e. without braking effect, in such a way that no and/or only a minimized residual drag torque remains, which is possibly known under the term "zero drag".

BRIEF DESCRIPTION OF THE DRAWINGS

Advantages of the present invention will be readily appreciated as the same becomes better understood by reference to the following detailed description when considered in connection with the accompanying drawings wherein:

FIG. 11 illustrates exemplary components of the brake device according to embodiments of the present invention;

FIGS. 12A-12B illustrate the operation of exemplary components of the brake device according to embodiments of the present invention;

FIGS. 13A-13C illustrate how exemplary components of the brake device interact according to embodiments of the present invention;

FIG. 14 illustrates an exemplary cam surface on the brake device according to embodiments of the present invention;

FIG. 15 illustrates an exemplary effect of the brake actuator torque on movement of the lining according to embodiments of the present invention;

FIG. 18 illustrates an alternate effect of the brake actuator torque on movement of the lining for the electromechanical brake of FIG. 15;

FIGS. 19A-19E illustrate exemplary components of the brake device according to embodiments of the present invention;

FIG. 24 illustrates exemplary components of the brake device according to embodiments of the present invention;

FIG. 25 illustrates exemplary components of the brake device according to embodiments of the present invention;

FIG. 26 illustrates the operation of various components of the brake device according to embodiments of the present invention;

FIGS. 33A-33B illustrate exemplary components of the brake device according to embodiments of the present invention; and FIG. 34 illustrates the operation of various components of the brake device according to embodiments of the present invention.

DETAILED DESCRIPTION OF EXAMPLE EMBODIMENTS

Figure 1A:
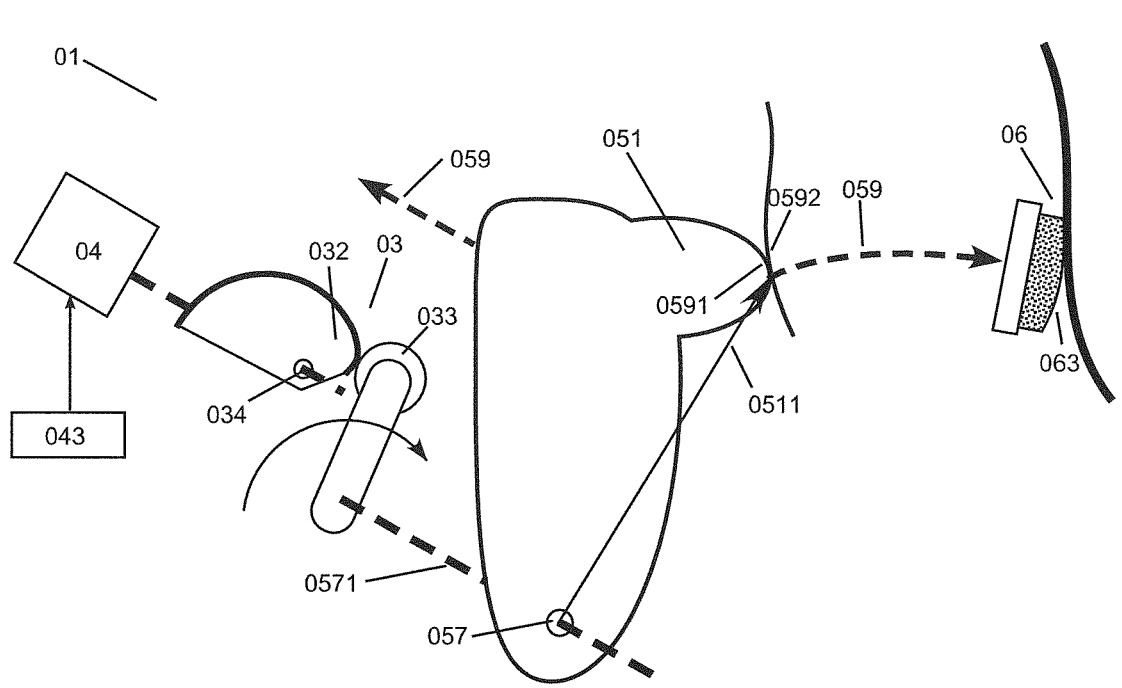
FIG. 1A is an exploded view a brake device according to embodiments of the present invention.

Embodiments from the inventor are subsequently entered, which are intended to provide a better understanding of the invention. The features which are described below can be, but must not be, features of the braking device according to the invention. The braking device according to the invention can comprise and/or indicate the features listed individually or in combination i.e. in any combination.

The term "actuate" can be understood as the process of increasing the braking effect and "release" as the process of decreasing the braking effect. An actuation mechanism can fulfill both tasks.

A "ratchet" can be understood as any device or effect which specifies one direction e.g. direction of rotation, or prefers or creates one from two directions. This can be achieved by positive locking (e.g. gear teeth), frictional locking (e.g. wrap springs) or geometrically by means of constrictions or contact pressures and, if necessary, can also be transferred so that, for example, a worm or screw continues to turn a worm-geared part with fine resolution, but the "ratchet effect" is achieved by ratchet-like turning of the screw. All ratchet functions, which are described here, can of course also be executed with such "transferring ratchets", however the transfer is executed exactly. There are very many "ratcheting" parts which are known, often with certain advantages, such as fine resolution. Also hydraulic solutions can be utilized here, which are e.g. amended, altered or direction-dependent via a slot, a valve, viscosity or however else. These "ratchets" can be combined here, also with a minimum of one additional function, so that they for example limit the torque, limit the stroke or enable the stroke from a certain status (such as e.g. from the torque).

In the present case, "non-linear" can therefore be understood as any behavior which is not based on a constant transference ratio, such as e.g. a common transmission unit. This non-linear behavior can be defined in very different ways.

EXAMPLES curve between input force and output force over the actuation path limitation to only one direction of movement limitation to a certain torque or a certain force allowing movement of one part when another is standing still.

In the following sections, we will also use the phrase "about the actuation of an amendable transference ratio", which is utilized in the same sense as "non-linear", although here in general "in the same sense" is not necessarily to be therefore understood as "exactly the same", rather in this case as "yielding the same meaning".

There are many ways available to indicate the strength for braking, from perceived to physical magnitudes. Therefore, the term "braking effect" is utilized here, which includes all variants and can be expressed, for example, as braking torque, braking force, braking delay etc. These effects are not mentioned individually in the following, but are understood to be effective for it.

"Lining position" or "lining stroke" can describe the position of a brake lining or the values which are derived from it, such as the actuator angle. These values apply from a defined starting value, preferably the maximum distance from the friction surface (brake disc or brake drum or similar). After overcoming an air gap i.e. from the point at which the lining contacts the friction surface ("contact point"), the term "deformation" can be utilized if applicable, since from this point onwards, contact pressure occurs, which leads to deformation or an overall deformation. The touch point is not understood as a geometric point, rather the issue that is just beginning. All of this also applies when several linings are involved.

In the case of straight movements (as in the case of brake linings), it makes sense to speak of force and displacement (or stroke) in connection with transference ratios. In the case of rotating parts (such as contact cams or actuator motors), the most common terms are torque and angle, but one could of course also use e.g. circumferential force and e.g. displacement at the circumference. A position can be thought of as an angle, thereby naturally also as a measurable quantity, such as steps, etc., or as a linear measure. In the following, the terms are utilized in an effective or sensible way, i.e. "high force" also means, for example, a high actuator torque, and only one term, for example, is listed, but all terms with a similar effect are included. Since both rotary as well as linear movements can occur in EMBs, force and torque and/or path, displacement and angle are usually utilized in the same sense, i.e. not both versions are mentioned, although both usually occur, such as angle of the actuator shaft or stroke of the lining. This naturally also implies that an actuator torque can develop different press-on forces or press-on forces at different points of the non-linearity or that, for example, the lining position and the actuator angle are not directly related but, if applicable, via, for example, the non-linearity and the resulting total displacement or transference. The terms "control" and "regulating" are also utilized equivalently, except that the difference is explicitly pointed out.

Terms such as "and", "or", "and/or" are intended to be fundamentally non-exclusive. Features can in principle also be multiple e.g. several springs instead of one named or several brake actuators instead of one named actuator. Arrangement representations are one representation of several possibilities: if, for example, compression springs are shown, then this could also be implemented with tension springs or combinations, or other pushing forces or pulling forces. Modifications with the same or better effect are also hereby possible e.g. when a spring is truncated somewhere else than represented.

Actuator Configurations:

Advantageously, a wear adjuster is actuated with the brake actuator, however, one could of course utilize one's own wear adjuster actuator.

Several electric motors can also be utilized e.g. for safety reasons or for other purposes. For example, one could execute the service brake function and another could execute a parking brake function (which remains active in a de-energized status, for example), and the parking brake drive unit could also execute or support the service brake function in an emergency, for example.

Brake Actuator Torque:

In all the aforementioned procedures that use the brake actuator torque which occurs, self-amplification should of course be taken into account if applicable. Other actuation energies, such as e.g. springs or energy from thermal expansion (e.g. a brake disc was expanded with heating it up, corresponding to an applied contact pressure energy, or a brake drum could expand, corresponding to a removed contact pressure energy) must also be taken into account in such cases.

For example, there could be a single optimal transference ratio sequence with varying transference via the actuation when only one target was optimized. For example, the shortest possible actuation time could be a single target and one would get the physically correct answer that the transference at each point must be such that the brake actuator was run at maximum shaft power. This would mean that the transference ratio would have to alter by several powers of ten, because the press-on force at the beginning is zero and only very small displacement losses have to be covered, and at the end, for example, 30 kN would be required for full braking of a passenger car front wheel.

It is recommended here not to implement such "optimal" transference ratio sequences, rather to address requirements which are directly related to the reasonable and favorable implementation under real conditions. Furthermore, it is recommended here not to strive for a single optimum, rather to take into account the essential cases in use as the "optimum target course". For example, contrary to the aforementioned demand, a status with e.g. by definition zero actuator wave power also occurs very frequently, which would be e.g. when a certain actuator position is not altered e.g. In order to maintain the resulting braking effect. Here, for example, one could integrate the thermal load of a stationary actuator with simultaneous heat generation in the EMB as an additional requirement with respect to actuator torque and prevailing transference ratio, where the actuator shaft power is zero, but not the electrical power. Here, one could include the electrical power loss at the actuator, which can be small when the actuator is stationary, because holding current still flows, but the small copper resistance causes little voltage drop, and therefore the current squared times actuator resistance causes a small thermal power.

There can be many statuses in an EMB, where it is proposed in this case that one does not strive for an optimal sequence, rather one considers the essential statuses. For example, spring-actuated brakes are also covered, whereby a spring force assumes the actuation and an actuator force assumes the releasing. In holding the released status, it is proposed here that one does not hold released with e.g. the "optimal maximum motor power", rather with e.g. quite the opposite, with that minimum actuator torque, which just still enables safe operation under all given conditions.

It is also not so important with the interpretations which are proposed here, how the optimal nominal sequence of the non-linearity has arisen, the proposals here mainly deal with implementing an actual sequence of the non-linearity into reality, which fulfills the conditions, whereby one will retain the resulting disadvantages (such as e.g. that the theoretically shortest possible operation time can no longer be achieved) as naturally small. Since the task does not possess a single possible solution, the solution variants will therefore be compared with respect to their advantages, whereby one can of course also be satisfied with a single or initial solution from several theoretically possible ones, especially when one already has an overview of similar solutions. Brakes, as those which are proposed here, will also often combine multiple non-linearities, such as e.g. a cam which actuates a lever. In this case, one would apply the mechanically and geometrically favorable solutions if applicable e.g. utilize both and strive for an advantageous total actual non-linearity. However, multiple non-linearities in an EMB can also be designed and interact differently. For example, a spring force can act in a crank-like manner on a cam, which thereby actuates a contact pressure lever, in which case three non-linearities execute an "optimal" press-on effect. As described above, it is usually not a single optimum which has to be considered, rather a setpoint target sequence which results, for example, from the fact that the relaxing spring can always exert enough force to apply pressure to the lining under all conditions.

Adaptation to Framework Conditions:

The cam shape, in particular the maximum angle of twist, as well as the leverage utilized when expressed by the minimum and maximum cam radius, is always quite decisive for the achievable size of the brake. Construction size, of course, creates space requirements, but also considerations for the weight and price. In particular, however, the available installation space can be severely limited in the area of a brake because of other components located there, such as e.g. the rim, wheel suspension or drive shaft, but also because of spring movements and steering movements, for example. It is therefore of little practical relevance to achieve non-linearities which are recognized as theoretically optimal with rather unfavorable or even impossible size.

It is hereby proposed to design the cam track in accordance with the geometrical and mechanical improvements. In this respect, it can be e.g. interesting to retain the cam twist angle well below 1800 when collisions could otherwise occur in the cam twist.

There can be quite varied tasks and conditions provided for different cam positions. For example, one position with a spring-actuated parking brake can be designed for the lowest possible released holding torque, while the adjoining area should still permit rapid application of the press-on force. In the following, this will be illustrated on a service brake where a high lining movement speed in the air gap is required and the resulting press-on force should cause a significant alteration in the actuator torque e.g. in order to be able to easily recognize the contact of the brake lining by the course of the actuator torque. For this strong alteration for the initial behavior, a small radius is recommended for the roller which is running on the cam, because the cam track is easier to design for small roller radii (especially without points not possible in practice, see above).

Design Procedure:

Utilizing a comparison of the proposals, see FIGS. 11, 1201–1202, 1301-1302 (radius of fillet with wrong pitch, radius shift for correct pitch, reduction of the total angle of twist), one can see the interesting effect that not all "compromises" always have similar effects. The mere application of a fillet radius can cause non-functional braking conditions, the shift of the radius causes only a minimally larger necessary twist angle, which in turn could be reduced (whereby, of course, the minimum radius would have to be controlled again) and, with a combination (reduction of the larger twist angle with subsequent controlling of the minimum radius), one could actually arrive at a solution which can be very close to a nominal sequence. It is thereby interesting to note how easily both non-functional solutions and those close to the target requirement can emerge from this.

Another proven procedure can be to abstractly process the non-linearities and, if applicable, test or inspect them for the alteration in impact, e.g., which actuation time behavior arises. One thereby makes the conversion of the non-linearities into the cam trajectory as easily manageable (mathematically seen as "just" a roll-off curve), then it is also possible for one to quickly observe the resulting trajectory to the non-linearities which have just been altered and, in turn, to execute local alterations for the non-linearities, e.g., to expand the alteration in the transference ratio over a somewhat larger range or even an area, especially when it is recognized in which cam range or non-linearities range the need for improvement lies. For this purpose, however, it is helpful to provide for a quickly feasible conversion of non-linearities into cam surface and/or vice versa, when one wants to represent a geometry alteration as a non-linearity e.g. transference ratio via the actuation.

There are helpful approaches for such a conversion type. For example, one can start from a force transference ratio or torque transference ratio of the non-linearities via, for example, the twist angle. For example, one could consider this as an "initial derivative" because it refers to a geometric slope. Accordingly, it is proposed that one requires an integral in order to get from the slope to an absolute value. It can be proposed as helpful in the following to initially determine the center path of the outgoing roller as an easier to determine "cam track" with an imaginary roller radius of zero. Now it is proposed to project the center point over the radius onto the cam surface. Of course, the steps do not have to be executed exactly as proposed here. One can also simplify some things, summarize them or similarly solve them. Above all, it is always important to present a path, however similar, from non-linearities to moving tracks. This can and/or should be automated, such as e.g. usually with Matlab-Simulink or any other similar language. To what extent the fact that it is simply mathematically a "roll-off function" and assists in this case, can be considered by an implementer of this proposed approach.

It is also proposed to represent an "inverse function" to the aforementioned point i.e. to project it e.g. from the cam surface to e.g. the roller center track and then to "differentiate" the radii of the center track into slopes and, from this, to therefore gain the torque transference ratio via the angle, whereby this inverse path can seem somewhat simpler. One only needs to solve one of both paths, e.g. only the one from the surface area path to the transference ratio sequence. One can subsequently gain the inverse function via e.g. iterations, i.e. via one of the suitable iterative solution procedures, also known as "root finding". One can solve these tasks on a point-by-point basis, which is more in line with human understanding, because one can think about what exactly to do for one point. It is proposed to assume such a "point by point solution" as a general solution function, because a solution which can be shown for one point can also be formulated as a function in general.

Instead of cams, ball ramps can be utilized for example, also with non-constant slope or non-constant radius to the ramp pivot point, or other non-linearities such as levers, cranks, wheel pairs with non-constant radius, etc. In general, this conversion of non-linearities into geometry and vice versa, which has been proposed here, can also be designated as a transformation.

Mathematical inaccuracies can also be compensated for. Especially in the area of the strongly and locally rapidly altering transference ratio, the mathematical generation of the cam surface from the roll center point curve can lead to slightly different transference ratios when the rolling is actually executed or when the reverse mathematics generates the roll center point curve again from the rolling. This can be compensated for by superimposing this found deviation for the intended roll center point curve, which is subsequently converted again from the real rolling, on the nominal roll center point curve as a pre-compensation which has been assigned the correct sign and therefore determining the cam surface area from this.

This can all be applied similarly to other rolling procedures such as e.g. ball ramps. This interpretation of non-linearities is not limited to actuator torque, as actuator torque was utilized above only as an example. In the same way, for example, one non-linearity can be in a spring actuation, or in the residual torque between the spring torque and the actuator torque, or in any non-linearities, however it is utilized, whereby the target behavior can be expressed via the actuation. The most favorable influence of unfavorable slopes on one non-linearity can also be favorably influenced with an additional non-linearity, e.g. by designing a non-linearity only for a geometrically and mechanically advantageous slope and by an additional non-linearity which further improves the slope in order to achieve the overall target behavior. For example, when one combines a region of very strong non-linearities for a spring linkage with a cam non-linearity, then it can be very advantageous for a spring-actuated EMB: for example, the spring would be maximally tensioned in the fully released status and maximally released in the fully braked status. With the cam, for example, one could aim for the relaxed spring action in order to provide the highest press-on force and the fully tensioned spring action for acting on the press-on area in such a way that the brake can be held in a released position with minimum torque. This can mean an extreme alteration in the cam displacement in the transference area within the air gap to incipient contact pressure. When the spring now engages a crank-like drive of the cam, e.g. in the fully tensioned status, then the tensioned spring can be permitted to start, e.g. almost at the dead center near the spring, and thereby obtain a spring torque on the cam which increases strongly in this area, and can therefore alter the cam transference less quickly or strongly by combining these two non-linearities. The same can of course also be achieved with other combinations, e.g. including a ball ramp or different radii.

One can now formulate the proposed procedure and cam in general terms as follows:

There is a, as like always, a kind of target sequence for the non-linearity via the actuation. This can lead to a possible cam track.

However, it can also result in an impossible or undesirable cam track, especially when the geometric and mechanical constraints are invoked, such as e.g. cam radii, cam twist angles, or mechanical stresses and mechanical loads. From this, an "improved" cam track can be proposed and one can determine whether the resulting sequence for the non-linearity should be tolerated or whether it has been additionally improved.

Or, for example, a more practical target sequence for the non-linearities can be specified, the corresponding cam track will be determined and this will be controlled again for compliance with the limitations.

It can be necessary to go through these iterations several times until a compromise is reached between a desired progression of non-linearities and fulfilling the limitations is achieved.

From a mathematical point of view, these iterations can also be prevented when one can provide a mathematical relationship between the sequence for the non-linearities, the cam track and the limitations involved. However, this is not so simple in that the cam tracks are "rolling curves", although this does not lead to a simple mathematical representation in the general case.

Of course, all this can be applied to other rolling processes, such as e.g. ball or spherical ramps, and it can also be applied when there is no rolling, rather a preferred non-linear transference exists. There is always the desired sequence for the non-linearities and the one which is possible under constraints and, despite the constraints, one will still strive by mathematical and/or iterative solutions for one which is as close as possible to the desired non-linearities.

"Coming as close as possible" will again be evaluated in several ways, e.g. how large the time disadvantage of the brake application becomes, how high the actuator torque increases from the desired value, which radii of curvature one can permit or which geometrical disadvantages one will accept.

Advantageous Parts, Embodiments and Implementations

Loss-Reduced Spreading Parts:

It is proposed that, advantageously, a rotary movement for brake actuation will also be generated in the brake. For example, rotatable spreading parts can therefore be utilized in drum brakes, and in general in e.g. cams, eccentric cams, levers, ball ramps, whereby these parts can also be non-linear.

Figure 20:
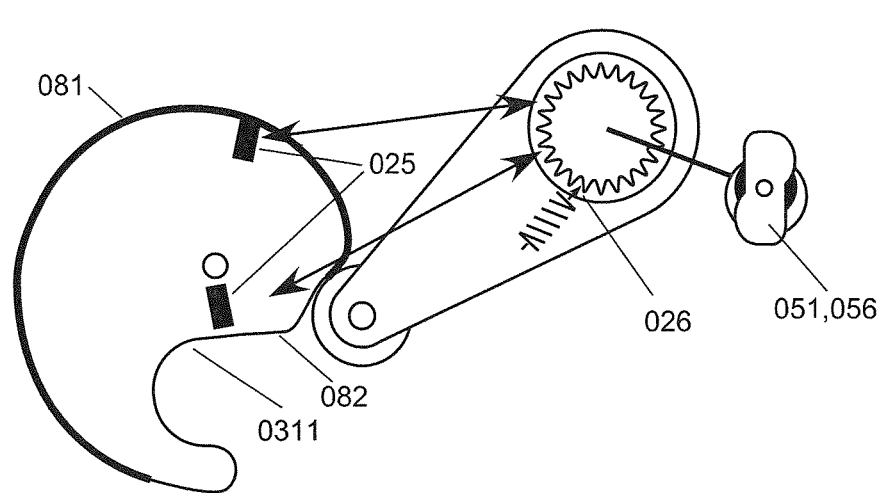
FIG. 20 illustrates exemplary components of the brake device according to embodiments of the present invention.

Wear Adjustment:

Furthermore, advantageous examples of wear adjusters are represented, in particular in FIGS. 20-2302, whereby two functions are derived from the movement of the brake actuator in each case, namely normal brake actuation and wear adjustment. In the case of mechanical, hydraulic or pneumatic brakes, e.g. drum brakes, there are therefore various known readjustment procedures, such as e.g. when there is too much stroke or when there is still too little press-on force above a certain actuation. All these procedures are possible here, of course.

Particularly advantageously, parts can be utilized here whose behavior alters under the influence of force or influence of torque i.e., e.g. bending, deflecting against a spring or not yet deflecting, so that e.g. an alteration will be expected at a certain actuation position (or area, e.g. when the lining is just starting to build up press-on force), and that e.g. When this alteration does not occur e.g. it is concluded that e.g. there is too much air gap. With the alteration which is not executed, a function is subsequently triggered, e.g. actuation of a wear adjuster. For example, there could be a spring-based part in advance, e.g. on the lever or cam, which is normally pushed away when the press-on force starts to apply, but which is not yet pushed away in this actuation status without the press-on force starting and therefore implements a wear adjustment procedure or anticipates a later implementation. It is also possible, for example, that one could implement an adjustment movement via a limiting device such as e.g. a slipping clutch after a certain angle has been exceeded, so that the adjustment is not executed when the press-on force is applied when the slipping clutch slips from a certain position.

In particular for FIGS. 20-2302, a rotary movement of the brake actuation is hereby assumed. It is assumed that the wear readjustment is added into this rotational movement, i.e. it must be twisted more with wear. Disc brakes or drum brakes or any other types of brakes can be utilized, preferably of the same type on one axle. In all embodiments, instead of rotational movements, other movements such as tension movements, pulling movements or pushing movements can be utilized. Individual brakes can not only be actuated as described or, for example, the brakes of an axle or of a group of axles can be operated together, and wear adjustment but also executed separately or together for a brake, an axle or a group of axles.

The wear adjustment, however, does not have to be included in the actuation movement, rather it can also be supplied separately to the brakes, similar to what is shown.

For example, a complete EMB with actuator and wear adjuster can be utilized on one side and only the brake mechanism alone on the other side, which is also actuated by the complete EMB, or any number of EMBs can be actuated by any number of complete EMBs.

In all of the following embodiments, at least one spring can also be involved, e.g. for holding a parking position and/or service brake position or for supporting release and/or actuating the brake. In these cases, the behavior of the spring(s) and brake actuators must always be combined with the correct sign and based on a common effect (torques, forces).

The adjustment (e.g. via ratchet action) can also be executed separately for brakes which are operated jointly by only one actuator. For example, the adjuster parts can be separate for each brake and can be operated separately by two adjuster ratchets via e.g. an elevation (e.g. pin) and a compensating part (e.g. spring, torque, force, travel limiter) can make a wheel-specific adjustment, e.g. by providing the brake with a larger air gap as a longer stroke due to a smaller force on a spring. Also "balance beam-like" compensations can be advantageously proposed, e.g. the side of the beam which comes into contact with the lining earlier ends the readjustment and the other side readjusts more. For example, a roller on a lever could abstractly be formulated as a roller between two levers, so that both levers can find a position for similar force build-up. Then, for example, the roller could have a crowned rolling surface. Such rotating or otherwise position-modifying, horizontal compensating parts are naturally proposed as practically executed, so that the above solution, for example, can be thought of as principled. Also, "one behind the other" arrangements can be recommended as having the same purpose, so that, for example, one brake builds up actuating force first and therefore causes force to be built up on the other as well, so that, for example, one part is brought up to another and then both build up force.

Such compensation parts, which in principle can be similar to a balance beam, but can also be soldered differently, such as a differential, can also be referred to as "kinematic chains" and have e.g. one input and e.g. two outputs and can be utilized here in any compensation function, e.g. also particularly advantageous, e.g. to compensate for small differences in e.g. the actuation path in the case of jointly actuated brakes. One can also consider this as similar to a hydraulic compensation which, of course, is also possible here and sets the same pressure on e.g. two outputs.

The compensations and/or individual controls can also be combined e.g. as one of many solutions it is proposed to provide which will be particularly advantageous, for each e.g. brake or e.g. each side, its own wear adjustment (e.g. ratchet), so that the brakes adjust to similar lining behavior (to the e.g. drum or e.g. disc). Differences can then still be compensated for by a balance-beam like behavior, so that, for example, if the ratchets had "one tooth different" settings, then the balance-beam like behavior can compensate for the press-on forces. For the special requirements of EMB (e.g. position control instead of the usual force control) the above explanations are of special importance, so that one cannot simply equate the completely different controls (position or force). Position-controlled brakes represent uncharted territory, as position measurements on brakes have hitherto existed practically only for laboratory or experimental purposes.

The brakes can, if e.g. more than one brake is operated by only one actuator, preferably also be adjustable in their similar lining press-on behavior to the e.g. drum or disc, so that e.g. over adjustment possibilities (which could e.g. over friction surely hold the condition) a uniform application on all brakes is adjustable. Also pairing of brakes and brake parts for low overall tolerance can be recommended, such as packaging of similar brakes or combination of e.g. linings and e.g. drums, so that similar overall characteristics result and also e.g. processing before e.g. delivery can be recommended, such as grinding of the linings (also in e.g. already in the brake mounted status). The linings can also be shaped in such a way that, for example, they lie preferably in the middle of the long side of the brake shoe when new, in order to reduce tolerances from initial press-on points, e.g. whether the lining initially lies on the operated shoe side first or on the unoperated side.

Particularly in the case of "servo drum brakes", it can be advantageous to assemble the actuation of a brake shoe together with the support of the brake shoe on a component, e.g. on a plate which can be rotated around e.g. the wheel hub. This therefore creates a stabilizing effect on this brake shoe because this shoe can be seen as a simplex shoe from the point of view of its actuation and this "stabilized" effect can be passed on to the second shoe. Otherwise, with the servo drum brake, the support point of the first shoe would move away from the actuation. If, as proposed, this migration is suppressed, then a more favorable overall substitution ratio could be obtained.

With a normal servo drum brake, the travel of the first shoe resulted in a longer actuation distance at the actuation point of the first shoe.

If, as proposed, the actuation point and the wear point are located on one part, then the relative actuation distance for the first shoe remains smaller (can be as small as for "Simplex"), although a servo effect (for actuation of the second shoe) is created by co-rotation. With this assembly method, the strong dependence of the self-amplification on the coefficient of friction can also be reduced because, according to this assembly method, a first simplex brake presses onto a second simplex brake. This assembly method and the overall support and/or bearing of the common support of the first shoe can be designed in such a way to create rotational dependence, or to create as little to no rotational dependence as possible.

These projections can also be utilized for force sensing, e.g. measuring or switching. For this purpose, additional springy parts can be utilized or, for example, the stiffness characteristic of the "second simplex brake" can be utilized to convert a force measurement into a displacement measurement. When the second brake shoe is considered here as a simplex brake, then its stiffness characteristic curve indicates the force-displacement relationship i.e. it is possible to infer the braking force arising from the first shoe from the driving movement of the common assembly and, in particular, to see whether the first shoe is already developing braking force or is still in the air gap.

Influence on Control Systems:

In all the aforementioned embodiments, position measurements for e.g. the actuator shaft angle or the cam angle or the lever angle etc. are recommended, whereby in a simple embodiment also e.g. end stops and the recorded, resulting reaction can also serve for position finding or also recognizable areas. For example, the area between the parking brake and service brake sides of a cam can be detected by the two increasing motor currents. In the case of brake control, for example, analog electronics is recommended when, without the effort and/or expense of software (and possibly its safety problems), e.g. a simple position control with e.g. a potentiometer e.g. in the area of the cam makes the actuator position via setpoint/actual value comparison possible. The motor can be e.g. a DC motor (or also a transmission unit for low cost) and can be supplied via an analog circuit. In order to prevent the losses with analog motor control, the motor (also DC motor) can also be operated with a pulse width modulation, which is controlled e.g. via analog. The comparison of target braking effect and actual braking effect (e.g. distortions, positions, overrun strength) can also be executed analogously. Digital controls are of course also possible, as well as mixed ones, e.g. analog comparison with digital ABS or ESC, but neural networks or fuzzy logic are also possible, as well as separate setups, such as one part being in one brake electronics and another in another device.

All these embodiments are not linked to parking brake and service brake. Many other requirements can be solved in the same way as described above, only one of the functions can be utilized or new ones can be added, e.g. a service brake which de-energizes strong braking and de-energizes weak braking. Influences can also be influential, so that, for example, too high a braking effect reduces the actuation position, and self-strengthening effects can also be involved, which can be taken into account in the design. It is also possible to include all torques and forces as properly related to each other, such as self-strengthening or mechanical losses, and to preferably include different conditions, such as alterations with lining wear, temperature or aging.

Possible advantageous features and embodiments of the braking device are listed below. The features which are described below can be but must not be features of the braking device according to the invention. The braking device according to the invention can comprise and/or indicate the features listed individually or in combination i.e. in any combination.

That non-linearities and brake control can be designed in such a way that any part of the lining wear or any wear adjustment, which has not yet been executed or has not been executed correctly, can be compensated for by the brake actuator and/or that the brake actuator assumes such positions as to affect a correction and/or to correct these lining position deviations which have not been adjusted.

That between the scanning of a cam (e.g. by a roller) and the generation of a rotary motion (which e.g. rotates on a spreading part), that there are no further transference parts influencing the motion sequence apart from a lever, i.e. that e.g. the roller rolling on the cam is mounted directly on the lever without e.g. a connecting rod, tension transmission etc. being interposed. Of course, this applies to parts which are not necessary for cohesion, such as a pin in the center of the roller, roller beads for roller bearings, rings of bearings, etc.

That in the case of a spring-actuated brake, in particular a parking brake, the transference, which is variable via the actuation, runs in such a way that the brake can be released with the brake actuator against the spring action even if the air gap is incorrectly adjusted, or that also especially in case of extreme maladjustment of the air gap, such as e.g. absence of the friction surface (e.g. brake disc, brake drum, brake rail), the brake can be released against the spring action, which can be necessary e.g. in disassembled status or during assembly.

That in the case of a spring-applied brake, in particular a parking brake, the transference which can be altered via the application runs in such a way that even if the air gap is incorrectly set, then the brake can still be released with a device against the spring action, or that even in particular in the case of an extreme incorrect setting of the air gap, e.g. absence of the friction surface (e.g. brake disc, brake drum, brake rail), it is still possible to release the brake against the spring action, which can be necessary, for example, in the dismantled status or during assembly, whereby the device can be, for example, a screw, a screw-locking attachment on a moving part, such as, for example, the gear shaft or the cam etc.

That in a spring-actuated brake, in particular a parking brake, there are several positions in which the brake remains without torque which is generated electrically by the actuator, e.g. both in the released status and in the braked status, and that for the alteration of statuses an additional torque must be applied, e.g. via the brake actuator or e.g. via a part which is accessible from outside the brake. This can be utilized e.g. as a "bi-stable parking brake", which thereby remains in the parking brake status without power supply, can be altered to the braked status or unbraked status with power supply and remains safely in the released status by switching off the power supply, whereby the switching off of the power supply can take place e.g. outside the brake or e.g. inside the brake and can also switch off e.g. only parts of the power supply, such as for the brake actuator.

That in a spring-actuated brake, in particular a parking brake, the spring actuation without torque which is generated electrically by the actuator only achieves a braking effect below the full braking effect and, with torque generated electrically by the actuator, a higher braking effect is thereby generated.

That in a brake which is essentially actuated by spring force and essentially released by the brake actuator, the non-linearities with the mechanical and geometric constraints can be designed in such a way that, in the released status, only the maximum holding torque necessary for safe spring actuation is required up to none at all and that, if necessary, a release movement with the brake actuator is also possible when there are completely worn linings present or up to no linings or disc, drum or rail at all.

That the friction surfaces can have any shape, such as discs, drums, rails, or that the relative movements to be braked can be rotating, linear or arbitrary.

That an expanding member including a bearing, if any, and one or more primary brake shoes are mounted on a movable member in such a manner that a brake applied by This means that the movement of the brake shoes caused by self-enforcement does not lead to any relative movement between the spreader and the brake shoe.

That the brake shoes of a drum brake are spread apart with a spreading part, in which in each case the contact point, of the pressing-on part against the shoe, follows the shoe movement as closely as possible.

That at least one wear adjuster is available or that the readjustment is actuated with the brake actuator.

That for readjustment, a part is moved, e.g. a lever is pivoted and this pivoting can also affect e.g. the actuating cam or also e.g. the entire actuating assembly with motor.

That the readjustment can also be executed with e.g. fluxes or the lining press-on force is executed via an intermediate element with flux.

That any preferred vehicles and devices are equipped with this brake, such as cars, commercial vehicles, buses, aircraft, trailers, elevators, machines, position holding devices, emergency stop and safety devices, device shafts such as propeller shafts on wind turbines, ships and others.

That, after applying different approaches to quality assurance, concrete correction values for individual parameters describing the behavior of the brake, such as the size of the air gap or stiffness parameters, are finally determined and therefore taken into account in calculations from this point on and until more recent values are available.

That in the brake control electronics, it is taken into account that recorded actuator data, such as motor current, are subject to fluctuations due to geometric irregularities of the friction surface, which indicate a pattern dependent on the speed when the friction surface rotates, and this is reflected in the data interpretation.

That this pattern is utilized in order to detect contact between the friction surface and the brake lining.

That friction surfaces are equipped with geometric irregularities in order to be able to detect a contact with a brake lining.

That the mechanical losses in the brake application (in particular e.g. also the static friction) are reduced on a case-by-case basis or permanently by vibrations or the like when evaluating the actuator torque (e.g. for determining the lining press-on force), i.e. e.g. vibrations from the operation of the brake, or of the object to be braked, assist to reduce the friction in the brake application and/or to overcome the static friction by "shaking", respectively to overcome the static friction or that such vibrations or oscillations are intentionally induced, e.g. with the brake actuator, whereby statistical methods can also help to calculate or suppress the deviations caused by vibration or "shaking" in measurements. Other known effects can also be taken into account, such as e.g. the current consumption caused by accelerations or distortions in the mechanics and/or the actuator, in order to obtain overall measured values which are as free as possible from mechanical losses on the one hand, but have as little influence as possible from vibration or oscillation on the other.

These values can be processed arbitrarily, e.g. statistically, e.g. as angle-torque pairs or only as many measured values, in order to determine or calculate the mechanical losses, e.g. to apply a certain kind of averaging or e.g. low-pass filtering over all measurements. Also e.g. different vibration levels can be utilized or induced, e.g. In order to determine different contributions of mechanical losses, e.g. thereby affecting different parts differently or to increase accuracy. Using vibrations in order to overcome friction, especially static friction, is well known in actuators in order to execute even small adjustments. It is therefore proposed here to apply this principle to measurements in order to determine values which are as free as possible from friction, especially static friction in brake actuation. These measured values can also be compared with stored ones, for example, in order to obtain one or more values from the multitude of values and/or comparisons, such as mechanical losses or actuator torque.

That a force control or a path control or a combination of both or an alteration between these controls is utilized and e.g. an instantaneous force-displacement characteristic of the brake is assumed and, e.g. in case of alterations at the brake actuator setting, it is switched to a position control by means of this instantaneous force-displacement characteristic curve and then, if applicable, e.g. is altered again to a force control, or that e.g. both types are operated simultaneously and by means of a (also variable) weighting of both a certain respective proportion is utilized.

That different parameters, which can be utilized in a complementary manner for brake control, are utilized in combination in such a way that one parameter represents the actual control variable for which a specified setpoint value, which corresponds to the current brake performance requirement, is achieved as accurately as possible by the electronics, in order for quality assurance, to additionally derive value ranges for one or more parameters from the current brake performance requirement, which value ranges must not be exited during the setting process for the control parameter. For example, a force control which is based on the effective motor current and the local transference ratio can therefore be the actual control and, additionally, a range for the permissible motor position can be defined, therefore avoiding serious maladjustments.

The statuses or measurements on the actuator utilized for detection can also be utilized for purposes other than those directly relating to braking, such as a stop which, when reached, can be utilized to find an initial position or, for example, a wear position which can be distinguished from a position for determining the initial position, e.g. by measurements on the actuator by different actuator torque, and can therefore fulfill, for example, two functions, e.g. Initially serve as a means of determining an initial position when, for example, a smaller actuator torque is applied and, with additional actuation in this direction can, for example, cause a wear adjustment and/or also influence the extent of the wear adjustment which is therefore present.

That the electrical or electronic brake control or brake regulating lowers the electrical energy and/or the electrical current (or an effect-related quantity such as power, torque, heating effect, etc.), which is required to hold a position (or e.g. an actuator angle) or a position range below the value required to achieve the position or position range, which e.g. in the case of a spring-actuated parking brake would lower the current required to hold it as released and/or that e.g. an operating range for longer braking is operated with lowered current. This can also be caused by the characteristic of actuator control without consciously causing it, e.g. when a proportional controller sets only little actuator current at an exact position or small deviation and sets more current at s larger deviation. Of course, additional uses can be helpful, such as using the range of static friction in such a way that static friction allows position holding even with a smaller current, or performing alterations e.g. in a minimally erratic manner, i.e. e.g. for example, in the case of a small alteration in position in the direction of a higher actuator torque, the current does not continue to increase, but a small jump (which, for example, could not or hardly be traceable for the braking effect, but is in any case accepted here) in the position or the actuator angle is made and then the current-lowering advantage of the static friction is utilized again. Here it is recommended that any method which uses the current reduction possibility by using a certain status in that range where the mechanical losses make it easier to retain a position. For this purpose, one can e.g. also insert current sinking tests to observe whether the position (or a position range) is maintained, or one could e.g. intentionally approach a minimally wrong position in order to then achieve the target position (or one close to it) by current sinking. A current value (or e.g. a value of an actuator torque), which just permits a position hold, can also be included in the determination of the mechanical losses, for example. Of course, predictive methods or knowledge-based methods can also be utilized for this purpose, such as preferring to set a point of lower power consumption on the non-linearities where, for example, the braking effect is not different or is hardly different.

That an input current reduction (e.g. DC supply) to the actuator control electronics is achieved by operating the actuator with a lower rpm speed than would occur without the intended input current reduction, in order to be able to reduce the average voltage which is applied to the motor by the electronics, due to the lower voltage generated by the running motor, while the input voltage to the electronics continues to correspond to the approximately constant supply voltage (where "current" also includes effective likewise magnitudes).

That this is utilized e.g. to keep e.g. an overload or a preventable high load away from a power supply and e.g. can also therefore affect several EMBs and/or this can also be communicated e.g. to or between the EMBs.

That short-term peaks of the actuator current supply, which are caused by highly dynamic motor controls, especially in the case of abrupt alterations, jerks and strong alterations of the motor position command, can be prevented by limiting the rates of alteration of the preset value for the torque-generating motor current without thereby causing a significant slowdown for the overall motor actuation.

That measurements such as brake actuator torque, brake position, brake rpm, brake speed with sign, temperatures are recorded several times, treated with statistical and mathematical methods (e.g. averaging, grouping according to various criteria), compared with stored values and with each other, and that, from them, statuses about the current condition of the brake are obtained, such as wear to be adjusted, air gap size, brake stiffness, lining material thickness or error messages, error entries, warnings, data to the environment and also the driver.

That the brake can receive signals from external sources (e.g. brake control, sensor data, parameters, software) via wire, wireless, radio, Internet, telephone, infra-red etc. and can transmit data to the outside environment via wire, wireless, radio, Internet, telephone, infra-red etc.

That information about the current braking effect, such as e.g. measured decelerations, overrun effects or current consumption of the brake actuator, is to be converted into signals which provide the person, who is controlling the braking, with feedback about the braking effect achieved, and that these signals can also be easily transmitted to the said person by sensor, such as a dynamic resistance directly on the brake lever or pedal e.g. via electric motors or magnets, or via other modulable signal forms, such as vibrations or noises.

That sensors exist which detect contact between the friction surface and the brake lining indirectly, such as via vibration or sound waves.

It can be understood within the context of the present invention that lateral compensating movements are not to be minimized as a matter of principle, rather that they can either take place harmlessly in intentional lateral play, or even be intentional in order to follow geometry alterations. The compensating movements which can be allowed in the braking device, if applicable, on the one hand convert operating energy into unwanted friction and on the other hand they can be a wear problem, depending on how often, at which press-on forces and with which materials they occur. When, for example, few full braking operations are assumed, then the wear due to compensating movement can be insignificant for these. When the air gap is traversed very often before the lining is applied, then the wear due to compensating movement can still be insignificant when hardly any press-on force is required, e.g. only against a spring.

If there is small lateral play (as proposed here as a possibility), for example, then the lateral compensation movement can be absorbed by the play or tolerance which exists and therefore wear, which is due to a scraping movement can be prevented which can be applied, for example, in the area of very frequent normal braking.

The loss of operating energy due to a lateral scraping compensation movement can be estimated, for example, when it is assumed that, for example, a lining contact pressure stroke of, for example, 2 mm is applied and, in the process, e.g. 0.2 mm of unwanted frictional compensation movement takes place with a metal-to-metal coefficient of friction of, for example, 0.1: Then the lateral force would only be $\frac{1}{10}$ of the lining press-on force and the lateral movement would only be $\frac{1}{10}$ of the lining contact movement and therefore the energy loss would only be roughly 1% of the operating energy.

Figures 29, 30:
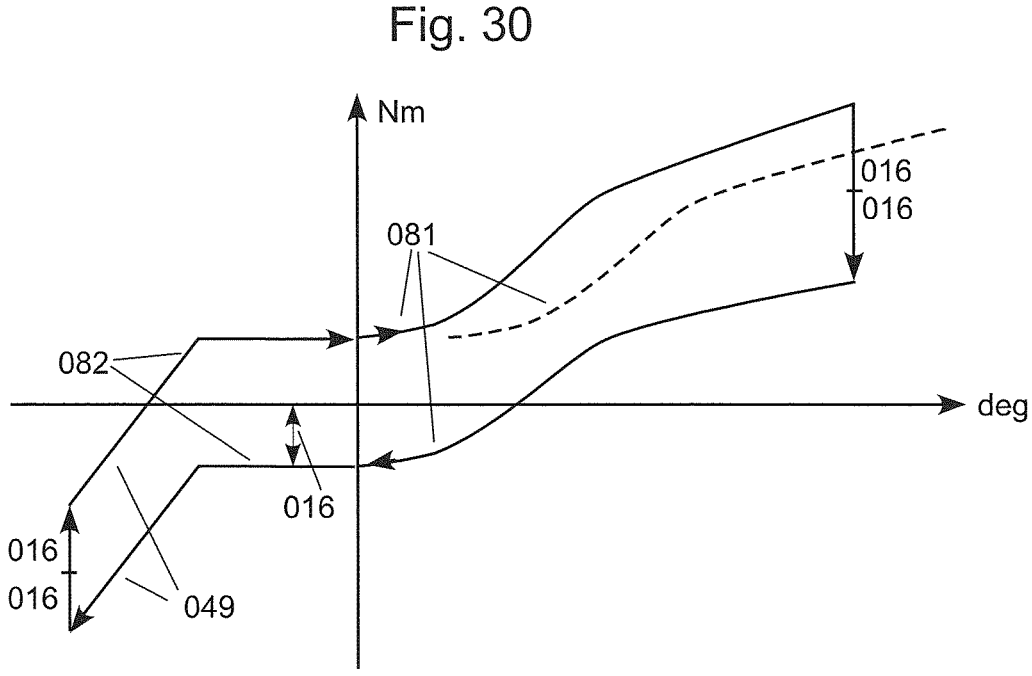
FIG. 29 illustrates exemplary components of the brake device according to embodiments of the present invention.
FIG. 30 illustrates the operation of various components of the brake device according to embodiments of the present invention.

Control, Mechanical Losses:

The process described in FIG. 30, for example, can of course also be modified with the aim of determining the status, e.g. by omitting or altering the sequence, and the processes can run abruptly or arbitrarily, e.g. sinusoidally or s-shaped (e.g. speed sequence or movement course), although they can also be superimposed on the movement course (e.g. by speed alteration, current alteration, also up to brief switch-off and/or even current direction reversal). The processes do not have to be selected from this procedure, although they can also be utilized from those which are caused by other means. For example, a "brake release" can be utilized by the driver in order to observe actuator acceleration. In particular, it is known that "in sum no energy can disappear or be gained", based e.g. on the fact that the signed sum of torque from mass inertia plus torque from brake actuation plus torque from losses plus torque from the actuator plus torques from others (e.g. springs) must always equate to zero. In particular, it is proposed that intentional alterations or unintentional alterations (e.g. from the actuation) on the conversion of the energy form are also investigated: For example, intentional accelerations (and/or decelerations) could be inserted in an actuation speed to determine the reaction, or the accelerations (or decelerations) do not have to be inserted intentionally, rather they can also occur "by themselves" or, for example, be executed by the driver. This now brings us to the general formulation for the procedure: Every actuator movement and/or alteration of it can (should) be examined for conversion of the energy form and, if applicable, including the conversion into losses, in order to find parameters for the procedure such as e.g. total losses, partial losses, expected actuator values at certain braking etc. In particular, for example, the motor torque (or, e.g., the torque-generating current) one can compare this with the known mass inertia, the suspected and/or from measurement, closed-loop clamping force from the brake, known spring effects and possibly other known effects in order to be able to find out how the desired influence quantities (e.g. losses) must be (or are assumed to be) in order to explain the actuator torque curve, possibly taking into account the transformation of the energy forms. Of course, one can execute this in order to obtain a wide variety of results, e.g. to explain the motor torque curve for certain actuator observations. In general, one can considered it, for example, as finding an explanation for an observation. One could also designate it as a transformation: In the case of a Fourier transformation e.g. a temporal amplitude course is transformed into the strength of frequencies, here e.g. a temporal course of an e.g. actuator torque is transformed into parameters (e.g. losses), which are seen as co-determining for the course. For control and/or regulation (both terms are utilized here equivalently, except when the difference is pointed out) sensors were utilized in the past, mainly for e.g. the press-on force. This is of course also possible here, but in addition—when sensors are necessary—it is recommended to utilize them for the right purpose, namely the braking torque. Patents for "sensor-free" control (without force sensors or torque sensors) also exist of course, in which the actuator motor current is mainly utilized to infer the press-on force. It is therefore recommended that the known acceleration of the mass inertia is calculated out in the process. Disrupting are still subsequently the unwanted mechanical losses (since they make the relationship between motor current and press-on force inaccurate), which, as far as they are known, should of course also be calculated out, which is also recommended here. Deviations of the control behavior of the real brake from the planned and/or theoretical one should of course also be detected, there are of course patents also for this, in which measured values are compared with stored ones and these obvious methods are of course also recommended here. Since the losses in the direction of actuation thereby increase the actuator torque and, in the direction of release, less torque is applied to the actuator by the losses, then it is hereby recommended to use this difference as a measure of losses (strictly speaking double losses in case of reversal of direction), but in a different way than it is already known. It is known that for this purpose a real operating behavior is compared with a stored one, which is also possible here in principle. Here, however, it is additionally or alternatively proposed that in particular also NO comparison with stored is interesting, because a comparison with stored is always connected with the problem whether the stored behavior arose under the same conditions as the currently measured behavior. Of course, one could store many behaviors and subsequently select the most applicable one, nevertheless the problem arises whether really, under ALL conditions, the same was stored, and there can be also many factors, which have more or less influence and whose influence were not or not completely considered with storage.

Therefore, it is also proposed here that the difference between releases and actuations is utilized as a measure of losses, but without reference to stored. However, this can add an additional new task: The actuation and the release can be delayed to the extent that the brake has altered (e.g. due to thermal expansion) and a difference would be formed from more or less incoherence. Against this, firstly, it is proposed that the alterations are kept small and, for example, that a difference is formed only in the air gap, in which no heat input is yet formed. Secondly, it is recommended to retain the time and therefore the alteration as short, so that e.g. a minimal release can follow directly after the activation, which can also be so small that it is imperceptible, because it is only about the difference between activation and release, or one shifts with the activation minimal and release easily, or one can also build in minimal reversals of direction during the activation, also in such a way that the reversal can be imperceptible. Thirdly, it is proposed that "a not particularly accurate determination is still better than none", which in this case means using braking events where, for example, no particular alteration occurs in the brake, which were, for example, the many light braking events where, for example, no intense heat occurs. In the fourth instance, it is proposed that braking can be compensated for similarly to the third case, that e.g. heating and thermal expansion are known or can be modeled and e.g. the influence of thermal expansion is calculated out. As this is particularly interesting here, it is also proposed to make actuator movements for difference formation, which are not intended for and/or do not cause any significant lining movement. It would be helpful, of course, when one could expect a known torque or a known course over the actuator movement. With regard to the known sequence, it is proposed here that the curve of the actuator torque is detected from the time of contact with the lining and therefore the actuator angle with contact can be concluded. An obvious method is also already known, whereby a behavior will be determined during an initial movement of the lining carrier against a spring. In fact, and in such brakes, there are often springs present which press the lining back or hold the mechanics together, and their use for calibration seems obvious when the spring action is known. In the case of passenger cars, for example, the clamping force of a front wheel disc brake is roughly 35 kN. Statistically, the vast majority of braking operations take place at roughly ⅓ to % of this, i.e. at roughly 9 kN. Up to, and roughly within this range, one would like to control therefore e.g. the brake relatively exactly, in the case of full braking, ABS or ESC would help here. One could affect particularly weak braking (e.g. on black ice) with roughly 3 kN clamping force. When one now installs a spring with a few kN in the lining actuation, then it would actually be possible to generate the lowest real lining forces (transferred to the actuator) at which calibration could be executed against real weakest braking. Such a spring was naturally additionally tensioned during further braking and would cost additional operating energy and mean another actuator size. In addition, however, such springs would take up considerable installation space and cost, and one will try it with weaker ones. However, it should be borne in mind that the floating calliper can jam slightly to severely and is thereby exposed to additional forces such as cornering force or vibrations. With roughly 10 kg floating calliper mass, rust, dirt, cornering, shocks, these forces can easily go into the hundreds of Newtons and a spring of this magnitude can cause, in the worst case, even worse than no expressive power, it could be namely the "measured", interpreted as spring force and, following on this assumption, one could therefore trigger a significant malfunction of the brake.

Therefore, regarding calibration of actuator torque measurement, another method is also proposed here, which does not have the above problems:

Firstly, at least one measurement combination of actuator angle (or a meaningful measure such as position on a part which is motionally coupled to the actuator) and torque (or a meaningful measure such as current, power, force etc. on the actuator or a part which is motionally coupled to the actuator) are made from at least one motion, and secondly, it is provided that this motion is free or poor in disturbing influences, and thirdly, the measurement can be interpreted conclusively, e.g. to improve the accuracy of the actuator torque measurement or to determine losses. A calibration spring has already been proposed above, which can be in an actuator rotation range, for example, which does not e.g. make any or no appreciable lining stroke. This therefore prevents disturbing influences (see e.g. above) from the lining stroke such as forces. Losses can be measured along the path to the spring guide, see FIG. 30.

As shown in FIG. 30, when a negative angle was applied, the actuator overcame losses which were also negative because of the negative direction of rotation. When no force is taken or added for other purposes, then the actuator torque now corresponds to the losses and can be detected immediately, even without difference to another direction of rotation. These are considered to be "idling losses", e.g. of a motor transmission unit. These can vary due to, for example, different location or toughness of the fat, so it is favorable to know the instantaneous value. Loss fluctuations can also be detected in the course of rotation. The spring characteristic curve can be recorded from the spring guide and also compared with the spring characteristic curve of the actually installed spring or, for example, angular points on the spring characteristic curve are connected with a resulting torque from the spring. For example, if this spring is in the rotational motion of the non-linearity, in contrast to the spring discussed above, the spring can be relatively small in the lining stroke and still produce appreciable actuator torque because further translation between rotation of the non-linearity and lining stroke greatly increases the press-on force. "Considerable" can therefore mean that e.g. roughly that actuator torque is generated which later corresponds to e.g. a usual and/or light or defined brake actuation and one knows already now which torque will be expected at actuation, also with the problem of the losses (which were already included here). This spring also does not require useless tension energy in the braking operation. It does not have to be a spring either, it can also be e.g. a rubber or an end stop, for example. An end stop would cause very high distortion forces when driving into the end stop (e.g. In order to find it), which a spring or rubber with lower distortion forces can do. It does not have to be an explicit part, rather an existing or arbitrary part can be utilized, also "nothing" would be possible in the sense which the actuator does not move further in this direction. Also e.g. torques which occur when operating a function (e.g. a wear adjuster) can be utilized in this case.

Something which can be found by the actuator torque (e.g. End stop, spring, rubber etc.) is also recommended here in the sense that an initial position can be found and/or determined at the same time.

When the actuator now rotates back towards the starting position, then the losses are now suddenly in the other direction of the torque, and when the direction of rotation alters, then the losses are in principle twice as high. This process can run e.g. when a brake is switched on and e.g. provide the following statements: how large are idling losses, also with possible fluctuations, also possibly dependent on the direction of rotation, where is an initial position or e.g. angular reference point (however called), how large will the actuator torque be when a certain, e.g. weak braking occurs? However, since it does not trigger braking, the procedure can be executed at will, except possibly during braking.

Of course, it is also possible or useful to record an actuation characteristic of the brake (e.g. actuator angle and actuator torque, also with the difference actuate—release) also up to the range of lining press-on forces, e.g. when the vehicle is at a standstill, or also to utilize a normal braking process as a characteristic recording.

For the determination of losses, it is also recommended that another known force can be utilized alternatively or additionally to the spring: The mass inertia force is determined to a large to predominant part by the motor due to the higher share of the fast-rotating parts with the square of the transference ratio (the slower parts can of course also be taken into account). This makes it possible, for example, to apply a certain speed variation over time in a range without significant lining stroke (others are of course not excluded), in order to measure the actual behavior, and therefore to measure the torque going into the load carrying capacity, which, however, still contains mechanical losses in the measured value. If the theoretically necessary torque is subtracted, then the losses still remain. This calculation can of course be executed in any other way which describes the same physics, e.g. time for certain motion, motion in time, torque and time etc. For load-bearing based loss detection, of course, any other physical quantities involved can be utilized, such as for example energies (rotation, losses, etc.).

With what has been done so far, it would not be (easily) possible to separate the losses (up to this point also called mechanical losses) from the electrical input to the contact pressure on the lining, whereby the described procedure with the current-torque relationship therefore assists a lot. Therefore, a method is proposed here, which can also determine the division of losses between mechanical and electrical: in the above case, two forces are already shown, which act purely mechanically (others could be imagined in addition, of course): the spring and the mass inertia. When now only these act, e.g. in unpowered condition, then the electrical losses are switched off and one can distinguish between a system with electrical losses and one without and therefore distinguish these two losses. Of course, the question remains whether an unpowered motor possesses no electrical losses at all, but this does not have to be clarified scientifically, only applied practically. Another "de-energized status" can also be utilized for reaction measurement, e.g. reversal of direction or brake release. Instead of "current-free", the status of different currents can also be compared and therefore a "current-free" status can also be calculated. "Current-free" does not have to be exactly 0, rather it can be any suitable value. When the same force is applied many times in the same distance in a shorter time, then proportionally more power is required.

It is hereby recommended that something similar be utilized in order to determine electrical losses (or to determine the split between mechanical and electrical): When a movement of the same energy takes place in a different time, then there is a correspondingly different power and one can determine or estimate the losses at different powers from at least two such procedures. This can be extended mathematically so that procedures with different energy can therefore be compared. "Energy" in this case is only a physically meaningful expression, other values can be utilized in order to achieve this principle.

When a brake actuation now takes place, then one will find e.g. increasing actuator angles with an actuator torque curve and can also already always compare how the respective actuator torque (including instantaneous losses) behaves with respect to the spring characteristic curve, whereby in the FIG. the spring characteristic curve has the opposite signs (the signs must only be correctly taken into account or e.g. calculated unsigned for this case). The known non-linear transference ratio can also be utilized in order to draw very precise conclusions about the contact pressure of the lining, since the losses are also well known. In addition to the "idling losses", there can be additional losses up to the point of lining contact pressure, but these can be more dependent on press-on forces than on fluctuations (e.g. due to grease viscosity). Therefore, they can be well calculated or extracted or also recognized, e.g., in dependence of the influence quantities, as shown below. Of course, the actuator torque curve does not have to correspond exactly to the planned curve, the measurements can also show the dashed curve. Then it can be recognized that the contact point (at which actuator angle the lining comes into contact with the friction surface) is different than planned, e.g. due to lining wear and a wear adjustment can be requested. When the brake is released, the curve again jumps down by twice the losses, at least under the assumption that nothing affecting the relevant conditions in the brake has altered, which could indeed be the case, for example, when braking has taken place without e.g. significant heat and/or thermal expansion and/or wear. These losses, which are visible here, are now not only the idling losses, rather also include all the others.

What is referred to here as "jumping losses" when the direction of rotation is reversed, in reality take place within relatively little actuator angle alteration, especially when constant load direction (e.g. lining press-on force) "pushes" the clearance out of the mechanisms and the clearances are essentially on the same side.

A non-linear brake, i.e. with a transference ratio which varies over the lining stroke, is recommended as advantageous when it operates over the lining pressure with an actuator torque which does not vary very much, because the torque range in which the spring characteristic is compared, is then relatively limited. In contrast, the actuator torque of a linear drive unit (e.g. ball screw) varies extremely from air gap to full braking. Particularly recommended is also a non-linearity which is divided into areas because this facilitates the implementation of, for example, an area without significant lining stroke.

Brakes with several, very different springs are shown in the figures.

Now, one can recommend everything with regard to the calibration spring and the loss detection (e.g. in the area without significant lining stroke), also of course as utilized with any number of springs, because it is always a question of the sum of the torques (at the same point) with the correct sign. Such brakes always have at least the torque which the brake needs to apply, the torque of the electric motor (which actuates) and the torque resulting from mass inertia. With springs or other energy storage medium or sources, new torques are simply added with the correct sign and everything mentioned above applies analogously with more torques. For the sum of the torques which an actuator motor must apply, it is irrelevant how many torques are in the sum.

There can also be a rotary position sensor directly on the actuator motor, e.g. for a brush-free DC motor (BLDC). It is also recommended that this sensor can advantageously also be utilized in such a way that, in the event of failure of this sensor, actuation of the BLDC motor is no longer possible and the brake therefore goes into a safe status or desired status, for example.

In finding the position (e.g. angle) of the actuation snail, there can still be an inaccuracy when, depending on snail torque, the snail angle varies, which would be the case e.g. when using a spring. In this case, one would find the position, for example, at a certain torque or torque range. Alternatively or in addition, it is also proposed to utilize the fact that the known gear ratio (e.g. gear train of the motor) provides a relationship between motor angle and snail angle and therefore only possible positions and not all others are utilized to determine the exact snail angle when finding the initial position of the worm gear. Therefore, for example, the knowledge can be utilized that at a certain motor angle, the correct starting position of the worm gear must be known, but the motor angle can be unknown by e.g. integer revolutions to it, but then, if the integer ratio was known, the snail angle is therefore very exactly related to the motor angle.

For e.g. safety reasons or e.g. for time reasons (when the above finding of an initial position e.g. took too long) at least one more position sensor can be recommended, e.g. an angle sensor located on the actuation-worm gear.

The following is proposed in order to additionally increase the accuracy of the brakes: Absolute accuracy, especially in the range of weak to common braking, is required above all for so-called blending, when, for example, a total braking torque has to be composed of regenerative braking and friction braking, and therefore a certain setting accuracy is always required from the friction brake. To this end, it is recommended that for quickly observable responses, e.g., when the blending composition is altered (e.g., when regenerative braking becomes weaker as speed decreases), one reacts to unexpected deviations, such as when wheel slip alters even though the total wheel braking torque was intended to remain the same, or whether wheel slip alters differently than expected when, e.g., the total wheel braking torque is altered. Comparisons between such responses are also recommended, e.g. wheel slip on at least two wheels. Of course, one can utilize statistics for this, so that one does not immediately alter the brake parameters for every difference in wheel slip, because, for example, different road conditions could lead to different slip or reactions for a short time.

For longer braking processes, it is recommended to also utilize the following simple physical facts: A friction brake must convert just about all of its mechanical power into heat, whereby mechanical power is braking torque times angular velocity. This means that one can compare e.g. two brakes (e.g. left and right opposite each other) by means of simple temperature measurement on same brake performance, whereby one measures the temperature as close as possible to the creation point, from installation reasons of a temperature sensor but, however, probably at a suitable installation location, in any case somewhere in or on the brake. In the case of correspondingly different temperatures and despite the same and/or similar assumed braking power, the settings of the brakes can be altered and a correction can also be utilized for the future. In principle, any sensible alteration of the brake setting is conceivable, e.g. one can reduce the warmer one somewhat in the braking torque and/or increase the colder one somewhat, one can also utilize physical or other (e.g. empirical values) to determine the "something" more precisely or one can also utilize any kind of determination (e.g. models) to decide which one should be increased or decreased. Learning responses can also be favorable, e.g., learning from success (e.g., acceptance of temperatures) for which approach is judged favorable.

The actuation snail can also be utilized in both its directions of rotation for e.g. different service braking: e.g. one direction could come into full braking faster (e.g. emergency braking), but the other direction could need e.g. less current for longer weaker braking or e.g. one direction could cause less stroke (for unworn linings) and the other direction could cause more stroke to come into use e.g. from certain lining wear.

A calibration spring placed wherever (or e.g. the lining-free springs) can be utilized to calibrate the motor torque as above, e.g. in the air gap area. Different starts and courses of the two actuation snails (service brake, parking brake) can also be evaluated to increase accuracy. Here, too, another drive unit can also be involved, e.g. a cable pulley for safety reasons, which only becomes effective, for example, when the driver e.g. continues to pull the lever or press the pedal in the event of a failure. A cable pulley can also cause and/or loosen a parking brake.

It can be advantageous to move the two brake linings with different strokes, so it is proposed that the stroke can also be made favorable over the movement per lining. This can be advantageous, for example, when the brake shoes develop different braking effects, as in the case of self-energizing drum brakes such as e.g. Simplex.

The motor of the brake actuator can be mounted, for example, in a drum brake or disc brake, on a drum brake or disc brake, the braked motion need not be circular, rather can also be rectilinear or otherwise, braking, for example, such as in an elevator car.

That the linings are lifted off the friction surface in such a way that an air gap is created.

That an adjustment facility is provided for correct position of the brake linings (e.g. air gap on both sides) or that this adjustment is made automatically.

Additional features in accordance with the invention can be derived from the claims, the description of the examples and the figures.

The invention will now be additionally explained by means of exemplary, non-exclusive and/or non-restrictive export examples.

Unless otherwise specified, the reference signs correspond to the following components: Brake 01, brake disk 011, brake drum 012, losses 016, 1 g braking 017 (e.g. g/3=017/3), target braking effect 018, wear readjustment 02, spring for wear readjustment 021, slipping clutch 023, carrier 025, toothing 026, adjusting lever 027, friction in wear adjustment 028, non-linearities 03, actuation cam 032, roller in addition to this 033, cam rotation axis 034, spring support 039, recess for ratchet advance 0311, cam track round 0321, cam track pointed 0322, cam lift 0323, cam radius 0324, cam radius shifted 03241, flat cam track 0325, permitted pitch 032221, roller small 0331, actuator 04, Motor 041, actuator spring 042, motor electronics 043, calibration spring 046, parking brake actuator 047, parking brake position 0471, parking brake spring 048, calibration spring characteristic 049, rotatable bracket 0411, measurement data from actuator 0431, contact pressure 05, Spreading part 051, spreading part drive unit 052, unbraked position 053, braked position 054, S-Cam 056, spreading part pivot 057, spreading part pivot axis 0571, connection to actuation 058, contact pressure movement 059, spreading part lever radius 0511, rotated press-on surface area 0591, non-rotated press-on surface area 0592, friction pairing 06, Brake lining 063, carrier force measurement 064, brake shoe 067, air gap 068, brake shoe support 069, spring(s) for air gap generation 07, wear readjustment actuation 08, area utilized for braking 081, area not utilized for braking 082, fixed part (e.g. wheel bearing part) 09, vehicle stability function 106, position of non-linearities without lining stroke 111, wheel suspension 13, contact point with enlarged air gap 1502, contact point with reduced air gap 1503, increased constant losses 1504, actuator torque in air gap 1505, increased percentage losses 1506, lining displacement force 1507, stability influence magnitudes 1603, model input magnitudes 1604, calculation model 1605, actuator magnitudes 1606, function of time 16051, friction coefficient model 16052, air gap model 16053, stiffness model 16055, miscellaneous models 16056, service braking 16061, parking braking 16062, wear readjustment 16063, initial position 16064.

FIG. 1A represents a brake 01 in which a friction pair 06 is pressed on by an expanding part 051, for which purpose the expanding part 051 is rotated about an expanding part pivot 057, with an expanding part lever radius 0511, and which thereby causes a press-on movement 059 (right) over the rotated press-on surface 0591 onto the non-rotated press-on surface 0592. The rotated press-on surface 0591 will preferably be a circular or cylindrical segment, the non-rotated press-on surface 0592 will preferably be, for example, a surface conceived as flat, but can also utilize friction reduction by co-rotation, i.e., be designed as a rotating roller surface, for example. The contact pressure movement 059 does not have to be in a straight line, but can more or less follow an already existing movement, which can be created, for example, by the rotation of a brake shoe around a support point or, for example, by deformation of parts such as brake callipers. Strictly speaking, the contact pressure movement 059 describes a curve (or straight line) on which the contact pressure point (the contact pressure line) of the rotated contact pressure surface 0591 moves onto the non-rotated contact pressure surface 0592. To this end, "lateral play" can allow for lateral movement which is substantially normal to the contact pressure movement 059 in the plane of the drawing (i.e., substantially upward or downward in FIG. 1A). The contact pressure movement 059 will advantageously lie in a plane approximately normal to the spreading part rotation axis 0571, but can also act differently, for example approximately parallel to the spreading part rotation axis 0571.

The rotational movement of the spreading part 051 is supplied by a non-linearities 03 (translation with a transference ratio varying over the actuation path), where, for example, a roller 033 can follow an actuation cam 032 and rotate the spreading part rotation axis 0571 via, for example, a lever. For how the lever movement is taken from the cam curve, many possibilities are possible besides a roller 033, e.g. instead of roller 033, a part on the lever can slide on the cam or make a rolling movement, so that e.g. a lever surface interacts with the cam curve in such a way that they roll off each other ("rolling lever"). Preferably, there is no further part between the sensing part (e.g. roller 033) and the lever which influences the motion sequence, i.e. preferably the sensing part (e.g. roller 033) is fixed to the lever, mounted, or rolling, among other things to save costs, installation space, complexity, additional bearing points. Parts influencing the motion sequence are e.g. disruption-relevant pulling or pushing devices. Fastening parts such as bearing bolts in roller 033, rolling elements, bearing rings are naturally not affected.

The non-linearities 03, e.g. the cam rotation axis 034 (or e.g. a toothing 026 on the cam or e.g. a driver 025) is driven by an actuator 04, which in turn can comprise an electric drive and further components, such as further non-linearities 03, and energy stores such as springs, which can also be structurally separate from the electric drive. The electric drive is preferably operated by motor electronics 043, which can also make measurements on motor data (e.g. current, torque, position, etc.). In an extreme simplification, the actuating cam 032 can also be the same component as the spreading part 051 and therefore the roller 033 can also be the same component as the non-rotated press-on surface 0592, which in this case becomes the same component as the rotating roller surface 033 and executes a compensating movement between the rotated press-on surface 0591 and the non-rotated press-on surface 0592 by roller rotation with particularly low loss and wear.

Figure 1B:
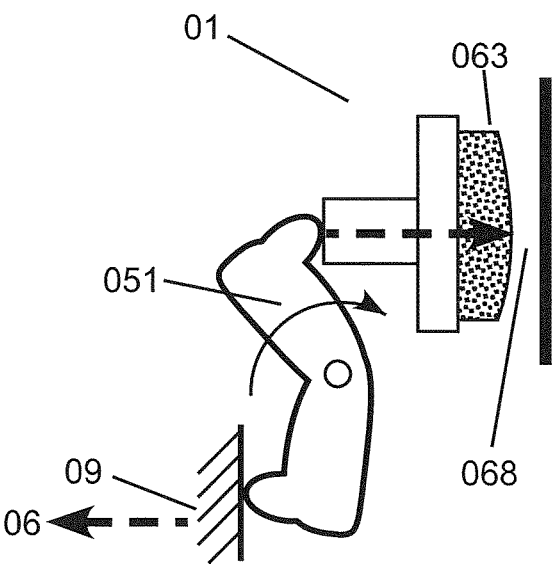
FIG. 1B is a schematic representation of the brake device of FIG. 1A.

FIG. 1B represents the effect of FIG. 1A in a highly simplified manner, whereby, as is often the case, two spreading parts 051 form the spreading part 051, which subsequently actually acts as a whole (the entire spreading part is always referred to as the spreading part 051): from a fixed part 09, which is assumed to be "fixed and the brake lining 063 is ultimately pressed on by the expanding part 051, if applicable after overcoming an air gap 068, against e.g. a brake disc 011, brake drum 012 or any other friction surface (e.g. rail), whereby arrangements on both sides which use action and reaction forces are naturally more advantageous, so instead of acting, for example, on the part 09 which is assumed to be "fixed", it could also act indirectly or directly on an additional friction pairing 06, which is indicated by the lower arrow on the friction pairing 06.

Figures 2, 3:
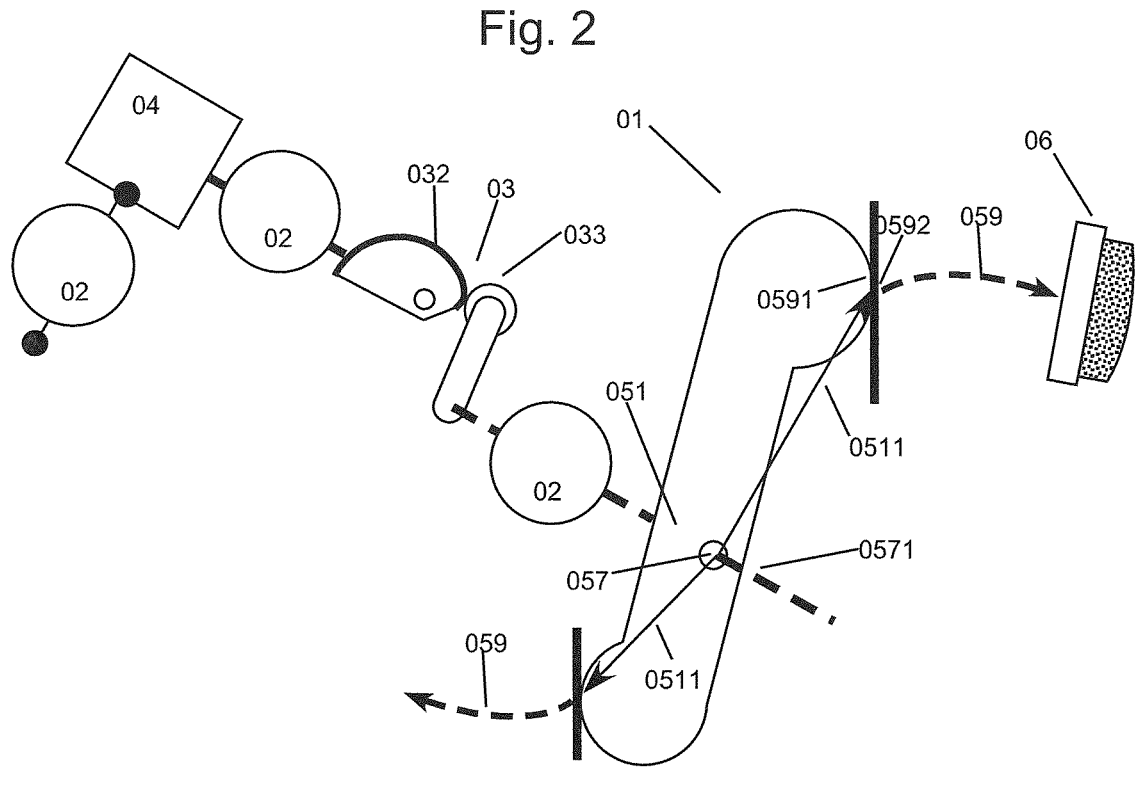
FIG. 2 is an exploded view of another brake device according to embodiments of the present invention.
FIG. 3 is a schematic representation of a braking system according to embodiments of the present invention.

FIG. 2 represents a brake 01 similar to FIG. 1A, but in this case here e.g. with a double-acting spreading part 051 (a single-acting one would also be possible), which here also has different spreading part lever radii 0511 (top, bottom), but above all is supplemented by a wear readjustment 02: A non-linear brake 01 can do away with a wear adjuster when the wear can be covered with the range of motion of the non-linearities 03, or a wear adjuster can also act differently than in FIG. 2. FIG. 2 proposes that a wear readjustment 02 (bottom) could be e.g. Located in the rotating drive unit of the spreading part 051 (which in principle could adjust for the largest wear), but also e.g. a wear readjustment 02 (middle) could be located between actuator 04 and non-linearities 03 (which could e.g. match with a brake 01 becoming stiffer with wear), but also e.g. the whole actuator 04, possibly also with the non-linearities 03, could be altered in position, e.g. rotated, for a wear readjustment 02 (top), whereby of course, preferably only one of the three shown wear readjustments 02 will be present. The actuation of the wear readjustment 02 is preferably derived from a brake actuator movement, whereby the division of the actuator movement into lining contact stroke and/or wear readjustment 02 is also referred to here as non-linearities 03 and therefore this brake 01 preferably has an additional non-linearity 03 to the wear readjustment 02. The spreading part pivot point 057 can be unsupported (resulting from spreading part rotation as an apparent point about which the apparent radii rotate) or the spreading part pivot axis 0571 can be "fixed" or "floating", with the bearing forces preferably being less than the press-on force.

FIG. 3 represents a simple, low-cost approach, the figure represents as a scheme possible drive methods of a corresponding braking system, for example, for trailers for bicycle or agriculture with a wheel suspension 13, which can also be designed as an axle suspension and can also have a suspension detection.

Here, both brakes 01 (e.g. for brake discs 011 or for brake drum 012, preferably both the same) are actuated by a common brake actuator via a mechanical connection. The actuator 04 can be, for example, an electromagnet or linear actuator (top), a rigid electric motor 041 (middle), or an electric motor 041 (bottom) with a rotatable mounting 0411.

The brakes 01 are mechanically manufactured or adjusted in the same way, so that the connection to the actuation 058 provides for equal braking effect on both sides. A stronger acting brake 01 became similar to the other brake 01 again due to increased lining wear. Of course, an entire axle group could also be actuated in this way by, for example, only one brake actuator, whereby axles which are preferably close to each other are synchronized in this way, and, for example, two of the upper axle assemblies receive a mechanically connected actuation.

An electric motor, electric linear actuator or actuating solenoid can force-control the contact pressure 05, i.e. even with non-adjusted wear (e.g. without additional wear adjuster), the actuating force would bring the brake 01 into the position of the correct braking force. A parking brake position 0471 could occur stably, for example, after a lever dead center or spring action, or both, have been exceeded.

In the center is a drive unit with a designable non-linearities 03, in this case an actuating cam 032, which acts, for example, in one direction as a self-pressing service brake and, for example, in the other direction has a position-stable parking brake position 0471, e.g. a recess or flat spot. Of course, the 0471 parking brake position could also be omitted or, for example, follow behind the end of the service brake positions. On the one hand, this cam can be shaped in such a way that it covers the expected wear due to stroke and rolling.

However, brake 01 can also be designed to be particularly stiff, i.e. it requires relatively little actuation stroke to full braking compared to wear. For this purpose, a common wear adjuster can be e.g. on the connection to the 058 actuation. This means that the cam profile can be optimized or designed in any way, since the cam always works together with the correctly set brake 01, at least within the tolerance range of the wear adjustment 02. By reversing the direction of rotation of motor 041 (e.g. DC motor), it is possible to decide whether the service braking range or the parking braking range is to be actuated. In all these simple motor or electromagnet controllers, one can take advantage of the property that the motor torque or an electromagnet force is approximately proportional to the current and therefore above described "controller" can directly operate this motor 041 or electromagnet with its current control or PWM. Whether the "controller" is therefore located in the towing vehicle or trailer is irrelevant because both are coupled together.

The variant with the rotatable motor bracket (or another geometrically variable component in the drive unit of the actuating cam 032), together with the resilient support 039 and the cam profile, means that favorably designed brake actuation is possible despite wear (if applicable without additional wear adjuster). The actuating cam 032 can, for example, be designed in such a way that a required braking effect is still possible in a required time in the case of highly permissible wear. This means that the actuating cam 032 will initially run steeply, with a large air gap 068 due to wear, in order to make a quick stroke in this low-power operation. Now, however, it would be too steep to build up higher force at the beginning with a much smaller air gap 068 (fresh linings). The resilient support 039 can therefore provide for the actuation cam 032 to escape from the steep start and continue to rotate to a less steep area. Unfortunately, this does not enable the drive torque of the actuating cam 032 to be kept constant, because the support spring determines how far the swerving movement will be, but at least the support spring can ensure that the drive torque is not unacceptably high.

A wheel load or axle load averaging system can be utilized in order to support the braking effect control, e.g. detecting a position, a distance, an angle or a force. Because the brake 01 needs a supporting torque against the braking torque, a supporting torque, supporting force or position can be determined or the alteration of the above wheel or axle load averaging can be utilized in order to determine the supporting torque or braking torque. Also a motor torque or generator torque of the vehicle drive motor can be utilized together with the friction braking effect to determine the friction braking torque: if e.g. decreasing generator torque is to be balanced with increasing friction braking torque, one can e.g. the possible reactions to determine whether the two torques behave as desired, i.e. whether wheel or vehicle distortion reacts as desired, the deflection of wheel or axle, in principle any expected alteration can be utilized as a comparison for the correctness of the friction braking torque and can be utilized to correct the friction braking torque or to correct a wear setting.

In a more elaborate variant, each brake 01 in the above vehicle can therefore have its own actuator actuation, e.g. by assigning a common actuation variant from FIG. above to each brake 01. How to achieve uniform braking despite brake-specific actuation is described below.

An easily accessible adjustment method is also proposed such that, with the motor 041 of the actuator or the actuator itself, it can be adjusted on its mounted position in such a way that the wear is readjusted manually, from the actuator itself, or otherwise. For example, the actuator or motor could be provided with a pivot point and an elongated hole, and screws could be loosened for readjustment, and then screwed back on to thereby secure the actuator's position.

Figure 4:
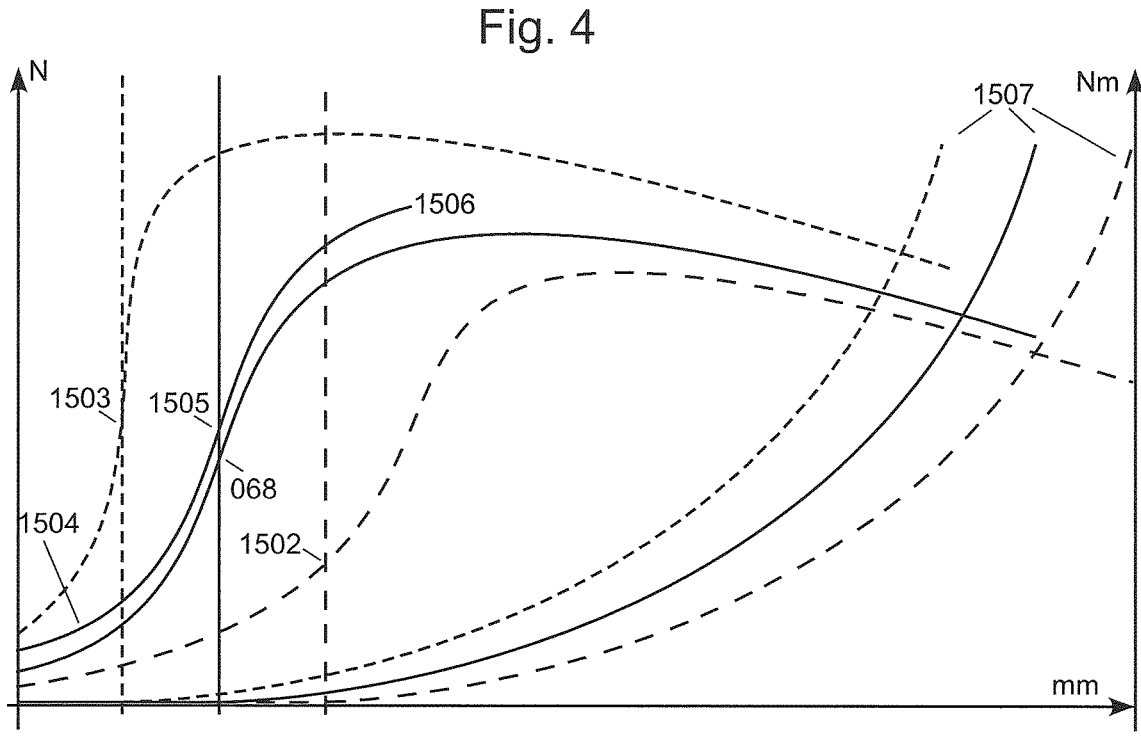
FIG. 4 illustrates the effect of the brake actuator torque on movement of the lining according to embodiments of the present invention.

In FIG. 4 it is proposed how to advantageously determine the instantaneous air gap in order to derive it there from, e.g. after comparison with a target value of the air gap, e.g. the need for a wear adjustment 02.

The wear readjustment for a non-linear brake has completely different requirements than those of current force-actuated or pressure-actuated brakes. In existing designs, a linear or almost linear contact pressure is practically always utilized, which means that errors in the wear adjustment do not cause errors in the contact pressure as long as this can still be generated due to the possible stroke. In the case of non-linear contact pressure, the brake must always be operated in a selected part of the non-linearities, and the behavior between the actuator and the contact pressure still varies at each point, which must therefore be taken into account. In the case of non-linear EMB, special requirements such as accuracy and reproducibility are also placed on the wear readjustment, which also concern the precise design of the non-linearities in order to be able to operate the EMB with the desired properties.

For the readjustment, it is proposed to execute it e.g. with an electric motor, which can be an own motor or an existing one (e.g. brake actuator) or a manually actuated readjustment or also the omission of a readjustment. For the implementation of the wear adjustment, there are numerous proposals for mechanical variants for this type of execution, such as e.g. Bolts or screws.

The proposed air gap determination could thereby identify a need for readjustment and initiate export, immediate or deferred. In the case of a manual readjustment, for example, a corresponding note could be generated.

Or, in the case where no readjustment is to be executed, the linear lining movement which will be required to overcome the measured air gap can be included in the brake actuator movement calculation. Mixed variants are also advantageous.

For example, small readjustment movements can be taken into account by means of appropriately adapted actuator movement and only a larger readjustment requirement can actually be readjusted (e.g. In order to increase the service life of the adjuster). Alterations which occur due to temperature fluctuations, for example, can be prevented by a wear readjustment.

The need for readjustment can be determined in numerous ways, e.g. by decreasing braking effect or press-on force and automatic or manual readjustment, by force determinations or torque determinations which can function in any preferred way e.g. mechanically or by electrical determination.

Sensory detection of the contact between the brake lining and the friction surface area is also possible and is also known, for example, in the truck sector, although it is costly and potentially problematic. In this case, it is advantageously proposed to use sensors which indirectly detect and/or record contact and which can therefore be located in areas of the brake where they are protected from environmental influences.

Examples for corresponding measurement types are vibration or sound waves. Use of current conductivity can also be proposed, e.g. by means of a conductive material which could be incorporated in the lining material, which would cause a current when the lining contacts the friction partner.

In FIG. 4, a particularly advantageous way for determining a readjustment requirement is proposed by means of torque measurement or current measurement on the brake actuator. FIG. 4 represents that the force for displacement of the lining (lining displacement force 1507, left y-axis) in the area of the possible air gap 068 (the lining movement is located on the x-axis), which can originate e.g. from mechanical losses or a spring, is in any case very small and also because of the flat curve, not very informative with regard to the start of the contact pressure, especially when the measuring device is designed for the maximum (full braking) contact pressure force.

Due to the non-linear transference to the brake actuator, the actuator torque (right y-axis) (and/or the torque-generating current) represents a much more meaningful curve. In order to create an advantageous use of the data which can be acquired, it is hereby proposed to take into account mass inertia effects, frictional losses and, for example, influences such as e.g. temperature, speed, rpm or age in such a way that a correlation between measured current and effective torque is established, and which is as accurate as possible.

Assuming that the air gap 068 in FIG. 4 was a correct air gap and was recorded, for example, when the lining was touched or during weak braking then, with increasing wear, the contact point will start to move towards the contact point with the enlarged air gap 1502, because the lining only contacts the friction surface with more stroke and, due to the different non-linearities, the brake actuator torque will therefore be smaller here. The contact point with the reduced air gap 1503 would indicate that the air gap is too small (e.g. due to temperature-related or excessive previous wear readjustment) and the brake actuator torque can be higher due to "faster contacting" non-linearities.

Now the actuator torque characteristic can also alter due to other effects.

It can shift upwards, e.g. due to a thin, cold grease in the motor transmission unit, which is shown in curve 1504. Losses can also increase in percentage terms, additionally raising the 1504 curve to 1506. So the expected air gap 068 will also require a higher actuator torque of 1505. Now, among all these possible influences, it is impossible to work out in advance why an observed shift to the actuator torque 1505 has occurred, whether due to alterations in the air gap or for other reasons, because there are far too many variables.

As an initial solution, it is proposed that one determines (measures) the course of the torque-displacement (or -angle) curve at several points and calculates whether a displacement in x-axis gives a good explanation, which would correspond to a wear readjustment.

Constant alteration of losses (e.g. thin grease) has a special effect on small actuator torques and the following estimation is proposed here: in an actuator area where no contact pressure takes place yet, the just determined brake actuator torque is to be compared with an expected one. Of course, this can be executed several times and in different rotational senses and a known temperature response can also be taken into account. Now, for the first correction method, this determined basic displacement of the actuator torque is also taken into account and, according to the aforementioned procedure, that the x-displacement is thereby assumed to be the cause, so that one already arrives at a good statement. In addition or alone, one can consider how fast the brake actuator torque curve increases, which is created by various, location-specific, non-linearities and indicates at which point of the non-linearity one is located and can therefore also be interpreted as an x-shift.

In the procedures which have been described above for the type that the motor holder rotates away or some other compensating movement occurs under excessive load, this movement can also be utilized or included for wear detection.

Measured or detected motions, forces, or torques can also be included, such as a lining entrainment force or an entrainment effect when weak braking begins.

A wear model (based on e.g. temperature, braking torque, speed, rpm, braking work, operation or procedure such as full braking or landing, etc.) can also be executed and taken into account in order to consider the wear readjustment.

The wear readjustment can also take into account values for other brakes, such as e.g. a temperature of a brake located on the other side of the vehicle, and the brakes can be adjusted or actuated, for example, so that the same or similar values are set on both sides. In addition, a guide can be additionally utilized so that the accuracy-increasing measures do not leave permissible ranges, or, for example, the wear readjustment can be executed in such a way that the measured values (e.g. temperature) on both sides will approach a model value. Of course, one would factor out the principal inequalities between two brakes, such as reduced braking on one side due to ABS.

Figure 5:
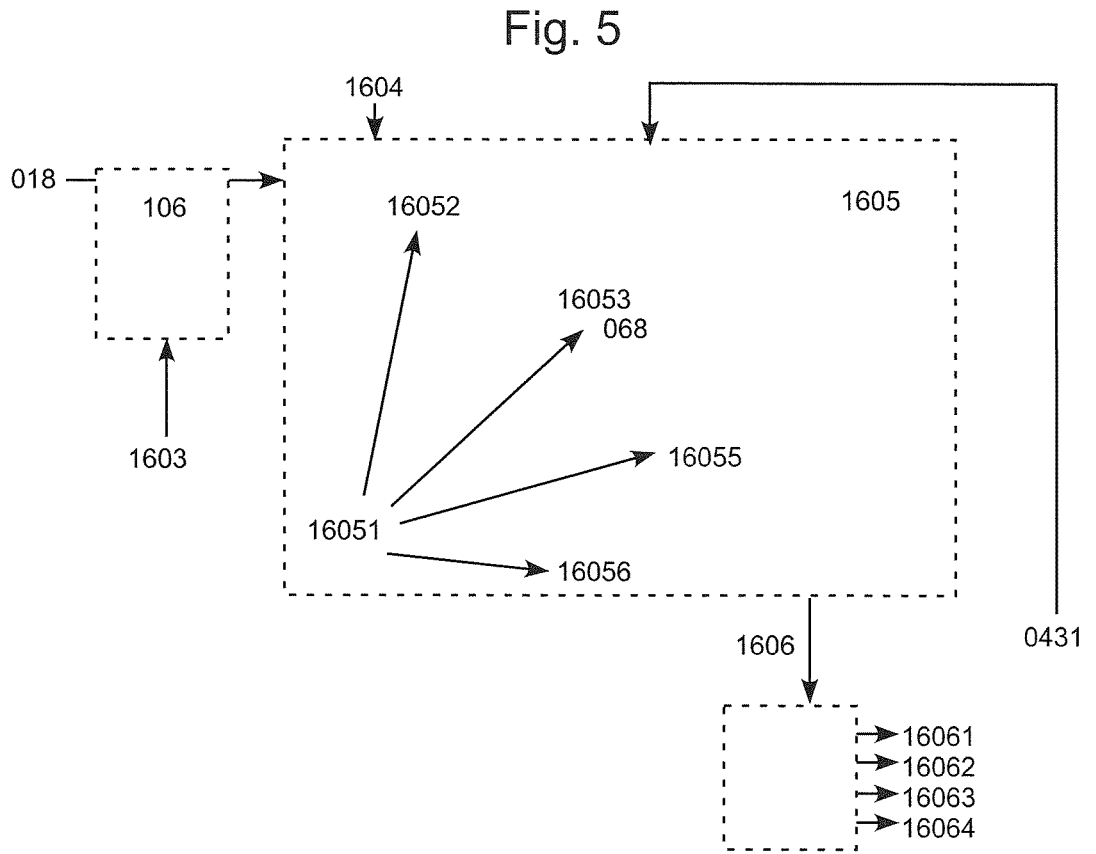
FIG. 5 illustrates an exemplary brake control system according to embodiments of the present invention.

FIG. 5 represents an example of how a brake control system, which has been recommended here as advantageous, can be constructed, whereby functions can naturally be added or omitted and the sequence of the throughput run can also be different, so it is a matter of a basic possible functional description.

A target braking effect 018 is assumed, which can come from e.g. the driver, pilot or e.g. from an automatic machine. It is recommended that the target braking effect can (but does not have to) be pre-treated, e.g. In order to determine target braking effects of individual wheels, which can be executed e.g. in a vehicle stability function 106 with e.g. characteristic curves and where also other influences like "blending" can be treated and one can also include measurements of e.g. wheel speeds, rpm, steering angle, yaw rate etc. as stability influence quantities 1603.

In the large block for the computational model 1605, it is shown how the actual brake control generates the actuating variables 1606 for the brake actuator from a target braking effect or the result of a vehicle stability function 106, where here 16061 can be, for example, the control of service braking, 16062 can be, for example, a parking brake function control, 16063 can be, for example a wear readjustment, 16064 approaching an initial position, etc. here the function is shown using a single EMB, but of course a system could serve multiple EMBs according to the above illustration.

The peculiarity of this advantageous model is that it is assumed that prior storage of e.g. characteristics (e.g. stiffness characteristic) and values (such as instantaneous coefficient of friction) is therefore impossible, because both from the start of braking and from the end of braking, and also for all subsequent braking, the status in the EMB result as a function of time 16051, braking power (braking torque*angular velocity), thermal cooling resistances and heat capacities. Without thermal capacities, the problem of prior storage would be "only" multi-dimensional, because each input size in the storage medium would cause a new dimension for all storage values, which therefore causes a huge increase in storage space if, for example, there is a fifth input size instead of only four. When, however, a temporal development arises through heat capacities, then in addition to the multidimensional storage for every other possibility of temporal development, an additional storage would now have to take place and this would not only be for one braking, rather for all following cooling phases and new braking again as additional storage. The function of time 16051 represents that e.g. temperatures in a temperature model develop over time (depending on braking power and e.g. As speed-dependent air cooling as well as possible radiative cooling, "black body radiation") and this model feeds e.g. a (also) temperature dependent friction coefficient model 16052 as well as e.g. the calculated air gap 16053 with respect to temperature (but the air gap can also be calculated e.g. alternatively or additionally via a wear model) and can utilize the current (e.g. estimated) air gap 068, thereby taking into account e.g. thermal stiffness alterations 16055 and can of course operate additional models 16056. Measurement data from the actuator 0431 can of course be included in the calculations 1605, e.g. actuator position, current, torque or e.g. measured temperatures (also as a comparison to models), as well as variables from the vehicle 1604 (or the brake environment) such as wheel speeds.

Therefore, it is hereby proposed to build the brake control and/or regulation as advantageously based on models in which the evolution is determined as a function of time 16051 from time and input variables.

In FIG. 5, it is assumed that the brake actuator is considered as a single actuator fulfilling the purpose, which, in the structural implementation, comprises at least one actuating component, but can also be built up of several, such as e.g. for safety reasons double windings, several motors, also for different functions such as parking brake and/or service brake or common functions, such as e.g. that the parking brake motor could also assume the service braking function although e.g. also stored energies such as e.g. from at least one spring, can be utilized over further also non-linear transmission units.

The manipulated variable for an actuator, since we are hereby concerned with the physical property of the electric actuator, can in principle be position (e.g. motor shaft angle) or torque and/or force, and naturally composite values such as angle and torque. For the composite ones, it is recommended that e.g. from the aforementioned represented control and/or regulated 1605, that the torque is adjusted via the current of the motor 041 and at the same time it is ensured that the angle of rotation of the motor 041 remains in a permissible range, both being determined from the aforementioned models (or effectively), whereby this is of course only one possibility among many to control and/or regulate the actuator since above, also measured data from the actuator 0431 (such as e.g. actual values of e.g. current, torque, angle, voltage, temperature etc.), could go into the large block 1605, i.e. into electronics.

Figure 6A:
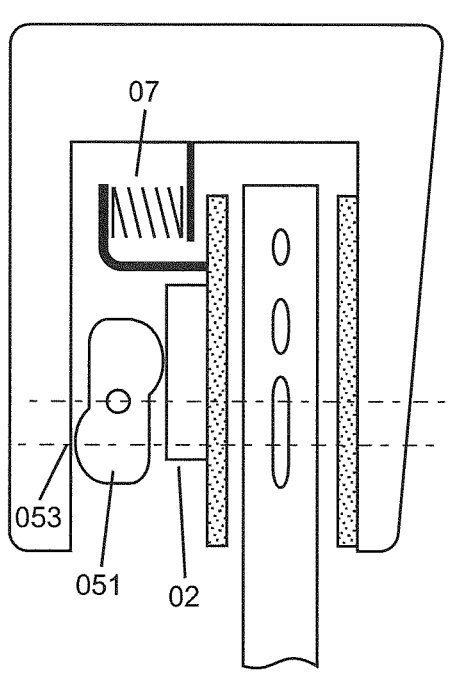
FIGS. 6A-6C illustrate various configurations of a floating-calliper disc brake according to embodiments of the present invention.
Figure 6B:
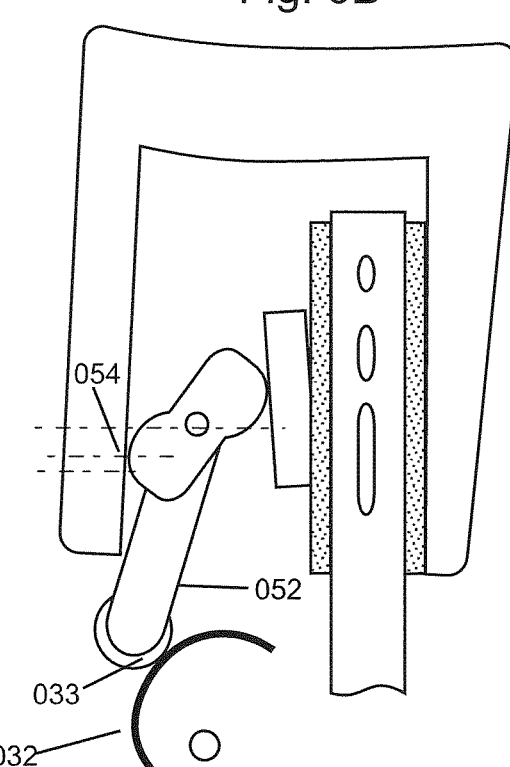
Figure 6C:
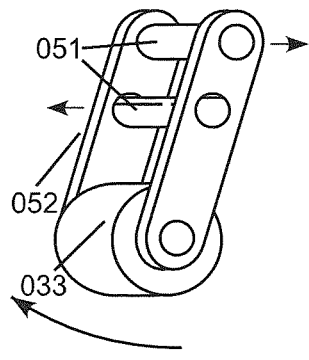

FIGS. 6A-6C show a floating-calliper disc brake (unbraked in FIG. 6A) in which the inboard lining is pressed on via, for example, a cam-like expanding part 051, as is also known, for example, as an expanding part in mechanically operated drum brakes. The EMB expands out and bends itself during clamping, as shown exaggeratedly in FIG. 6B. The cam-like spreading part can perform a "scraping" movement on its two bearing surfaces, because its rotation results in a difference in height (between the unbraked position 053 and the braked position 054) and also in a rolling movement on its surface areas. On the one hand, this spreading part can be designed and installed in such a way that its "scraping" incorrect alignments match as closely as possible to the misalignments which are caused by deformation of the brake parts in a compensating manner. Remaining defects in the heights can be taken up in clearance and displacement, as indicated, for example, by the skewed positions of the wear adjuster. Since high surface pressures occur at the expansion part, hardened surfaces are desirable, as shown, for example, in the variant FIG. 6C with the pressed-in hard pins with any cross-sectional shapes. Of course, all other methods of spreading can also be utilized, such as spherical ramps, also with variable slope or variable, e.g. spiral, path and multiple spherical ramps.

Figure 7A:
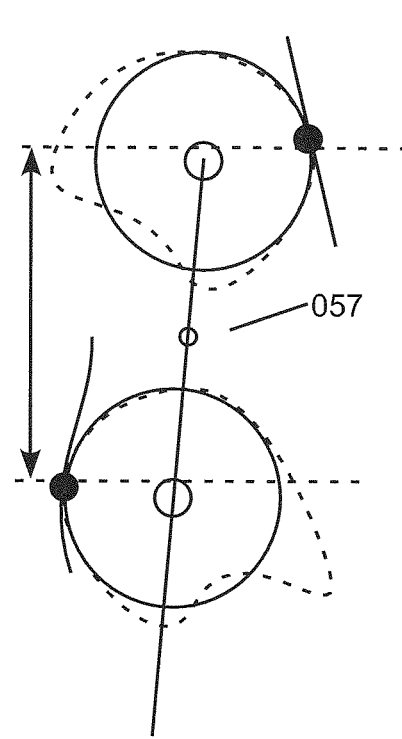
FIGS. 7A-7C illustrate various configurations of unwinding bodies according to embodiments of the present invention.
Figure 7B:
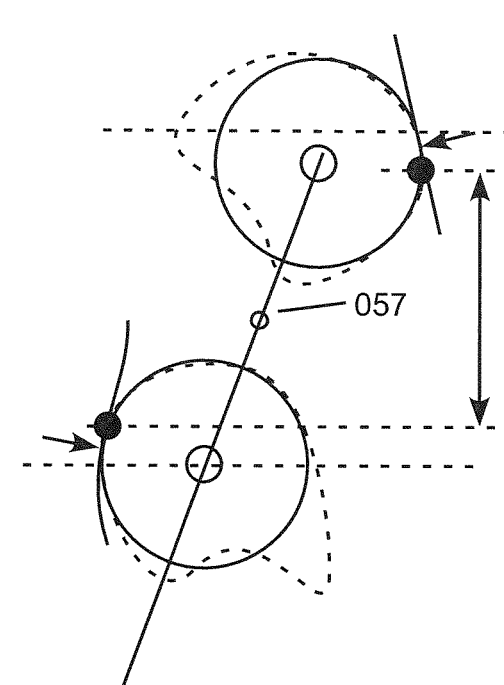

FIGS. 7A and 7B show various unwinding bodies, most of which utilize a circular segment as the unwinding surface, but which could of course be of any shape or, in the case of small dimensions, could have inaccurately small contours due to the manufacturing or production processes which are involved. It would be advantageous to use (e.g. press-fit into bores)needles or rollers from e.g. rolled bearings in order to achieve hardness, good circularity and cost-effectiveness. The other rolling surface area will mostly be a straight line (FIGS. 7A and 7B above), but could also be different (FIGS. 7A and 7B below) and will deviate minimally from the original one (e.g. straight) due to usage effects. When this spreading part is rotated from the left status (FIG. 7A) into a lining-pressing one with the spreading part pivot 057 (FIG. 7B), then there are several procedures: A xy sine-cosine movement describes the circular path of an initial contact point, whereby one can aim for a lot of x (in the press-on direction) and little y (high deviation). In addition, rolling along the circumference of a circle creates a path which is proportional to the rolling angle. With 360° roller rotation, the entire circumference was unrolled, here only one angle-proportional unrolling segment. This unrolling causes more y than x movement in the drawing. These movements can never be height compensating because one height difference starts with an angular function and another starts with angular proportional. If rollers do not roll circularly and/or unwinding surfaces are not flat, then this could bring advantages in terms of a high error, but price disadvantages. In addition, there can be an error that a touch point must always have the same tangents to both touching curves by definition and therefore this would also have to be taken into account with respect to a high error.

For example, when 6 mm needles are spaced at, say, 15 mm, then a lever length of 45 mm would have a transference ratio of 1:3 and would turn 2 mm of stroke into 6 mm of stroke and create a swing angle of about 7°, which therefore amounts to 0.19 mm of unwinding per roller at 19 mm of roller circumference and +3.6°, and 0.03 mm of height error from circular motion.

One can only operate such a pressure lever with respect to its rolling geometry in the range of minimum height error, which mathematically would be a certain range of a cycloid. However, one can also focus on the acting forces, movements and the manufacturing or production possibilities: in passenger cars, front wheel disc brakes, for example, act up to 35 kN, trucks up to e.g. 240 kN, whereby press-on force strokes of e.g. 1.8 mm (passenger car) are made. Now, when one selects roller diameters of about 6-8 mm (passenger car), for example, because of bending and flat pressing, then the rollers could be ground down to bring them closer together, but one will not always easily reach the mathematically optimal range of the high optimal cycloidal trajectory. Practically, approximating the minimum mathematical height error results in a difficult-to-fabricate geometry with small roll-off radii which are close to each other and where a force-transmitting connection of both roll-off radii is geometrically difficult because the connection can be thin in order to connect through the middle between both roll-off radii.

Figure 7C:
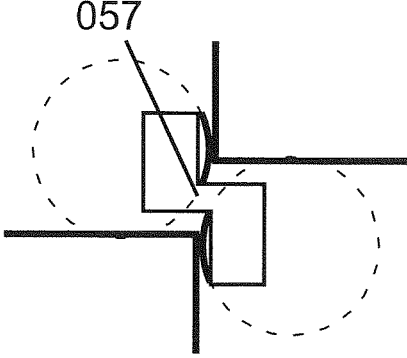

FIG. 7C shows the spreading part with spreading part pivot 057 and the thick circular parts (which represent the press-on force of the spreading part). The thick circle parts therefore press on the two thick rectangles, which are not rotated with the spreading part. The spreading part pivot 057 could be supported, although in FIG. 7C it can also be rotated without a bearing, since the spreading part cannot essentially leave the position between the thick contact surfaces, which are shown here as rectangular, for example.

FIG. 7C represents a pair of rollers as mathematically operated close to the optimum of the cycloid, with the thick circular arcs rolling on the thick corners. With clockwise rotation, a support point was moved further up by the angle function.

The rolling circumference on the arc was also rolled up. This means that the support point does not remain at the same height, but both movements are similar, so that little or no relative movement ("scratching") is required. The two circular arcs could be connected between the roll-off corners, which already provides little material in the area which connects through the center.

These unwinding bends with e.g. 4 mm radius are unpleasantly precise to manufacture. When holes are now drilled in order to insert pins (dashed circles), then the through-connecting material is largely drilled away and the roll-off areas must be recessed for the pins. These are some reasons to abandon the process near the mathematical optimum.

In this opposite design, a position of rollers of suitable diameter will be chosen which is favorable from the point of view of production technology and force. The height error can either be accepted and, if applicable, it can also be assumed that undesired movements or deformations occur, e.g. that a wear adjuster (which serves as a rolling surface) is slightly inclined, or that slight scratching movements occur from certain braking (the vast majority of braking takes place, for example, at ⅕ to ⅓ full brake delay). Or one can use unavoidable movements or deformations which occur when the brake is actuated whereby one allows high errors and other movements to act at least in the same, compensating direction or they are preferably designed in such a way that high errors and other movements compensate each other as well as possible. This "other" movement occurs in drum brakes, for example, when the pressed-on lining carrier moves (e.g. around its bearing point) or when callipers of disc brakes deform under press-on force, e.g. widen and bend.

In fact, scratching movements during braking can be even less significant than e.g. continuous friction movements caused by vibrations, e.g. from an unbalanced wheel or diesel engine, and therefore (e.g. partial) Allowing for high defects that cause scratching motion is entirely possible and can provide significant benefits in terms of manufacturing and cost.

Figure 8A:
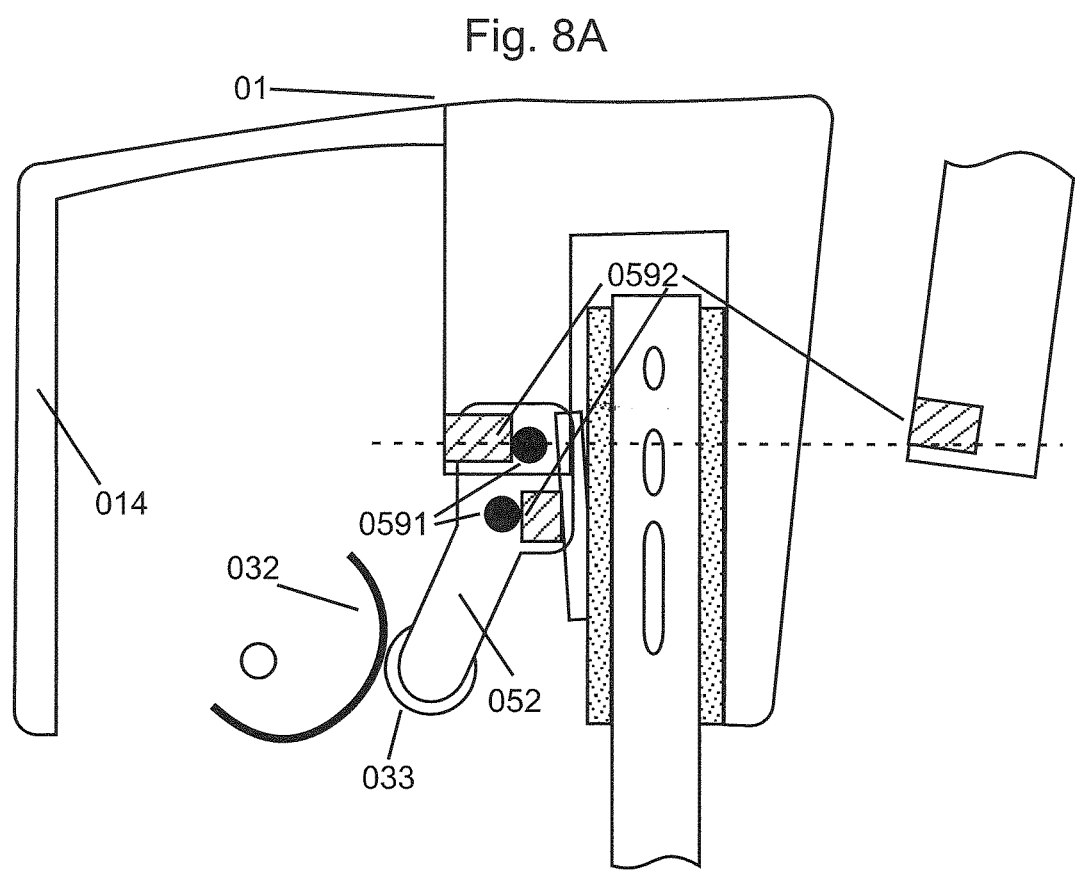
FIGS. 8A-8B illustrate exemplary brake devices according to embodiments of the present invention.
Figure 8B:
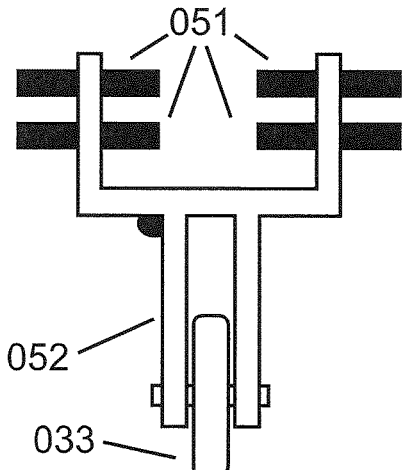

FIG. 8A represents how a press-on force can be generated as close as possible to the lining contact pressure or the intermediate wear adjuster. Dashed in the drawing here are inserted or otherwise attached or secured (clamped, welded, screwed) parts as non-turned contact surfaces 0592 (also with special properties such as hardness, wear resistance and the black sections here are inserted needles or otherwise attached or secured (clamped, welded, screwed) parts with special properties such as hardness, wear resistance). The geometry of the rolling of the black needles on the gray surfaces is preferably designed in such a way that the parts can be manufactured or produced sensibly, but that errors in the rolling movement are e.g. small or such that they can be absorbed or tolerated by play, deformations, displacements, but also preferably so that deformations during operation have as far as possible the same effect as the errors and therefore compensate each other as far as possible. Here, for example, one could select the length of the circular arc as unrolled during actuation, in comparison to the angular movement of a point on a needle, in such a way that it was possible to compensate for the lifting of the dashed unrolled surface (right), approximately. Residual defects are absorbed here, e.g. by slanting the part which presses against the covering. FIG. 8B represents a possible embodiment with a lever with a roller 033 for the cam 032 in FIG. 8A and two ends for two contact pressures, i.e. e.g. as a spreading part 051, which can be located e.g. on both sides of the wear adjuster so that the wear adjuster has space in between. Each of the two pressing ends can, for example, apply the needles, rollers or other press-on parts on both sides, so that four synchronized press-on operations are produced here, for example. The mating surfaces for the press-on operations must, of course, also be appropriately positioned and frequently available. This lever can also be joined, e.g., from parts such as strip steel, sheet metal, etc., e.g., welded (indicated as a welding point in FIG. 8B in the corner at the writing "FIG. 8B"), spot-welded, riveted, screwed, adhered, utilize folded and bent joints, etc.

Figure 9:
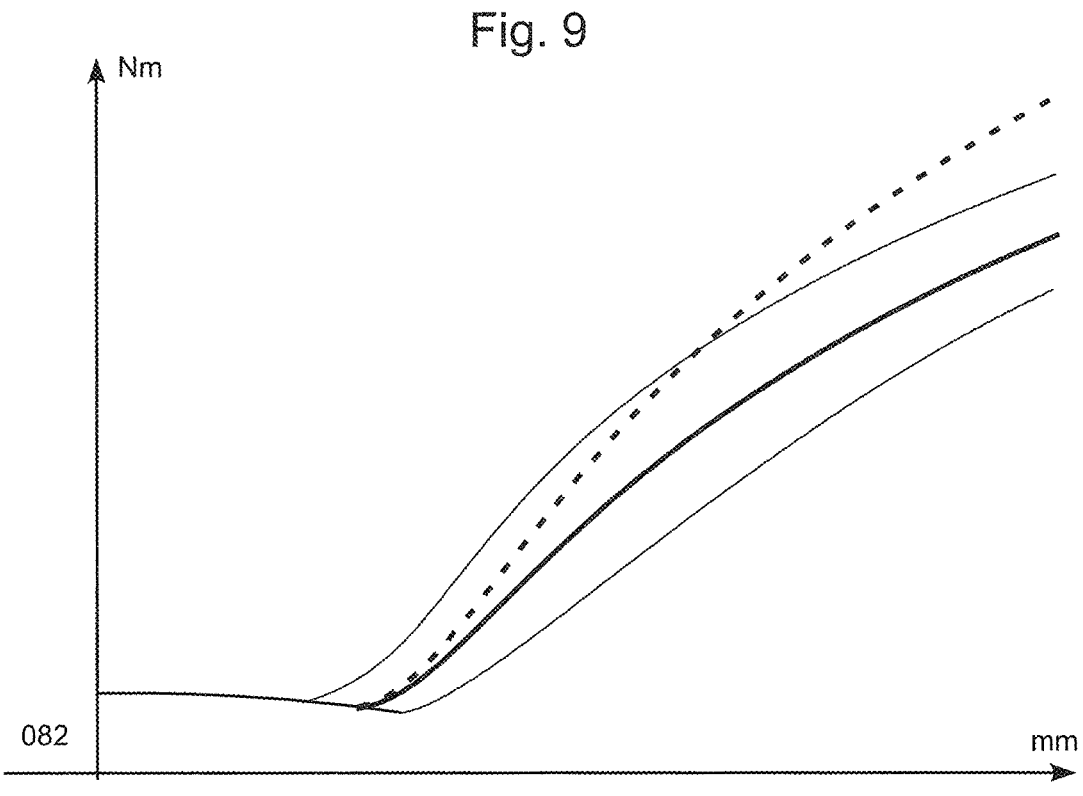
FIG. 9 illustrates actuator torque-displacement of an electromechanical brake according to embodiments of the present invention.

FIG. 9 represents an actuator torque-displacement behavior of a realistic EMB with the lining stroke on the x-axis and the actuator torque on the y-axis. As described in this thesis, the EMB was designed in such a way to combine the smallest possible starting radius of a cam with a roll-off roller diameter that can withstand the lining contact force and the torsion angle of the cam fits the geometric conditions in the EMB. Under these conditions, the actuator torque is by no means even approximately constant over the brake application.

The two thickly drawn curves (dashed and full) are for the correctly adjusted air gap, the dashed line is for fully worn brake lining, all others are for full lining. It is hereby proposed not to store force-deformation curves, rather more to generate them dynamically from a model in the brake control, because these curves were output by the model for certain temperatures, which in turn depend on the time course of the thermal power of the braking, to which the model reacts.

Now it is additionally proposed to also output the force-deformation curves as force-stroke characteristic curves. It is represented above (dark full lines), that the air gap could be an air gap of e.g. 0.1 mm smaller (above the thick line) than intended or also 0.1 mm larger (below the thick line). Of course, one could try to adjust the air gap as precisely as possible in order to eliminate this influence. However, it is recommended to determine also inaccuracies of the actual air gap size, since an air gap adjustment (or wear adjustment) can be subject to tolerances, determination of the touch point can only be done within the possible accuracy, readjustment could only be done in certain steps (e.g. ratchet progress) or other effects can lead to exchanges. This includes, for example, abrasion accumulating on the friction surface of the linings, which remains on the friction surface to an unknown extent, or is removed again. It is therefore proposed to permit such an almost abrupt change of the air gap to some extent, even when a lining wear model did not come to such an even sudden wear.

Such accumulating abrasion can also alter the stiffness characteristic curve for the brake when, for example, only parts of the lining surfaces are affected. Stiffness can also be subjected to larger manufacturing tolerances (e.g. casting material, geometric casting tolerances), long-term changes (e.g. material thickness reduction due to e.g. corrosion) and thermal changes, e.g. when stresses form in the material due to uneven temperature distribution. These influencing variables are preferentially included in the stiffness model here, which also argues against mere storage.

Here it is proposed, as one possibility among many (where e.g. parts can also be used), e.g. to initially determine the actuator torque in a non-braking area, which can also be e.g. an area 082 which is not utilized for braking, in order to determine e.g. the instantaneous mechanical losses (e.g. caused by transmission unit grease temperature). Then it is proposed to determine the contact point via increasing actuator torque (in terms of instantaneous mechanical losses and local non-linearity) before any still trackable braking torque occurs. For this purpose, actuator angle and torque measurements can be made and these can also be statistically evaluated, e.g. averaged, over the large number of measurements. Already at the still weak, increasing braking, it is suggested to determine the slope, pitch and/or or the behavior of the braking stiffness. This could, for example, also have happened during a preceding braking process, although it is hereby recommended to determine the slope, pitch and/or the behavior of the brake stiffness even without a preceding braking process. The more the braking increases, the more statistical evaluations and the better measurable actuator torque can be used for increasingly better determination of the slope, pitch and/or behavior of the stiffness curve.

In addition or alternatively, the brake can be controlled via the lining contact force, which is calculated from the measurable motor torque and the non-linearity, preferably taking into account the mechanical losses and load-bearing effects. It is therefore also possible to improve the instantaneous stiffness model, taking into account other measured or calculated values, such as the mechanical work used for actuation (or released during slackening). When springs are involved in the brake, then they must be included in the calculation with the correct sign and according to their instantaneous effect, e.g. pressed out as spring torque.

FIG. 9 represents that the actuator torque changes considerably. Here it is suggested to make use of the motor characteristic curve of the actuator. It is recommended here that the speed increase with decreasing actuator torque is utilized in order to shorten the actuation time. In the above curve, it can be seen that the actuator torque is significantly lower than the maximum over larger ranges and this behavior is used here (or brought about in the design of the non-linearity) so that the actuator shortens the actuation time over higher speeds, although it is not operated at the point of maximum shaft power.

Figure 10:
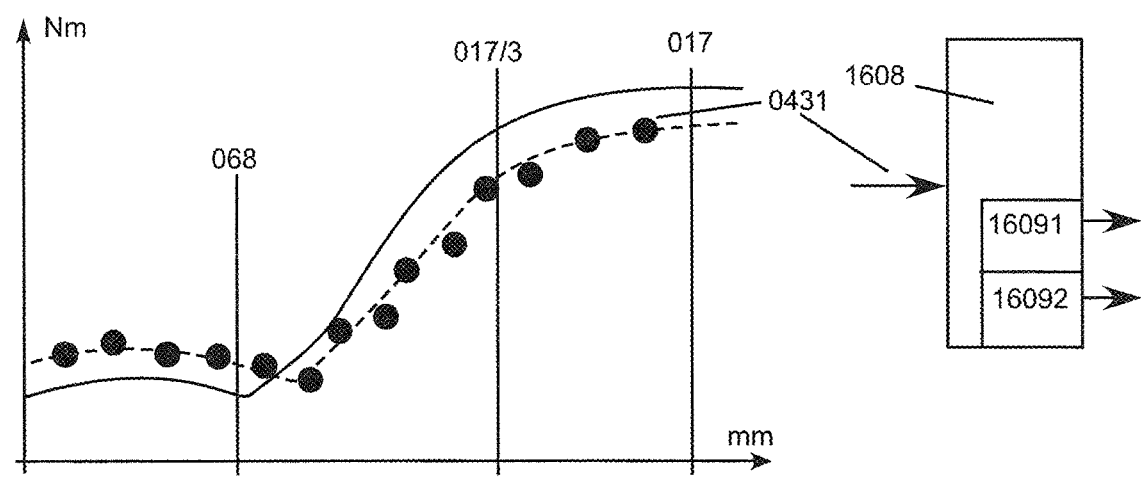
FIG. 10 illustrates an exemplary method of obtaining information about the brake device according to embodiments of the present invention.

FIG. 10 represents an advantageous method of obtaining information about the brake from measurement data from the actuator 0431 (which can be recorded, for example, at the brake actuator as angle and torque, but any similar representation would also be possible, since there are mathematical relationships between values at different points), e.g. to determine the current wear condition, the need for a wear adjustment or a more accurate estimate of the contact force. In FIG. 10, the lining stroke is located on the x-axis and the actuator torque is located on the y-axis and an e.g. full braking with 1 g in 017 is reached and e.g. a "usual" braking with g/3 in 017/3.

The dark line is the expected behavior of the brake, which can be stored e.g. in the EMB-ECU. However, it can also be determined depending on the situation, e.g. for "actuate" with correctly assumed air gap 068 with e.g. mechanical losses determined in the past. However, the expected behavior can also turn out to be not storage capable, as already shown, because it can depend on the development of temperatures that cannot be stored in advance, i.e. the development of temperatures depends on respective instantaneous conditions such as instantaneous braking power, cooling conditions, etc., and these must be measured and/or continuously modeled in a time-dependent manner in this procedure.

The bold measured data from the actuator 0431 is marked as "conspicuous" for the time being, because it is firstly located above the expected behavior (full curve with air gap 068) and subsequently located (with more stroke) below it. With this assumed result of many possible measurements it is shown that it is possible by the multiplicity of points over different actuation states (e.g. actuator angle or linear stroke, actuator torque, actuator velocity with sign etc.) to get out individual "errors" (recognized in an e.g. comparison or an evaluation in the comparison or evaluation block 1608) individually and also e.g. in different time horizons. evaluation block 1608) individually and also e.g. in different time horizons, e.g. so fast that "errors" can already be recognized (or also already reduced or compensated) before a braking or before an unfavorably wrong braking effect, whereby one can designate the fast recognizable evaluations as "fast acceptance" 16091. With more (e.g. statistical) effort, however, a more precise analysis of the brake properties becomes possible, which naturally needs more data and time and is therefore presented here as slow assumption 16092 and naturally also has the purpose of improvement.

In a "quick assumption" 16091, it is proposed in this case, for example, that with more than one measuring point in the air gap area which is too high, one can assume that the instantaneous mechanical losses are higher than assumed in the nominal curve. This can also be pressed out e.g. in an absolute or e.g. percentage correction number. With more actuation than e.g. up to the expected start of contact pressure (e.g. end of the air gap), the points then lie below the nominal curve and, supported by the later rise, one can assume in a "fast assumption" that e.g. the air gap is larger than expected. The assumption is also backed up, for example, by the fact that the points remain largely below the nominal course, which can be due, for example, to the flatter course of a cam here. In response to various findings, appropriate correction values for individual parameters of the calculation algorithms (e.g. air gap size) can be taken into account accordingly in all subsequent calculations in the brake control electronics.

Therefore and according to this method, one can both make a "quick assumption" 16091 and, if applicable, still secure it, for example which is, of course, based on the fact that the motor torque develops differently when one uses other ranges of non-linearity than intended. When, for example, a weaker than usual braking under g/3 is desired, then according to this method, "quick assumptions" can already be made beforehand, which prevent or reduce an unintentionally wrong braking effect. The more different statuses of the EMF are available for measuring point determination, the better analyses of the deviation statuses and causes in the EMF can be made. Therefore, one will compare e.g. different actuator loads, angles or speeds (including sign) with the corresponding nominal curves, because e.g. the mechanical losses can be different or have different effects depending on e.g. actuator speed and direction of rotation. A particularly advantageous situation for the collection of high-quality measurement points arises when the service brake actuator is also used for the parking brake function. The approach to the parking brake position involves an actuation distance which is significantly higher than for the majority of service braking operations. In addition, there are significantly lower requirements available for the speed of actuation, which means that the influence of the mass inertia, for example, can be minimized.

Based on the need for a wear readjustment as recognized e.g. above, either a readjustment can be performed at a favorable time or e.g. one can continue to operate the EMB with this not (completely) correct setting for the time being. As a consequence, one can e.g. use a "slow evaluation", which uses better statistical methods (e.g. averaging) to determine the actual deviation state of the EMB or, advantageously, can also distinguish several causes of the deviation. For example, it was possible to distinguish that e.g. the mechanical losses in the EMB are statistically higher than expected or that e.g. the wear adjuster statistically sets something too far away and one can naturally take these results into account in the brake control or store or output them, e.g. as a warning. Influences due to e.g. plausibility or e.g. impossibility can also be included in the above method, e.g. that at a similar temperature of a gear grease it is not to be expected that the mechanical losses have changed strongly from one operation to the next or that e.g. a value obtained from the "fast assumption" for a wrong air gap is impossible, because due to e.g. a wear model not so much wear is possible. Of course, these are only examples of many useful possibilities.

It is particularly advantageous when, in addition to the actual data of the measuring points, i.e. cause/effect pairs, e.g. motor position and current, additional information (e.g. current temperature) is recorded and stored as metadata. As a consequence, for "slow" evaluations it is advantageous to categorize the totality of the recorded measuring points according to various criteria. Examples of this were, low/high temperature or low/high modulation. If the analysis of deviations of measured values from expected values subsequently reveals differences for different categories, then more detailed interpretations are possible. If, for example, the above example represents a horizontal shift of the curve, especially at high temperatures, then an incorrect evaluation of the thermal expansion can be assumed; if, on the other hand, there are differences between low and high motor positions, an error in the stiffness curve representing the behavior of the brake can be assumed.

Figures 11, 12A:
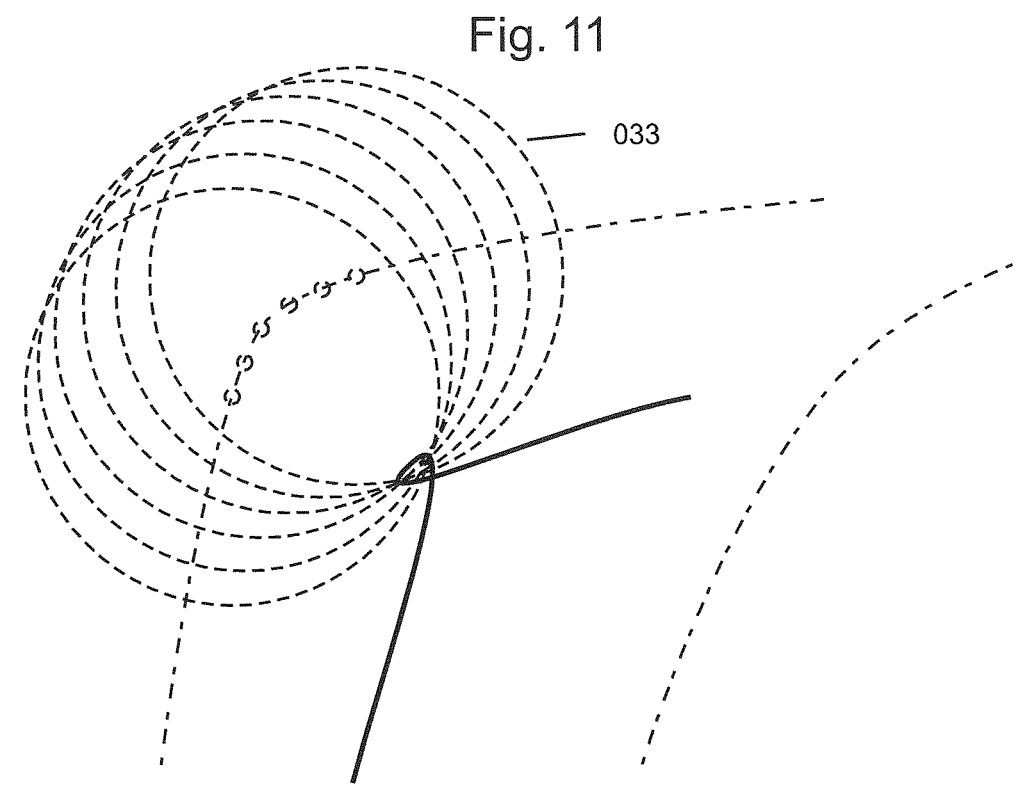

In FIG. 11, the design is shown on the example of a roller and cam, where a non-linearity for "largely constant actuator torque" is intentionally not applied and instead the change of the transference ratio is strongly limited in favor of other advantages. While other designs require a mathematically justified optimum, in this case a mechanical engineering optimization is aimed at in order to be able to utilize transferences with a given behavior (e.g. lever combinations) or a behavior which can be designed within limits (e.g. toothed gear pairs with non-constant radius, ball ramps, cams).

However, by limiting the ratio of the minimum to the maximum power transmission and/or torque transmission, preferably to less than 1:20, the motor can no longer be operated at an optimum over essentially the entire operating stroke. On the contrary, it operates in wide (and always passed) operating stroke ranges which strongly deviate from the optimum and could naturally assume all possible load statuses in ranges of the operating stroke, i.e. from zero to maximum shaft power. In this case, among other things, it is also suggested to use this in a wider range of its reasonable speeds or rpm e.g. in ranges of efficiencies accepted as "good".

By leaving the operating optimum, it becomes possible, for example, to design the cam track in a mechanically favorable manner, e.g. without pointed points, without points with a small radius and high load, without points which are difficult or impossible to finish due to angular relationships and which could tend to "self-lock", e.g. when the angle of the roller lever is roughly perpendicular to the cam tangent. A roller for rolling on the cam track can thus have larger diameters and thus carry greater forces. In addition, the use of non-linear components other than cams becomes possible, since, for example, gear pairings with non-constant radius or ball ramps can only be used when the variation of the transference ratio is limited, which can be lowered even further, e.g. to below 1:10, for this purpose.

This is based on a condition determined to be favorable from a mechanical engineering point of view, e.g. a minimum roll diameter derived from conditions such as roll and cam strength, width, number of actuations and force spectrum. For this purpose, a cam shape is then determined which is also classified as permissible from a mechanical engineering point of view i.e. which does not fall below minimum radii, e.g. for material strength reasons. This then finally results in the achievable non-linear translation. The operation of the electric motor as "essentially continuously over the entire operating stroke at an optimum operating point" is not pursued in the design, which is hereby under consideration, and can even constitute a contradiction because it corresponds to an impossible requirement.

The transference ratio of a combination of roller rocker arm or cam follower arm and cam can be expressed, for example, as the ratio of rocker arm angle to cam twist angle. In this case, the rocker arm twist angle is created by the roller center point. In FIG. 11, a desired movement of the roller center of roller 033 rolling on an actuation cam is represented as the dashed-dotted lines, various corresponding roller positions are shown dashed. However, the cam surface is created at the circumference of the roller as a bold curve "with loop". In the example shown, however, either the roller is too large or the center point curve has too small a radius of change in the "kink".

In any case, points of the cam surface are created, which were removed from each other during production and are not possible. It is also not possible to simply "round out" this surface area since this would result in a different transference ratio than the one required. Therefore, according to this design method, the dash-dotted center curve remains to be curved in a larger radius (dash-dotted center curve on the right), which, according to the design, results in the transference ratio, which is fundamentally different from a largely constant actuator torque.

Even when the cam surface curve no longer contains any impossible points, then it is still necessary to review whether the resulting radius of the cam surface is possible according to the requirements or whether it must therefore be increased. After this interpretation, one would thereby come to the midpoint course which is represented on the right, for example, and can determine from it the resulting transference ratio, which does not permit any more alterations which are considered to be too large. The same also applies for other rolling arrangements, such as e.g. ball ramps and similar restrictions on the maximum possible geometry variation in practice will also apply, for example, to toothed wheels or friction wheels with a non-constant radius, where, for example, it is necessary to take into account finish-capable tooth geometries or rolling arrangements which are possible at all points (without points "getting in each other's way").

The following advantageous methods for achieving a favorable cam surface can also be proposed, which can also eliminate "too small radii" and "looping through impossible points": The cam twist angle can be increased because the points are "pulled apart" on the cam surface and can find better places. Although this increases the transference ratio, it can still be compensated for by a lower transference ratio in the upstream motor gear unit.

Similarly, the internally positioned starting radius of the cam can be increased, which also "pulls apart" the points. However, it is also possible to partially pull apart the points, e.g. to pre-twist the starting points of the cam so that loops are pulled apart, i.e. eliminated, and so that radii that are too small are enlarged. This can lead to quite good solutions, but initially alters the transference ratio and cannot be fully compensated for by altering the transference ratio of the motor transmission unit.

FIG. 12A represents how an actuating cam 032 with a twisting angle of about 270° (thin) changes an initially very large slope into a flat one and at the "round" transition point of the cam track around 0321 can still hold the mechanical load favorably because the cam is still "round enough".

If, however, the torsion angle is to be reduced (drawn thick) for the same radii determining the cam stroke 0323 (initial and final radius, dashed, stroke 0323 in between), the transition point had to be designed with a smaller fillet radius or even as cam track pointed 0322. However, up to the "kink" of cam track point 0322, almost half of the lining stroke is covered. In order to maintain a permissible minimum fillet radius, it is therefore necessary to design the non-linearity in relation to the geometry, e.g. up to roughly half the lining stroke. With a reduced twist angle, this leads either to a smaller achievable maximum stroke or to a more rapid increase in the cam radius. Therefore, the actual optimization targets for non-linearity cannot be achieved.

Figures 12B, 13A, 13B:
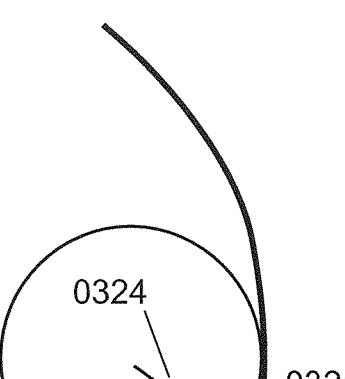

FIG. 12B represents the situation where the stroke 0323 is to be maintained with significantly reduced minimum and maximum radii (both thickly dashed). The cam track is not simply reduced proportionally, since the stroke 0323 is not to be reduced proportionally, but a new, thickly drawn, cam track pointed 0322 results, which again gets a pointed point in the transition from steep to flat, which is clearly more pointed than the rounder points of the original, darkly drawn, cam track round 0321.

FIG. 13A represents that the "too pointed" areas created above (0322 in FIG. 12A or FIG. 12B) cannot simply be rounded out by a cam radius 0324, as would actually be obvious. Originally, a flat cam track 0325, i.e. a higher force ratio, was selected, e.g. because the brake can only be applied (or applied as planned) in the 0325 range if a smaller actuator torque is required as a result. However, if the larger slope of the fillet radius 0324 is present at 0325, then the actuator cannot be able to operate the EMB correctly in this area.

In FIG. 13B, therefore, one way of arriving at an EMB which can be actuated with the correct torque is shown. For example, one could push the fillet radius to 03241 (so that the flatter location 0325 would work correctly) and then have a "wrong" cam track along the circular path again, but not the intended, dashed line of course.

Now, however, the cam track in the area of the new fillet 03241 in FIG. 13B is less steep than necessary for the dashed-through actuation and is therefore actuation-capable, but slower. At the end of the shifted fillet radius 03241, the permitted (dashed) slope 032221 can be applied again. Now the input torque of the non-linearity can be located in the desired range again, but the necessary torsion angle has slightly increased. Also for this it is suggested that, in a further iteration, the total twist angle can be reduced again. This method can be used to approach the desired course of the non-linearity, but in some cases the restrictions will be considered as being more important than the achievement of the target course of the non-linearity.

In FIG. 13C, it can be seen that two different sized rollers (roller 033 (large) and roller small 0331 (for the beginning of the operation) can also be used. Due to the small radius of the roller small 0331, a steep flank of the cam track peaked 0322 can alter to a much flatter course. When the operating cam 032 has been twisted so far that the small roller has retraced its path along the fully drawn track, then the large roller 033 rolls behind the flank on the dashed track and the smaller roller, from here on, has a track which provides relief for the smaller roller, which is shown here by the continuation of the fully drawn track in the course to the left of F from the takeover of the track for the larger roller.

The two tracks and rollers can also be spatially staggered. Furthermore, the raceways do not have to be rigidly connected, but instead, for example, the small raceway can be rotated first and then, for example, the large raceway can be rotated by means of a driver, which makes it possible to achieve a total angle of rotation of more than 360°. It is therefore not necessary to utilize different rollers or roller diameters, but this spatial arrangement can also be used to achieve a larger overall angle of twist and, for this purpose, e.g. drive units, carriers or transference can also move the individual raceways or the individual cams or cam parts from certain states or angles of twist, so the raceways can also be driven, e.g. with different gear ratios. Also a three-dimensional helical web with e.g. only one roll is possible. However, the raceways can also be moved against each other in a different way (also e.g. spring-loaded) so that e.g. compensating movements are made possible and e.g. a raceway can be changed position (or change position under actuation or load) in such a way that e.g. the pitch at the current cam position is altered.

FIG. 14 represents a practical example of a cam surface that can be realized using the process and the resulting shaft torque at the brake actuator (y-axis) over the brake stroke (x-axis).

On the left, a practically still possible cam track is shown in bold in 0322, whereby the course at the inner beginning is already problematic. The small lower circle with connecting line to the roller 033 to the actuation cam is the fulcrum of a lever where the roller is located. The resulting brake actuator torque (i.e. motor torque) is shown in bold on the right and the deviation from a constant curve over the linear brake lining actuation stroke is therefore obvious. A full braking action corresponds to 1 g braking 017, usual braking of normal drivers reaches about g/3 at 017/3. In the area of air gap 068, it is not possible to achieve a higher or even constant motor torque here despite a steep cam start. The fact that the distance between "g" and "g/3" is so small is due to the force-displacement characteristic of this EMB and this brake lining (both have realistic backgrounds). By applying the above-mentioned improvement measures, such as more cam angle, larger initial radius or smallest possible roller, it is possible to achieve the darkly drawn curve of the motor torque, which is already more in the favorable range, but the torque still clearly does not remain constant, especially in the usual braking range up to g/3. The largely optimum (constant) motor torque could be achieved here only with other measures, such as sliding scanning instead of roller, very large cam radii, etc., but these are not proposed in the present procedure.

FIG. 15 represents a possible brake for a passenger car front wheel or similar, which reaches e.g. maximum 40 kN lining contact force (on left y-axis) and is operated with 0.4 mm air gap 068 (total air gap) and has a non-linearity with limited change of the transference ratio, as it is possible with the method presented here. With a contact pressure movement of approx. 1.8 mm (on the x-axis), the resulting contact pressure force (lower full curve referred to the left y-axis) increases in accordance with the stiffness curve against full braking, whereby such stiffness curves are usually not straight lines as with springs, but start soft and become hard against full braking.

The dashed horizontal line would be a constant actuator torque design (on the right y-axis) and would therefore theoretically result in the maximum actuator shaft performance regarding the theoretically optimal short actuation time.

However, the design proposed here is based on the fact that one does not want to alter the transference ratio too much and also not too abruptly and thus comes to a comparatively very unfavorable course of the actuator shaft torque (upper curve using the right y-axis) in favor of the advantage of mechanically advantageous designs (see further above). In general, it is hereby proposed to view the design as a relationship between the transference ratio (e.g. output torque to input torque) and the selected mechanical and geometrical realization i.e. the mechanical and geometrical realization will therefore result in the transference ratio. Or vice versa, the transference ratio is to be selected at each actuation point in such a way that a desirable mechanical and geometrical realization is found, therefore e.g. roller diameter, (minimum, maximum) cam radius, minimum radius of curvature of the cam surface. The process can also be iterative, starting, for example, with a desirable transference ratio over the actuation, then adding the mechanical and geometric constraints, determining the transference ratio from that, and then making, for example, mechanical or geometric changes to better achieve the desirable transference ratio.

It follows from this definition of the design process that neither the motor torque nor the motor power is therefore taken into account, nor should they be largely constant.

This definition can therefore be applied to the designs of all types of EMBs, e.g. also to a spring-loaded EMB, which for e.g. safety reasons automatically goes into the braked state and is released via the brake actuator, similar e.g. to a railroad air brake with spring.

For this purpose, an initial non-linear combination for the spring is proposed, whereby the relaxing spring is non-linearly replaced in such a way that the increasing lining contact force is achieved despite decreasing spring force. For this purpose, it is possible to combine non-linearities and make the spring act, for example, on a crank pin of the cam, giving, for example, the most tensioned spring a low torque generating angle, which can then lead to increasing normal distance when the tension is released.

The cam transference ratio achieved via the actuation can now be designed in such a way that this spring torque over the actuation is transferred into slightly more than the necessary contact force over the actuation. Here, therefore, a motor does not even appear. As a further requirement for the transference ratio, it can be taken, for example, that it reaches the actuation force in case of stiffness changes (e.g. from full to worn linings) and in case of air gap changes to be taken into account.

When the brake actuator now turns to release the cam, it must apply the remaining torque between the spring torque and the counter-torque from the brake. This brake actuator torque could now be demanded as optimal for the motor, or in some places as low as possible, in order to retain the brake as released with the lowest possible brake actuator torque at which safe actuation will just occur. In addition, it could be required that the brake actuator can also get the brake from the braked state to the released state if no brake disc or brake drum exerts a counterforce, e.g. during assembly.

From all these requirements, as described, one will get a desirable course of the transference ratio and then (also iteratively) check or determine the mechanical and geometric properties and, if necessary, arrive at a transference ratio that does not correspond to the desirable one, but fulfills the desire of feasibility. An additional non-linearity can also be installed, over which the brake actuator acts loosely. It doesn't have to be cams either, it can be any kind of non-linearity where you are looking for a path between demand and realization.

This resulting suboptimal actuation time or motor size can (but of course does not have to) be compensated by higher stiffness of the brake (since energy is force times displacement). An increase of the air gap to 0.4 mm also seems desirable in practice to support real lift-off of the lining.

Figure 16:
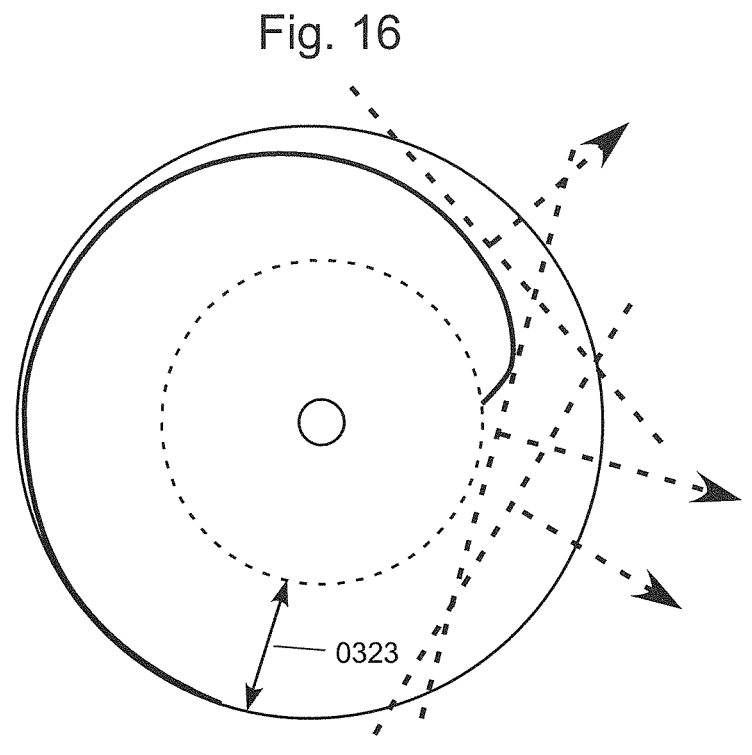
FIG. 16 illustrates a method for computer optimization according to embodiments of the present invention.

FIG. 16 represents a method generally known today for computer optimization which, for example, cuts away parts (dashed straight line in the direction of the arrow) from a solid (here, for example, the large circle) in order to achieve the required cam lift 0323 and checks the remaining part to see whether it gives a better or worse overall result and accepts the cutting away or not. A comparable result can be achieved in the same way as with the procedures in FIGS. 12A-12B and 13A-13B, although with a different procedure. Therefore, such procedures, which find a comparable solution by "trying", are also recommended here, which naturally includes in the extreme case that also e.g. humans (also with e.g. scissors and cardboard) utilize such procedures which can be called "trying" in any way. Of course, instead of "cut away", "add" could also be used, starting, for example, from the dotted circle, or "alter" in general.

Figure 17:
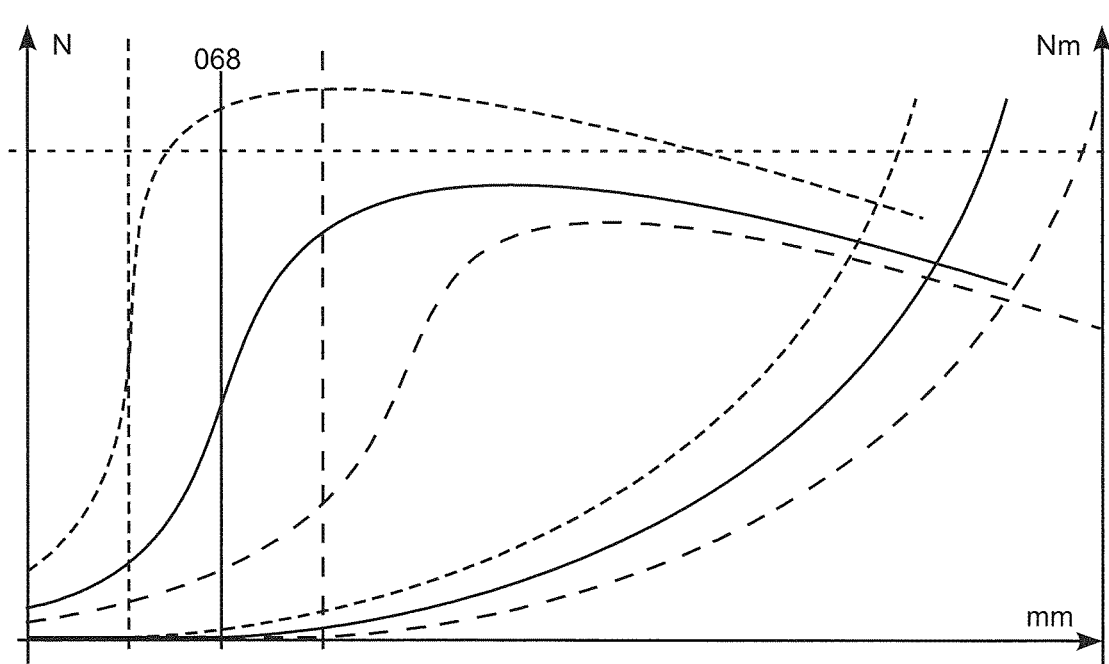
FIG. 17 illustrates the effect of the brake actuator torque on movement of the lining for the electromechanical brake of FIG. 15.

FIG. 17 represents curves for the EMB of FIG. 15 in a design which is as simple and inexpensive as possible, for example, in which no wear readjustment is assumed and the air gap therefore increases with increasing wear of the brake linings. The upper set of curves represents the resulting actuator torque (right y-axis), the lower set the generated normal force (left y-axis). The x-axis represents the lining stroke. The full curve with air gap 068 (0.4 mm) is the one which will occur, for example, after long operation. The long-stroked one, is the one which will occur, for example, at the end of the planned service life, although braking can of course still be applied with reduced full braking effect. The short-stroked one can be, for example, the new status.

The curves shift on the non-linearity according to the increase of the air gap and can no longer use it as with a constant air gap. The "new" curve will therefore have a too early contact force slope, at a still too steep non-linearity part, and will therefore deliver an excessive actuator torque, which, however, still has to be in an operable range. Since this condition requires less actuation time, then the brake actuator can be made to run more slowly, thereby lowering the electrical input power again. Conversely, the worn condition uses a flatter portion of the non-linearity, requiring less torque and power but also additional time for further movement. Accordingly, the motor could be made faster by field monitoring or other measures such as increasing the voltage or switching the windings.

Therefore, in this design, there is no longer an optimum, but only different cases to which the non-linearity can be favorably designed together, e.g. so that the maximum power increase is possible without any problems in the new condition, taking into account any slowed motor running. One does not have to divide the 3 areas into three either and can, for example, lay out one favorable "new" condition and put up with all the others with, for example, field monitoring or longer service time, especially if the wear is usually low and you can get by with extended time toward the end of the life. It is also possible for one to provide for a manual wear readjustment so that a "new" condition or better one can be restored. This range of adjustment can also be limited, for example, or can be made in a single step, so that the user cannot create an "insufficient air gap" condition. If the setting is incorrect, then action steps, countermeasures or warnings can of course be issued by the control electronics.

FIG. 18 is similar to FIG. 17 (same axes) and represents the method of "evasive motion" via e.g. movable holder of non-linearity, i.e. e.g. pivoting or movable holder of motor-cam assembly.

In FIG. 18, the non-linearity of the worn condition (long-stroked) has been "advantageously" designed, thereby showing that it again amounts to a compromise. When the new status (short-stroked, thin) is present, then this non-linearity would not be actuation-capable in a permissible way because the brake actuator torque became too high. The brake actuator, with cam, can now swerve (e.g. rotate around a fixture), thereby causing the cam to rotate to a flatter part, which subsequently causes the motor torque to drop again as shown by the darker arrow.

Rotating away can still continue and therefore already causes a strong lowering (e.g. according to the thicker arrow).

This displacement pressure against a spring is, of course, first and foremost "lost energy", because it goes into the spring instead of into the motor actuation. This effect can be limited, for example, by pressing the spring against an end stop and deforming it only when the end stop spring effect is exceeded. The "lost energy" can also return when, for example, further ongoing actuation causes the spring to relax again.

The control electronics can either recognize the curves resulting from the path movement (e.g. in the torque-angle behavior) or adjust to the wear condition. However, the displacement or rotation of the holder can also be detected, e.g. also only point-wise when (e.g. in actuator angle) e.g. a stop is left. Since this alteration takes place slowly over various wear, the electronic systems can also strongly average or otherwise statistically detect it and e.g. smooth it.

Such torsion or movement influence on the assembly support can also be executed in other ways, e.g. via wheel suspension. The actuator assembly does not have to be twisted or moved, the roller lever or another part can also be influenced.

In FIGS. 19A-19E, for example, it is proposed how a known and frequently used spreading part 051, with an unbraked layer 053, a braked layer 054 and a spreading part pivot 057, can be advantageously modified for pressing on the e.g. two brake shoes 067 with brake lining 063 (schematic), (whereby similar pressing could naturally also be used in other brake designs, such as e.g. disc brakes or brakes located on linearly running rails and in this case also e.g. only a single pressing movement is used). The stroke can be so small that only the contact pressure is possible and therefore an additional wear adjuster is required, which, for example, presses the other end of the brake shoes apart. Or the stroke can be so large that the spreading mechanism can also cover for the wear involved.

FIG. 19A represents a common low-cost spreading method, where one part is twisted between the brake shoes similar to a flat-blade screwdriver. Due to the angular displacement of the contact point, the edges scrape, abrasion and relatively high mechanical losses occur, which not only increase the actuation energy, but also cause unpleasant hysteresis, so that the brake requires significantly less force for release than for actuation. However, this solution is not excluded here. It is physically less advantageous, but can be less expensive and can also be replaced by improved variants, such as those with rounded edges or with compensating parts that come into contact with the spreading part or with those of a behavior favorable to "scratching".

Here, as a modification of a common expansion part, no complete elimination of the height variation is now proposed, but only a good reduction or, if necessary, it is assumed that a height variation can even be desirable in order to follow other movements, e.g. a brake shoe movement or e.g. a movement caused by deformation. If the loss-generating relative movement between the expansion part and the brake shoes is reduced by simple means (as suggested above as an example), e.g. to less than ⅔ of the unfavorable situation, then the right path has already been taken. These mechanical losses of the known spreading part can have been accepted up to now, e.g. in the case of a hand-operated drum brake, because the hand force, for example, was sufficient for brake application with a suitable transmission and there was therefore apparently no need for improvement. In the case of an EMB, however, the mechanical losses must be overcome by the actuator, and so the actuator size (installation space, weight, cost, etc.) is very much affected by whether it has to deliver, say, 50% to 100% more power. In addition, the mechanical losses also worsen the relationship between actuator torque and contact force. For these and other reasons, this improvement with the aforementioned spreading part is recommended for the EMB. It should be mentioned here that there is another well-known variant with a so-called S-Cam for drum brakes, in which, however, a roller runs on the S-Cam at each brake shoe and therefore a different path is taken.

For this purpose, two overlapping motions are applied, a rolling process on a circular rolling path and the angular elevation. An example is represented for how one can create cost-effective and easily finished or produced roll-off webs in the form of pins. For this purpose, e.g. in FIG. 19B, two punches can be drilled in a round part which is still void, and then the defective material can be removed, e.g. by milling away. Of course, these steps could also be executed with other methods, such as e.g. stamping, pressing, forging, casting, sintering or cutting. Now the pins or needles or rollers etc. can be inserted into the remaining material in FIG. 19C. These unrolled surfaces can also be created in a different way, rather than with pins, i.e. arbitrarily, e.g. by chamfering or sintering, and do not have to be exclusively circular shaped or circular-part shaped. The needles (and/or respectively cylinders, pins or rollers etc.) also do not have to be pressed in, they could also be formed, for example, by pressing or forging the entire part, but they are nevertheless described below under the designation "pins" or similar. The position and diameter of the roll-off pins is now selected in such a way that the scratching relative movement between the brake shoe and the rolling surface becomes small (FIG. 19D), although it is never possible to achieve exactly zero, because the rolling movement is proportional to the angle rolled off and the height variation comes from an angular function. Advantageously, one will also include the rotational movement of the brake shoe around its (here lower) bearing point, so that one would like to follow this rotational movement well as a target.

Figure 19D:
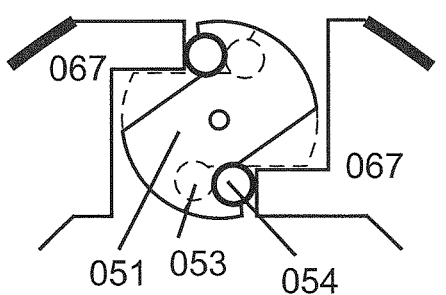
Figure 19E:
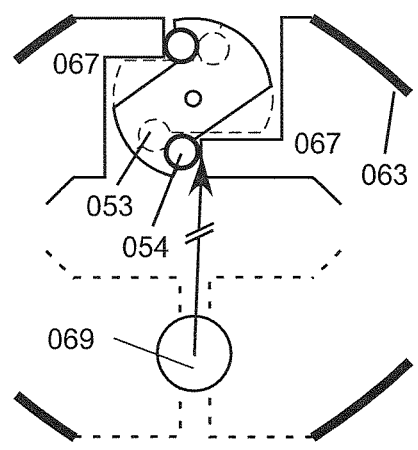

In FIG. 19E, it is shown that the two brake shoes 067 needed fundamentally different movements of the pins. Assuming that the brake shoes make a circular movement through the lower bearing of the brake shoe support 069 (indicated by the arrow from 069 upward, interrupted to indicate that the vertical spacers are pushed together), which minimally moves downward when pressed against a pin at the contact point. Now the upper pin had a combination motion of its circular path around the center of rotation and its rolling along the circumference of the pin. This combination should make small relative errors at the pin contact point against the shoe contact movement, which can be supported by pin radius and pin spacing as well as the beginning and end of the pin twisting movement. A symmetrical lower pin, however, due to its circular motion, would naturally develop this component exactly opposite to the upper pin. Therefore, while an arrangement that is point-symmetrical (with respect to the pivot point of the pins) to the upper pin could possibly also produce acceptable behavior, a more favorable solution would be to improve the area of the circular path of the lower pin more favorably in such a way that more downward motion is produced by the circular path at the lower pin, as shown on the far right by the fact that the pins are not exactly point-symmetrical to the pivot point. Of course, one could also or additionally, for example, make the two pin diameters different or also utilize non-circular pins, for example. The dashed line represents an unbraked initial position in which the brake shoes leave an air gap to the drum. The thick circles show the pins at a maximum possible angle of rotation, which could correspond, for example, to a full braking with maximally worn linings, if one also wanted to cover for the lining wear from this rotational movement. The position of the lower pivot point of the dashed lower halves of the lining is naturally abbreviated and not true to scale. The shown position of the lower pin was a slightly smaller movement in horizontal direction than at the upper pin, because the horizontal component of the angular function acts at a slightly different angle than at the top. This can be neglected simply because of the wear that occurs on the lining, or it can be compensated for by giving the lower pin more center distance. The radius of the two brake shoes (from the pin to the pivot point) can also be slightly different, so that these differences in the position (angle, center distance) of the two pins can or should also be taken into account.

It is therefore possible to find optimal designs for the pen movements and shoe movements, whereby the entire movement sequence on the pen follows the shoe movement well in the sense of a local optimum, and this is also one of the design goals.

However, one does not need to emphasize the remaining relative motion error, because in the area for overcoming the air gap, the press-on force is small and therefore the losses from the relative motion are also small. The amount of movement for lining contact for normal braking can also be small, so that small remaining relative errors need not be of primary concern. If a larger rotation is needed in order to cover the lining wear, the contacting part of the movement will again adjust absolutely so that the height errors which could exist can balance each other out.

The focus can therefore also be on transforming a comparatively quite poor situation in terms of "scratching" and losses into a significantly better one while, at the same time, still ensuring good manufacturability and favorable mechanical loading (e.g. of the small unwinding radii and the remaining cross-section of the center support) and coordinating the optimization of the pins and their positions with these necessities. The essential goal is to move clearly from the unfavorable condition of the screwdriver-like part to a reduction of the unwanted relative motion, aiming at mechanically and geometrically reasonable solutions, and not to aim exclusively at an approximation to a mathematical optimum. It was also possible to get by with only one contact pressure pin, e.g. with duplex brakes and two such spreading mechanisms, or it was possible to arrange the center bearing of the spreading mechanism in a lining shoe and spread the second away from this shoe with only one pin. The described spreading parts will have a slight non-linearity, which can be used, for example, to compensate for different brake stiffnesses with different lining wear. However, their slight non-linearity can also be taken into account elsewhere, e.g. in the case of a non-linear drive of these spreading parts. This rotatable spreading part does not necessarily have to be driven from the center of rotation, but can be rotated in any way, e.g. by attaching a lever to it or, for example, a gear drive. The center of rotation also does not have to be supported and it does not have to be used, for example, a lever could be on the rotatable spreading part and the center of rotation could be neither supported nor used, for example, but simply result from the rolling movements.

In FIG. 20, it is proposed that a recess 0311 can be located in an area 082 which is not required for braking, which here, for example, pulls a lever with the lower driver 025 upward, bringing progress on a ratchet-like (here star-shaped) gear 026 and thus turning the brake-actuating shaft in the direction of more-braking. Such a ratchet advance could also be obtained as shown, for example, with an impact method from a black rectangular lower driver 025, where this end stop can turn the ratchet in the direction of wear adjustment. Of course, other positions could be used for wear adjustment, e.g. 025 at the top, for more cam rotation than for full braking, but here it is usually more difficult to operate the wear adjuster. However, it was also possible, for example, to carry out a force- or torque-limited ratchet advance in the area 081 used for braking during normal braking operation if this force does not yet occur above a certain expected contact force and to use the limitation to ensure that too much adjustment is never carried out. In general, in all embodiments here, any device can be used as a "ratchet" which behaves in a directionally dependent or controllable manner, regardless of whether it is, for example, gearing, friction locking, wrap springs, clutches etc. Therefore, for example, the "shock for ratchet progress" could simply be mechanically applied to the leg of a wrap spring. The arrows indicate the different settings for additional rotation of the wear adjustment. The inner, readjusted toothing was twisted, for example, an expanding part 051 or a S-Cam 056 for lining contact (schematically indicated).

Figure 21:
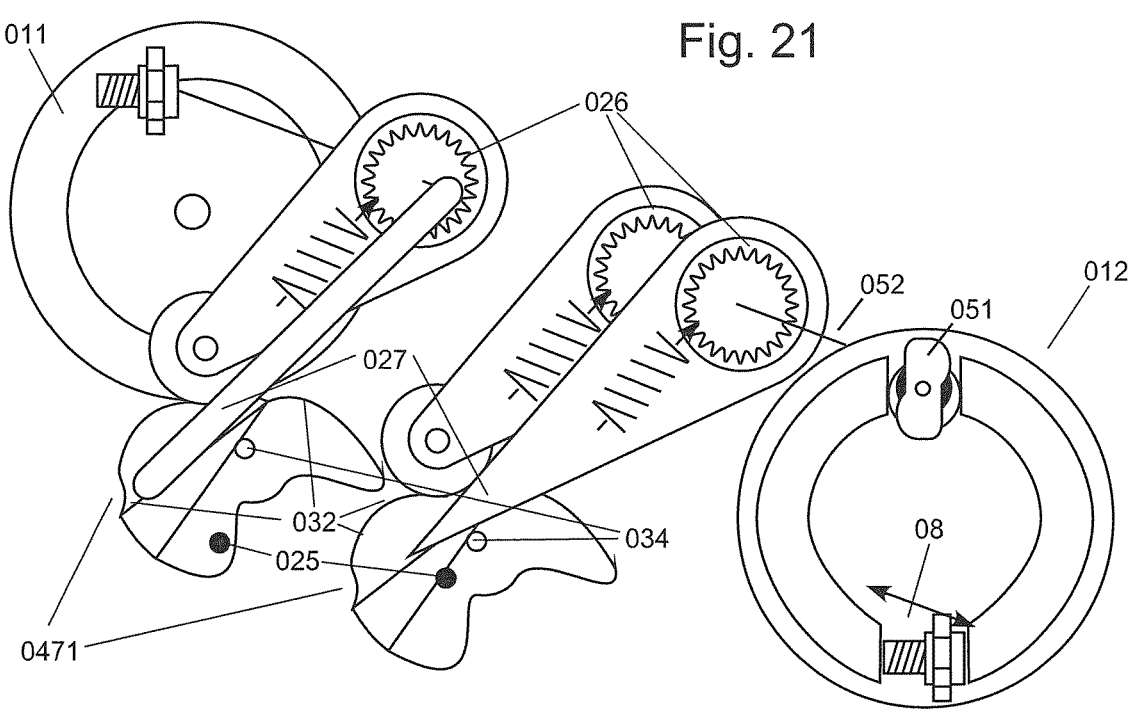
FIG. 21 illustrates exemplary components of the brake device according to embodiments of the present invention.

FIG. 21 represents proposals for how three functions can be derived from the brake actuator movement (e.g. normal service brake operation, wear adjustment and a parking brake position, which can also be held permanently), whereby again e.g. several brakes can be addressed together or e.g. only one and e.g. brake discs 011 or brake drums 012 can be used, naturally preferably the same ones (in contrast to FIG. 21).), naturally the principle can also be used with only one brake instead of two, naturally only one of the levers with the teeth 026 is needed and the others only show possibilities. It is also indicated that a common contact pressure rotary movement over the gear teeth 026 also includes the wear adjustment or, for example, a separate adjustment movement is performed on the wear adjustment actuation 08, here as known, for example, between the brake shoes. The operating cam 032 with cam rotation axis 034 has a constant height gain for the service brake in one direction of rotation and in the other direction of rotation, for example, a depression or a path with a constant radius to the cam rotation point as parking brake position 0471.

In the case with the "ratchet" (or similar), when the cam was turned and therefore the lever swivels (upwards in the figure) with the roller, the force was transmitted to the darkly drawn brake actuation shaft, e.g. on the right via the spreading part drive 052 to the spreading part 051.

On the disc brake 011 in the left section, an adjustment lever 027 is directly connected to the brake actuation shaft. This lever can be pressed upwards in a special position, which causes progress on the "ratchet" and therefore causes the wear readjustment. Here, for example, a parking brake sink is operated with so much contact pressure that enough parking brake effect is created, but the linings could still be pressed on. A special part, in this case e.g. a pin or follower 025, lifts the adjuster lever if, for example, the cam rotation is greater than that required for the parking brake position. If this lever now turns the ratchet forward (more contact pressure), then the brake is again correctly (or better) set and, from the point of view of the brake actuator, is again operated at correct (or better) actuation angles, as corresponds to a correctly set brake. However, since in this case the adjusting lever is directly connected to the brake application shaft, then the adjusting lever must be operated further and further for new ratchet progress, since it is connected to the pad contact pressure and this moves closer and closer to the brake disc with wear. Nevertheless, more cam torque should not necessarily be required, because more wear results in less counterforce from the brake actuation and, on the other hand, the "pin" or driver 025 and the adjusting lever can be arranged and shaped in such a way that the desired behavior results. They can also be cam-like in appearance and design, and the "pin" can be anything, for example, also a roller. How, and at which cam position exactly the (here exemplary) upward movement is triggered, can be solved in many ways. This method is therefore particularly suitable when little wear is to be expected, as could be the case, for example, with bicycle brakes or bicycle trailer brakes, or with parking brakes, where actually no or hardly any wear occurs when they only hold the vehicle stationary. The aforementioned case is of course not bound to just brake discs, the friction surface could also be a drum or rail or another type.

The adjustment lever on the shaft therefore has the property that it must be turned further and further as the wear readjustment increases. This effect was treated here with a "double ratchet" for the drum brake in the right area of the figure. The function is almost the same as described, except that the readjustment lever 027 on the right can also make a progress on its "ratchet" after the readjustment process in order to remain in the range of the old position, so as to essentially always perform the readjustments in a similar or the same swivel range. For these two "ratchets", common parts can also be used, such as e.g. the teeth on the shaft or friction partners or the wrap spring or its shank, so that, for example, one ratchet action is operated with one wrap spring leg and the second ratchet action with the other wrap spring shank. There can also be intentional friction between all the parts which are described here e.g. In order to prevent unintentional twisting or rotation of the "ratchets", e.g. due to vibration. Of course, other friction surface areas can be utilized as drums, such as for example discs, rails or others.

In the lower area of the right drum brake, it is shown that it was also possible to apply a separate readjustment movement to a wear readjustment actuator 08, e.g. as a rotary movement or, as indicated by the double arrows, as a pushing movement which can, for example, turn the adjustment screw in a ratchet-like manner.

In general, it is proposed that if the need for adjustment is detected when the contact force is large, such as e.g. when there is a lot of contact movement (this can be from contact actuation of an actuation spring, for example, or from parking brake positions or those with more actuation movement than for the parking brake position), then readjustment can usually be difficult to impossible when the press-on force or portions thereof are on the adjustment. Therefore, for example, the following solutions are proposed: either the readjustment actuation becomes so strong that the readjustment movement becomes possible, or the readjustment necessity is "stored" and then executed when readjustment is again possible. In order to do this, one can intentionally move or turn a ratchet in the non-adjusting direction so that the ratchet is moved e.g. one tooth against the adjusting direction and this is also possible because the adjusting shaft or the adjuster are heavy-going due to the press-on pressure, but the ratchet arm can make e.g. one tooth against the adjusting direction of rotation. This movement was made, for example, against a spring, at least against a part which can "store" this intention. When the brake is released again, then this spring can then turn the adjuster shaft or adjuster in the direction of adjustment when it is released. Such "ratchet-like functions" can be e.g. ratchets, wrap springs, friction devices etc. and can be combined locally or e.g. at the drive unit of the actual readjustment device located in the brake, i.e. e.g. in the drive unit of adjuster screws or as angular drive of adjuster screws, where e.g. the adjuster shaft is turned by e.g. 900 against the screw axis, which can also be proposed e.g. with "ratchet-like" designed wheels like bevel gears.

Figure 22:
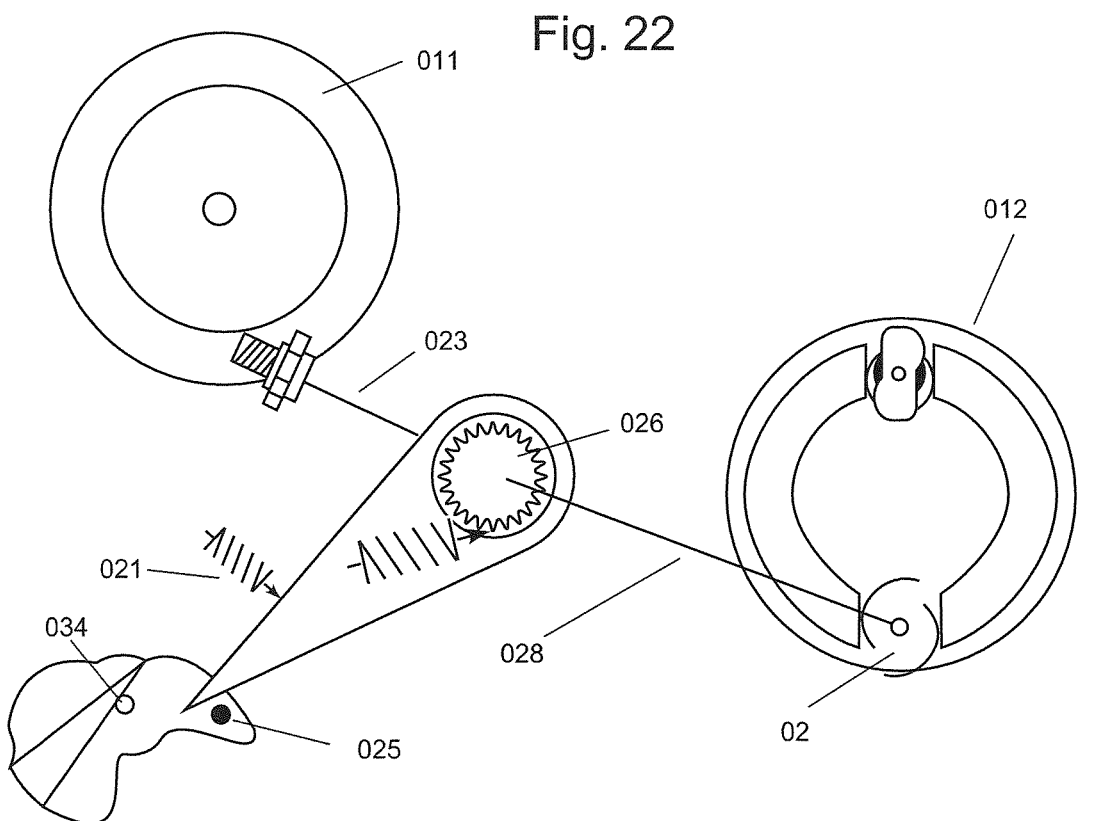
FIG. 22 illustrates exemplary components of the brake device according to embodiments of the present invention.

FIG. 22 represents an example of a possibility with its own wear readjustment, although the principle can of course also be applied when the lining pressure itself also assumes the wear readjustment function at the same time through the possible stroke, and again preferably two identical brakes are utilized or only one is utilized.

A "possible force limitation or torque limitation" such as e.g. with a possible slipping clutch 023 can advantageously ensure, for example, that excessively incorrect, excessive readjustment is impossible because the limitation is not capable of doing so. For example, a possible spring effect from a spring for wear adjustment 021 cannot allow incorrect adjustment, which has a more unfavorable effect than slightly abrasive linings. A "possible travel limitation" can also be used, e.g. instead of a slipping clutch 023, to ensure that the adjustment process does not adjust over the travel or angle of the desired air gap, but already adjusts when more travel or angle occurs in the pad lift-off movement. The path of the air gap can be evaluated e.g. from "with rotatable wear adjustment". The wear adjuster shaft or rod to the brakes or the adjuster in at least one brake may intentionally have so much friction in the wear adjuster 028 or be provided with additional friction that unintentional further rotation of the wear adjuster (e.g. due to vibrations) is not possible. An additional ratchet with toothing 026 for the adjustment movement can also be recommended for specifying the adjustment direction. A combination ratchet with friction can be recommended, for example, in the form of a wrap spring. Without these additional components, the adjustment can also be carried out functionally, if necessary. In the case of a drum brake with brake drum 012, for example, a spreading wear adjustment 02 can also be used. Naturally, both brakes should always be the same or only one can be utilized. With all of the above, it is advantageous to always determine during the wear readjustment whether the behavior corresponds to the expected one and to subsequently derive actions from this, such as, for example, adjusting more, less, or not adjusting, warning, or storing deviations. The readjustments can also be designed in such a way that incorrect (e.g. too large) readjustments are deemed to be as unfavorable as possible, i.e. are not possible, e.g. due to the required actuator torque.

In FIG. 21, the parking brake position was located in the cam area opposite the service brake, so active service braking had to be released before parking brake 16062 can be executed. Therefore, for example, only a single, currently active, brake will be moved from a service brake position to a parking brake position on demand and, if possible, not all brakes simultaneously. However, the parking brake positions can also be affected in other ways, e.g. at the end of service braking or by locking a brake position by means of a holding device. However, a separate actuator could also be used for the parking brake, which could also perform other functions, such as wear adjustment or emergency braking.

Figure 23A:
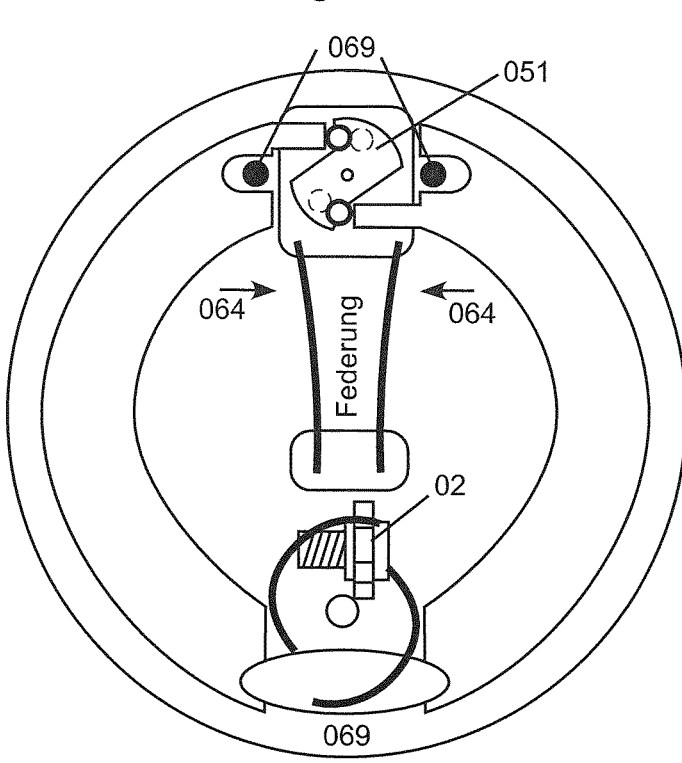
FIGS. 23A-23B illustrate exemplary components of the brake device according to embodiments of the present invention.
Figure 23B:
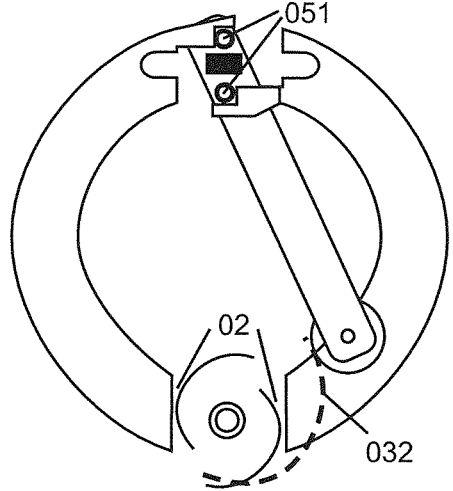

In FIGS. 23A-23B, further advantageous examples of wear adjustment and braking force detection are shown on the basis of an internal shoe drum brake, although similar other designs are also possible, such as disc brakes or brakes for linear movements, e.g. on rods or rails.

In FIG. 23A it is shown that the spreading part 051 (above)can also be movably mounted and is to be in an initial position, for example, by spring action or, for example, by a driving force measurement 064. If the driving force measurement 064 is now rotated by the braking force, a position sensor, a force sensor or a switching or however detecting function can detect the braking force or trigger a switching function at least at one point of the braking force, for example, different possibilities being indicated in FIG. 23A with the arrows 064. This can be used, for example, to support a "hillholder function" in which, for example, it is detected that a vehicle is being braked but wants to roll back and, when the drive force is applied, leaves the rolling back force component, becomes non-rolling back and then possibly even pulled slightly forward on the brake. From this, a favorable point for releasing the brake in favor of starting forward travel can be determined. Possible brake shoe supports 069 can shape the freedom of movement and/or force dissipation.

This drag force measurement 064 can also be utilized in order to increase accuracy, e.g. by detecting the point of slightly dragged linings or even by measuring the braking force and also controlling it, for example. A possible lower brake shoe support 069 could also be mounted together on, or together with this movable capture, or could also be freely movable relative to it. The possible brake shoe supports 069 can be used, for example, in order to restrict the range of movement of the drive unit, which can also be used, for example, to prevent unpleasant noise development, such as squeaking or rattling. For this purpose, the end stops can also be soft or rubbery, for example. The possible lower brake shoe support 069 can, however, also be utilized for a servo function in which the bearing of the spreader part is carried along by the braking force on the "primary shoe" and therefore (here below) the "primary shoe" exerts a further contact force on the "secondary shoe". The "secondary shoe" will rotate and then be stopped by brake shoe support 069 or driving force measurement 064. This can (but does not have to) be executed symmetrically in both directions of rotation by means of two stops, but it could also be done, for example, by pressing on only one shoe with the 051 spreading part or otherwise bringing about an asymmetry of the braking effect depending on the direction of travel. Mainly in these servo drum brakes can be in the actuation of the spreading part another non-linearities, e.g. spring, so that in case of standstill without self-amplification the thus higher driving force of the spreading part can first go into e.g. spring deformation and in case of self-amplifying rotary motion then the actual expected rotation of the spreading part can take place. "Top" or "bottom" have only explanatory effect and can be placed arbitrarily as differently.

In the lower section of FIG. 23A, it is still shown that the lower brake shoe support 069 can also be designed, for example, with a wear adjustment 02 (e.g. adjustment screw) or with a cam or double cam (indicated by thick cam tracks at 02) and can, for example, dissipate the force or pass it on to the other shoe. One can therefore still favorably select and design the bearing point for each cam track in such a way that the shoe is positioned geometrically favorably according to the wear of the lining. A cam track can preferably be relatively flat in order to keep the force acting on this cam drive from the lining pressure low via friction. The drive of such an adjusting cam or adjusting screw can, for example, come from actuator areas not otherwise used for braking or from the brake actuation. Advantageously, for example, an adjustment can be "noted" "behind" a parking brake position, e.g. by means of this spring actuation, and can then be used to readjust the position after the brake has been released. Or, for example, after a certain brake application, an attempt can be made to apply the adjustment by means of a torque or force limit, but this would be impossible if the adjustment had been set correctly, because the lining contact force or even the driving force would require more adjustment torque than is possible via the limit. Advantageously, e.g. a wrap spring ratchet can hold the position of an e.g. adjustment cam (or double cam), since it also generates static friction in the holding state and only allow movement of the e.g. cam in the adjustment direction, and a second ratchet action can serve to rotate the e.g. adjustment cam in the adjustment direction and the adjustment rotation can be torque limited via e.g. a slip clutch. An adjustment cam does not have to have a cam track located on both sides for both shoes, rather could also be mounted rotatably on one side in one shoe. The parts of FIGS. 23A-23B can be mounted in various ways, e.g. on rotatable plates, which also include, for example, a driving force measurement. Also entrainment force control is proposed by entrainment force measurement.

FIG. 23B below represents a possibility of a close, e.g. concentric, drive unit for readjustment and press-on force, whereby on the one hand a wear readjustment 02 (e.g. wear readjustment cam or screw) is driven and on the other hand a contact pressure actuator, shown here in dashed lines, here e.g. an actuator cam 032, which drives the spreading mechanism via a lever. It can also be seen that the spreading part 051 of the lining pressure does not necessarily need a guided center, but can also be held in place in other ways, e.g. via the shown upper and lower guide of the pins, which here form the spreading part 051. The guide is also necessary only mainly in the air gap or at small forces, since at higher contact pressure the friction of the pins on the rolling surfaces takes over the guide, therefore the black guide between the pins would be more advantageous here.

If the center of the spreading part is not guided, the advantageous roll-off designs of the pins, which have been explained here earlier, become simpler, since not each pin has to be designed favorably with respect to its guided pivot point and the brake shoe movement, but without guided center only the movement of both pins with respect to both shoes is important and the pivot point is free to wander.

In such cases without a guided center, the pins could be pressed into a "flat-iron" lever part or pressed between two "flat-iron" lever parts or fastened in another way, e.g. by soldering, welding, gluing or riveting.

FIG. 24 represents a proposal for a brake actuation with spring action, where at 0571, for example, one can imagine an expanding part rotary axis which is rotated for braking.

In this case, for example, a service braking function is supported by the upper actuating spring 042 in such a way that the service braking function can loosen itself, i.e. the spring support is less than the effort required to apply pressure, in which the upper actuating cam 032 extends relatively steeply. This can save actuator operating energy, among other things. This interpretation, for example, could not solve itself completely, but largely enough.

The cam side of the parking brake function (lower actuating cam 032) runs flatter so that the spring can always actuate, whereby "steep" and "flat" always refer mathematically to the resulting non-linearities and the forces or moments must always be related correctly and consistently.

It is now possible, for example, to design the flatter parking brake side in such a way that, with the wear adjustment correctly set, the parking brake side is not spring-loaded to the end. If there was too much wear, the parking brake side was then rotated further and a wear adjustment was drawn or marked. This adjustment position could also be approached actively with the brake actuator if actuator-controlled parking braking was necessary.

The parking brake positions were spring-loaded to remain in the absence of power, and when the power is turned on, the brake actuator can resume the required braking and functions. In this design, the spring could act on the cam in a crank-like manner, for example. However, this ties the non-linearities of the spring to the cranking behavior.

Of course, as shown in dashed lines, the spring could also be provided with any other non-linearities, such as with its own cam (the dashed actuation cam 032 or double cam), which would therefore naturally bring much more design freedom. Under certain circumstances, both cams could even act on the same roller.

It would also be possible, for example, for one to alter the spring pre-load (indicated, for example, by the arrow on the upper actuator spring 042) in order to switch the EMB from a parking brake behavior to an automatic service brake behavior and therefore to utilize only one cam.

Since it does not matter in principle how the actuator motor and spring will interact in precise mechanical terms, all that matters here is that they can interact via linear transmission units and non-linear transmission units, wherever and however the parts are arranged.

In FIG. 25, an advantageous lever is proposed (as it is also realistically conceivable in these proportions), which will therefore execute rolling movements between the rotated press-on surfaces 0591 and non-rotated press-on surfaces 0592 and is actuated at the long lever arm with a non-linearities 03, e.g. an actuating cam 032 on a roller 033. In the case of the rotated press-on surfaces 0591, roll-off cylinders are considered to be favorable in terms of production technology, they can be hardened and are very well rounded, which will become important here later on. In principle, however, it is still a question of this unrolling of round parts, whereby in principle every manufacturing possibility is open and they are therefore generally referred to in the following as "unrolling cylinders" (whereby other, non-circular and/or non-cylindrical geometries are also permissible here), both designated together generally in the following as spreading part 051.

Spreading part 051 of FIG. 25 would therefore generate 0.6 mm y-movement at 1 mm contact pressure stroke per rolling cylinder due to the angular function of the rotational movement, but about 0.7 mm y-movement due to rolling on the circumference of a rolling cylinder and thereby cause a total y-error of 0.2 mm at full braking with 2 times 1 mm stroke, since the errors at both rolling cylinders will therefore add up.

FIG. 26 represents the "stalling, sideways and/or scraping" y-movement (y-axis) over the contact pressure stroke (x-axis), whereby the full line at the top indicates the y-movement through the angular function and the dashed line at the top indicates the y-movement through the rolling circumference, where ideally both should be equal in this case, but here an error remains, which is indicated by the upper arrow. The lower curves are thereby the same, except that they cause the y error to move in the other direction. When one reduces the rolling circumference, then this proportionally results in less y-movement and the y-error can lead to a smaller y-movement with a smaller rolling circumference (dash-dotted line) as shown below, which can also lead to a different sign of the error. It is therefore also proposed than one can reduce the total y error by combining different rolling cylinder diameters, but never completely eliminate it because an angular function and an angular proportional rolling circumference are never exactly the same.

In this case it is proposed to also dispense with rolling along a straight line as perfectly as possible and to find a different, more reality-based approach, which will also concentrate on creating good manufacturability, and marketable, preferably very well circular-shaped rolling cylinders, and thereby also permits contradictory, apparently suboptimal solutions with regard to the movement being as "straight-line guided" as possible.

Figure 27:
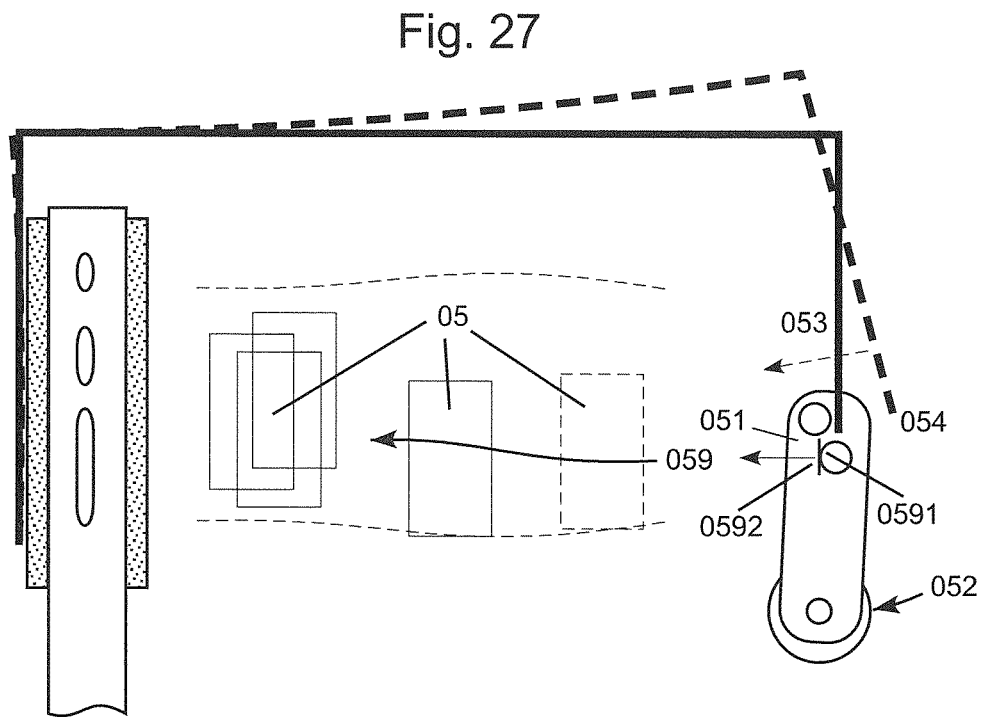
FIG. 27 illustrates exemplary components of the brake device according to embodiments of the present invention.

In FIG. 27, it is shown that in the case of lining pressure for a disc brake, no "guidance" is required as in a hydraulic pressure cylinder. On the contrary, the upper and lower curved dashed lines are intended to show that (as suggested here) there will be freedom of movement, which need not be sharply limited, rather for example can also behave elastically. In this case, a contact pressure 05 (e.g. a wear adjuster)

is therefore pressed in some form of contact pressure movement 059 by a spreading part drive unit 052 and thereby deforms the brake e.g. also from the unbraked position 053 into the e.g. braked position 054.

This thereby results in different ranges over the contact pressure process, starting with the range of the air gap and small contact pressure: Here, the rightmost contact pressure 05 (here a part, which participates in the lining contact pressure, e.g. also a wear adjuster) will have some initial position, which can be e.g. also located in a lower position due to weight, but can also have a different y-position due to e.g. vibrations. Due to the small press-on force between the rotated contact surface 0591 and the non-rotated contact surface 0592, there is hardly any wear or loss of operating energy. With additional, ongoing actuation (increasingly left 05), the "error" from the rolling circumference and angular function according to the aforementioned illustration, for example (intentionally designed or provided by geometry), is such that with higher friction (between rotated contact surface 0591 and non-rotated contact surface 0592) the pressure pad moves downwards. In this area, therefore, a transference occurs between the above first area and this one. In reality, in this example, a (also random) position of the area of the rightmost 05 can alter into this area via compensating movements (e.g. downward movement of the pressure pad, relative friction movement between rotated pressure pad 0591 and non-rotated pressure pad 0592). One area is indicated here for heavy braking, where significant deformation (e.g. bending) can therefore occur. In this range or area, a higher "error" between angle function and rolling is accepted or aimed for, in order to compensate thereby even for the height alteration by deformation with a favorable movement. It is completely up to the user for how many areas and/or ranges are to be included and with which behavior, the essential thing is that lateral compensating movements and/or frictional compensating movements are permitted here and even geometry alterations too (e.g. due to deformation), which can be compensated for.

Figure 28:
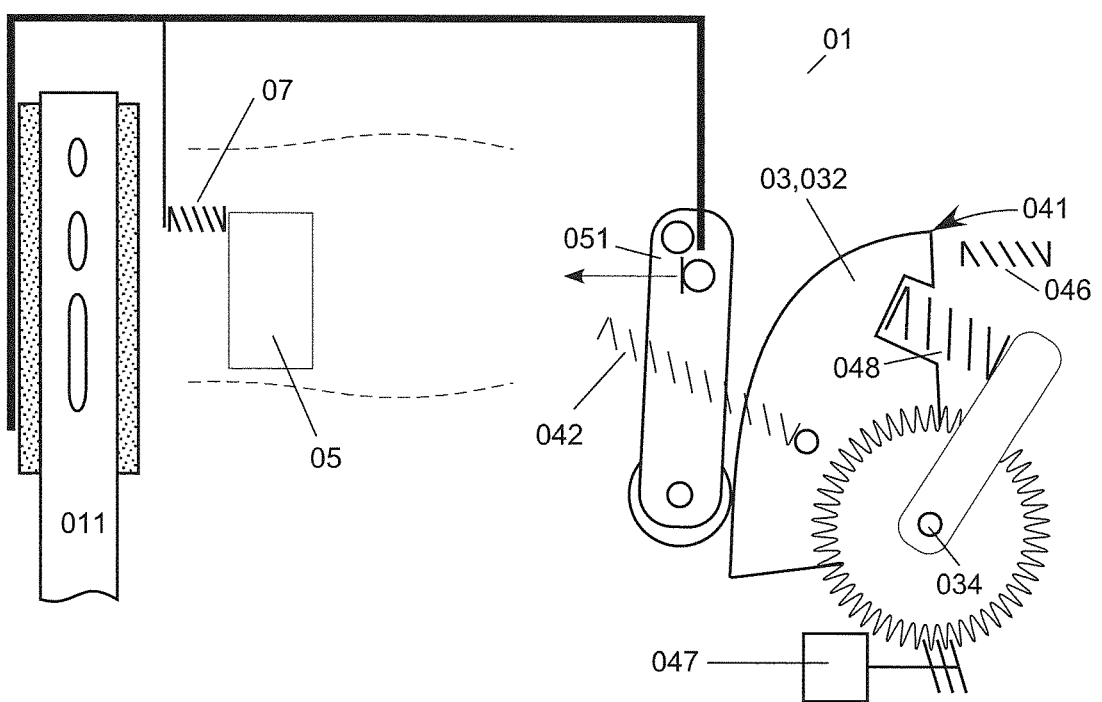
FIG. 28 illustrates exemplary components of the brake device according to embodiments of the present invention.

In FIG. 28, a brake is represented where the brake actuator in this case e.g. comprises three drive units and one part (e.g. motor 041) acts on the non-linearities 03, e.g. an actuation cam 032, via e.g. a gear train in such a way that e.g. a self-releasing of the brake can occur in case of a power failure of this motor 041. In addition, an actuating spring 042 (drive unit 2) can support the actuation of the brake or the slackening, or, as is the case here, as a compression spring support for the slackening for weak braking and the actuating for stronger braking. This actuating spring 042 does not have to act directly on the non-linearities 03, rather it can also be arranged and act in any other way. As the third drive unit for the entire brake actuator is here an e.g. electrical parking brake drive unit 047, then it can take place however also differently, e.g. with cable pull. In this case e.g. a worm drive unit prevented the parking brake from becoming loose in the de-energized status. The parking brake spring 048 can be present as a resilient coupling member and can therefore, for example, continue to rotate the actuating cam 032 when the brake cools and requires re-tensioning. For this purpose, the actuating cam 032 can also comprise two (or more, when limitations and/or further functions are desired) cams, so that one can also be specially designed for this further rotation. The parking brake area of a cam can also be located, for example, in a different direction of rotation.

This parking brake drive unit 047 can, of course, also be utilized as a safety function for failure of the other motor which is acting on the non-linearities for service braking. However, this could also be, for example, considered as a cable pull without worm drive, which comes into effect, for example, in a bicycle brake, when the motor which is acting on the non-linearities fails. The parking brake movement of the non-linearities can, for example, be executed separately from the other motor via a free-wheeling function, so that the parking brake position of the non-linearities can be achieved, for example, when the other motor is not rotating. A different effect of the actuating spring 042 is also recommended here, when e.g. both a stable "fully released" position and e.g. a stable "well braked" position with e.g. only one non-linearity is to be achieved (which can be useful or meaningful in the case of e.g. a bicycle or bicycle trailer): In this case, for example, one could attach the actuating spring 042 e.g., in a crank-like manner (to, e.g., the non-linearities), in such a way that a relaxation of the compressing actuating spring 042 occurs in the released direction and also in the actuated direction, with, e.g., a dead center located in between (similar to that which is indicated in FIG. 28). The vehicle (e.g. bicycle trailer) could therefore continue to drive with a fully released brake as well as a parked trailer could remain in parking brake position when the power supply is removed. The parking brake position could, for example, also be brought into the "released" position without any current by means of a manual actuation. Since with this actuation spring effect, there is a spring effect from the point where the dead center is exceeded, which has an actuation-supporting effect, low actuation power operation is therefore possible, i.e. the electric motor power for actuation can be less than without a spring and even holding an actuation position can now become possible without current when mechanical friction losses in the brake actuation and the so-called cogging torque of the electric motor can hold the actuation position on its own.

Of course, locking devices or braking devices can also be provided and/or present in order to retain the actuator in a certain position. Also when this brake can be released with manual actuation, electronic theft protection is still possible: once power is restored (e.g., wheel hub dynamo), then unauthorized operation can be restored to the braked status with the brake's electric motor.

Another safety design of the activation spring 042 would be e.g. that it should always cause a braked condition: A bicycle or, for example, a railroad vehicle could therefore be brought into an e.g. braked status in the event of a complete power failure (or an e.g. shutdown for e.g. safety reasons) and go into an e.g. usual braked condition, which can, of course, be inconvenient with respect to further driving, but can be strived for as safety solution.

A "calibration spring" 046 can be provided or be present, for example, in order to enable comparison of a known or stored spring characteristic (or at least one value) with the motor torque determined (e.g., from the current) in a non-braking condition, and/or to enable comparison of different values determined during movement, and to enable more accurate control of the brake and/or better detection of incipient contact of the brake lining with the disc. This calibration spring 046 can not only act in a braking action, in an air gap or also in an actuator movement which does not cause any significant lining movement, but also in several such areas or subject matter, also with different action and task. A spring which fulfills at least one other function can also be utilized for calibration purposes. How the motor torque is represented here is arbitrary, as it can also be as a "force", current or without unit in this case, advantageously this calibration will capture and consider, however, the momentary friction in the drive unit. A spring for air gap generation 07 can help in a known way in order to press friction linings and brake linings apart in the unbraked status i.e. away from the braking effect. The spring for air gap generation 07 can also be related to the motor torque for calibration purposes. The spring behavior can also be included in the determination of the mechanical losses, also in connection with air gap, touch point and the course of the non-linearities. The calibration spring can be utilized, for example, in a motor area with no or very low lining stroke, and from lining stroke onwards, the additionally acting loose spring can also be utilized for calibration purposes. This calibration can also be seen as a determination of a deviation, also as a comparison (also including the course of non-linearities and characteristics of the springs) with something measured, but also as an instruction (what to do to become better or to achieve something), whereby here at least one value is worked out, which explains deviations in such a way that they can be compensated for.

FIG. 29 represents a drum brake application. The spreading part 051 represented above therefore presses on the two brake shoes 067, which execute a rotational movement around their brake shoe support 069 and can receive different rotational radii (longer and shorter arrow pointing upwards). Such Simplex-type drum brakes can develop self-reinforcement because the "primary shoe" receives a driving force component around the pivot point and the "secondary shoe" receives a component which can weaken the contact pressure slightly. For this, however, the spreading force must still permit a slight displacement (which can also be provided here, indicated by the horizontal arrow) in order to follow the differently pressed shoes.

Often, however, in mechanically operated drum brakes, the spreading parts 051 are rotatably mounted with little play in order to absorb a lever force (e.g. from cable pull). Therefore, it is proposed here that in such a case, if necessary, that the two partial strokes from the two (upper, lower) rotated contact surfaces 0591 can be designed by different positioning of the rotated contact surfaces 0591 (roll-off cylinders) as relative to the spreading part pivot point 057 in such a way that the resulting press-on force sequence is similar to that of a displacement with self-enforcement. Furthermore, the diameter of the rolling cylinder and its position as relative to the pivot point are advantageously designed in such a way that the contact point on the shoe will follow the combination of the circular motion of the shoe and any deformations and/or geometric changes with as little relative error as possible. Also the different leverage ratio (e.g. to the imaginary center of the lining support on the drum), which is due to the different radii (longer and shorter arrow pointing upwards), can be taken into account in the position of the rolling cylinders. In contrast to the disc brake from FIG. 28, in this case, for example, the parking brake position 0471 can also be selected in the reverse direction of rotation of the non-linearity 03 (with, for example, cam rotation axis 034) to the service brake (which would, of course, also be possible with the disc brake of FIG. 28), whereby the parking brake position 0471 can be retained as kept self-sustaining by, for example, a special geometry or spring action, even in the absence of current. Of course one could execute the spreading part 051 with the drive unit of this drum brake similarly to the disk brake of FIG. 28 as there are many possible combinations. At the end of the parking brake position (or also e.g. service brake position), a wear readjustment can also be executed (also specifically targeted when necessary) or e.g. stored in a spring for wear readjustment 021 and thereby executed when the brake is released. In the case of the non-linearity 03, there can be a particular region and/or area in which an initial position of the non-linearities without pad stroke 111 can be found, for example, by detecting an increasing motor torque in each of the two directions of rotation.

In order to find the initial position of the non-linearities 03, for example, an end stop or a spring can also be approached, i.e. also the calibration spring 046 which has been mentioned, which can have the particular advantage that it can be approached, for example, before the first real braking and can be utilized, for example, in an actuator rotation range which can have special characteristics such as e.g. no significant lining stroke or e.g. in a direction of rotation or rotation range not used for normal brake actuation (which would require a different installation e.g. acting on the non-linearities). For example, before the initial braking, a calibration can therefore be implemented in order to determine which values are measurable on the actuator (e.g. current, power, energy etc.) and correspond to which spring action and this also, for example, via the (possibly also extrapolatable) calibration spring characteristic 049 or points thereof. The instantaneous, occurring unwanted mechanical losses can also therefore be detected with this action. A distinction can also be made as to whether only "idling losses" occur as long as no significant lining movement is associated with the actuator movement, and a spring is not yet acting, and from when the spring action is detected for this purpose. In this way, it can be concluded very precisely when the lining press-on force begins to increase during braking for which, of course, the instantaneous non-linear transference between the value, which is measurable on the actuator and the lining press-on force, must also be taken into account.

The drum brake from FIG. 29 has the advantage that it can lift the linings off the drum by means of e.g. loose springs. A spreading part, which is mounted for rotation with little play or tolerance, cannot therefore make compensating movements in order to compensate for different lining thicknesses with different starting points. In this case, it is proposed that either slight elastic movement can provide compensation and more uniform contact or, on the other hand, that the linings can be compensated for by defined movement in such a way that they will contact each other in a similar manner. This can be supported in particular by precisely manufactured, produced or deliberately adjusted linings and also by the selection for the suitable contact geometry (as proposed before above).

FIG. 30 represents a possible recommendable procedure, with regard to a calibration spring 046, and/or a (also conditionally) resilient effect which can be utilized for the same purpose (advantageous e.g. also in a range from little to essentially no lining stroke, thereby e.g. also in an actuator rotation direction which is not utilized for normal operation and/or service braking or other braking, therefore e.g. a range 082 which is not used for braking): From an initial position, e.g. the axis intersection in FIG. 30 with increase of actuator speed which is still without spring effect, holding of speed still without spring effect (which can be seen e.g. as running with covered losses without other energy supply), tensioning of spring with calibration spring characteristic 049 from (e.g. essentially) the mass inertia capacity of the rotation, determination of the "braking distance" until the spring brings the rotation to a stop, acceleration by the spring (now e.g. against the above direction of rotation), whereby this acceleration can e.g. also run with defined motor current (therefore e.g. also advantageously zero), approaching a point, from which then a normal operating or other braking is started in an area or range 082, which is utilized for braking, e.g. the axis intersection point in FIG. 30. This procedure could be executed in a short time, e.g. when switching on the brake, and already provides a very comprehensive image before the initial braking operation and brings the brake into a defined status for the following braking operation(s): One can see electrical and mechanical losses during acceleration, also until the spring is reached, then during tensioning of the spring, tensioning e.g. without (or with defined, e.g. loss-covering) electrical energy can make the mechanical losses visible, before reversal of direction of rotation a measurement can show what is necessary (e.g. current, torque etc.) in order to retain the spring tension at standstill, during the following acceleration after reversal of direction of rotation e.g. the mechanical effect of spring force against mass inertia can be seen, after acceleration e.g. a "coasting phase" (e.g. without additional electrical energy supply or e.g. with defined) and could show the use of the rotational energy to overcome the mechanical losses. The initial losses 016 in the area or range of 082, which are not utilized for braking can be seen as "no-load losses", after the calibration spring characteristic 049, the losses 016 are possibly higher. When the direction of rotation is reversed, in principle they appear as doubled (double arrows 016 on the left), because they appear first in one direction and, after reversal, then in the other.

The same also applies to the losses 016 on the right, which are usually even higher than 016 on the left due to the lining press-on force. This is not bound exactly to this procedure.

It is recommended (but not obligatory) to place the spring in a position for the transference, where the actuation of the spring is greater than in the stroke of the lining because, then with a smaller spring force, the aforementioned procedure will be closer to the range of normal braking or a smaller spring can be utilized. In the aforementioned procedure, a lot of measurements can be made, although this is not mandatory, one can also measure e.g. only the total energy consumption over the whole procedure and since, without loss, no energy would have been necessary, then conclude from the energy on the loss status. How exactly the procedure functions, whether only parts of the procedure will take place or will be utilized and what is measured when and how, is therefore freely configurable, as well as which areas 081 and 082 are used or unused, it is essential that the procedure can be used for calibration (e.g. when switching on, but also otherwise). It can also be seen, for example, in the area 081 which is utilized for braking, that due to e.g. too large an air gap, the actuator torque increases later, which therefore results in the dashed curve 081. It can also make any measured values recognizable, e.g. also the measurable status on the actuator which is to be expected for a certain press-on force (braking effect). Generally speaking, the aforementioned procedure is the conversion of one form of energy into another (e.g. electrical into mechanical and/or e.g. kinetic into potential such as spring tension, mechanical into electrical). Of course, the method can be applied to this energy conversion in general and is not limited to named components such as "calibration spring". A physically equivalent procedure (and/or partial procedure) therefore occurs, for example, when the actuated brake (which acts as a spring) accelerates the motor and/or decelerates an actuating movement as braked during releasing, for which purpose it is possible for one to run the acceleration or deceleration with zero motor current, for example, in order to essentially detect the mechanical losses. The clamping force (or the resulting torque) in the brake (and possibly other forces, e.g. from springs) therefore acts as an acceleration force or deceleration force. When this is stored (e.g.

as a characteristic curve), then the actual status of the brake could deviate from the stored one and, when the clamping force is measured or estimated (e.g. from current), then the measurement has tolerances. In the case of a brake where the actuator movement and lining movement are linked by a stable transference ratio, the actuator torque would vary greatly with the contact pressure position, which can of course still be an application case for the energy method which has been described here. However, it is recommended to utilize a so-called non-linear EMB, because the actuator torque does not vary as much over the actuation as with a linear EMB, and therefore the accelerating torque and/or braking torque is better known in case of deviations than with a linear EMB, or does not contain such strong deviations.

A motor regulator (e.g. for BLDC, e.g. FOC) possesses much of the information which is needed here, e.g. position, speed, rpm, torque (e.g. from torque-generating current) or can be supplemented with additional information such as e.g. mass inertia, the expected clamping force from the brake (or that which can be assumed and/or determined from measurements). It is therefore recommended to obtain the explanations regarding FIG. 30, also in direct collaboration with the motor regulator and/or with the information available here for the searched parameters (e.g. losses), which of course does not have to be permanent, rather e.g. can take place also case by case. The application of the aforementioned energy conversion or the torque total is, of course, also recommended for this.

Figure 31A:
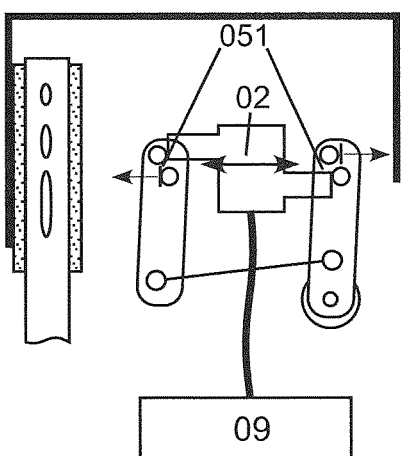
FIGS. 31A-31B illustrate exemplary components of the brake device according to embodiments of the present invention.
Figure 31B:
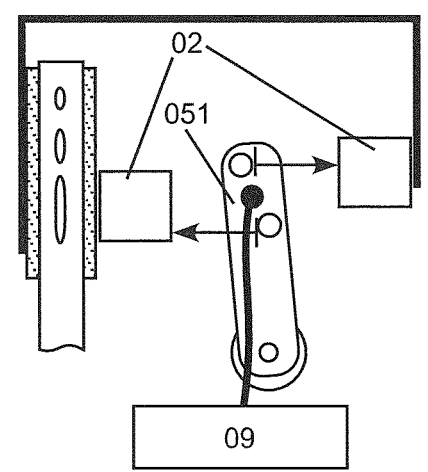

FIGS. 31A-31B represent the proposals for symmetrical actuation of both linings in disc brakes, similar to drum brakes (e.g. as in FIG. 29): In the case of electromechanically actuated disc brakes, a spring can press the linings apart again when the brakes are not applied, but the lifting process of both linings (as in the case of drum brakes, for example) will not be executed among other things. Therefore, on the one hand, it is hereby proposed that a lift-off procedure be executed out quite analogously to drum brakes, also in the case of a disc brake with, for example, two springs located against a fixed part (e.g. wheel bearing part) and that the disc brake be operated as symmetrically as the above drum brake and the wear be adjusted symmetrically (symmetrical wear adjustment 02 in FIG. 31A), or, for simplification, a one-sided behavior (as shown below) will be utilized. In the case of drum brakes, for example, a wear adjuster can move apart at the lower pivot point of the linings in a similar way to a cable tensioner with left-hand and right-hand threads when the center section is rotated. This point does not exist in the disc brake. It is therefore proposed to utilize, for example, a double-acting wear adjuster (02 in FIG. 31A) with two spreading parts 051 symmetrically from a fixed part 09 (analogous to the drum brake, e.g. wheel bearing part) or, as in FIG. 31B, a double-sided spreading part 051 with two wear adjusters 02.

The wear readjustment function 02 FIG. 31A or the spreading part in 051 FIG. 31B can be connected more or less elastically (or in such a way that a compensating movement is possible) with a fixed part 09 (indicated by the curved connection from 09 upwards), whereby with more elasticity, an improved compensation against possible asymmetries (both contact forces or in geometries or wear) can be executed but, with more rigid fastening asymmetries, are "run off" faster, e.g. the linings wear down faster so that better symmetry is achieved. In FIG. 31A, one can see that the spreading parts 051 will probably preferably be actuated together (could also be of different strength), in FIG. 31B, one will see that the two wear adjusters 02 will probably preferably be adjusted together (could also be of different strength). The aforementioned point has the disadvantage that, on all parts (spreading part, wear adjusters), the full clamping force lies, also on the doubly existing parts.

Figure 32A:
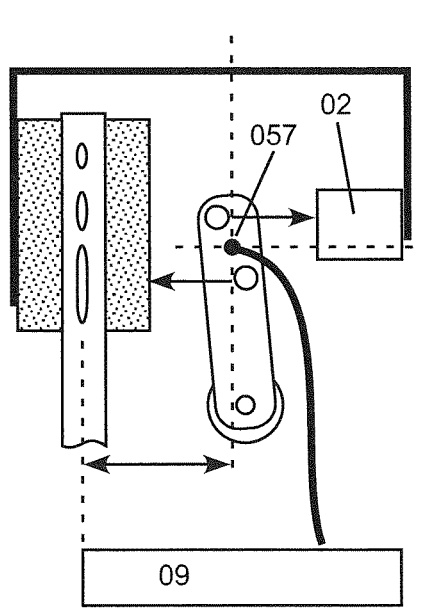
FIGS. 32A-32B illustrate exemplary components of the brake device according to embodiments of the present invention.
Figure 32B:
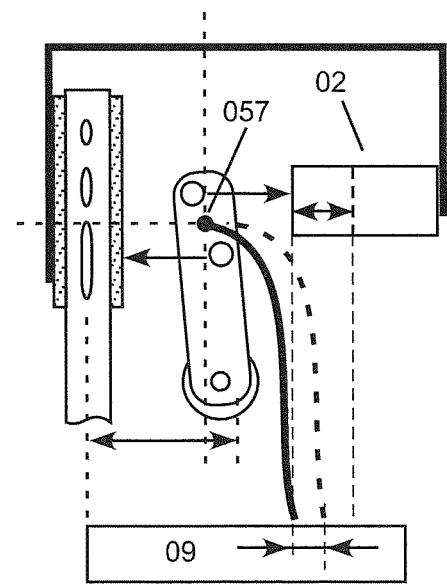

In FIGS. 32A-32B, it is therefore proposed that the center-related drum brake adjustment can also be achieved in a different way:

In this case, a compensating movement is therefore derived from only one wear adjuster 02, which is utilized in order to compensate for the migration during wear: In FIG. 32A, the arrow from the center of the disc points to the distance of the spreading part pivot point 057 to a reference, e.g. center of the disc (conceivably also e.g. disc surface areas). In FIG. 32B, the arrow points to the unworn initial position like in FIG. 32A, but one can see that the pivot point of the spreading element 057 has moved to the left due to wear, which is thereby visible as an arrow in the "fixed part" 09 in FIG. 32B. Exactly this offset can be generated by the wear adjuster in FIG. 32B (arrow in 02). For this purpose, the wear adjuster can possess e.g. two threads: one which carries the full clamping force with a larger pitch and a second one with e.g. half the pitch, which only has to carry the load of the center guide (the lever pivot point). How the necessary "displacement of the pivot point of the spreading part 057 against the fixed" is to be implemented, remains optional in this case, therefore all suitable means can be utilized which cause the displacement. The above applies again with regard to the elastic guidance of the fulcrum of the lever and the geometries of movement. There are many possibilities available (which are not explicitly shown here) in order to generate this partial movement (e.g. half of the wear adjustment), e.g. with lever reduction. It is also possible for one to propose many possibilities for achieving a basic setting on which the partial movement is then based: e.g. precise manufacturing and/or production in conjunction with lining wear (which compensates for residual inaccuracies), adjustability (e.g. by means of an adjusting screw), possibility of heavy-duty displacement, with which an initial status will be established when the brake is applied forcefully etc. It is also possible to make the basic adjustment only during manufacture and then utilize accurate brake linings, where it is not difficult, for example, to grind the linings together with the carrier plate during manufacture to an accurate thickness, for example, at least to the same thickness in pairs.

In FIG. 33A, for example, the possibility is shown that an adjustment with a clamping screw (indicated going through the fixed part 09) is possible, which e.g. can be adjusted ex works or at lining exchange for correct air gap on both sides or e.g. when the brake seeks a correct position by clamping.

In FIG. 33B, it is represented that there is no need for an operation (e.g. a clamping), rather that the adjustment can also be implemented automatically (e.g. when the brake is applied) by sufficient friction (here e.g. by press-on spring force in the fixed part 09, which presses the black part upwards). It is proposed in this case that this "self-acting" must, of course, take place not only at defined starts (e.g. lining exchange), but also of course more often or at each brake actuation. The aforementioned "shifting of the lever pivot point towards fixed" can also therefore be combined with the adjustment option and, for example, an additional device for "shifting of the lever pivot point towards fixed" becomes unnecessary or is combined with the automatic readjustment option (e.g. pressure spring) and only one adjustment (e.g. pressure spring) which does not require any operation thereby remains with a comparable effect. This can, of course, be applied to many brakes, e.g. drum brakes, where this possibility can also be between the brake shoes, or at the non-actuated end of the brake shoes, or floating calliper brakes. The large upper dot located in FIGS. 33A-33B simply generalizes a part of the brake which is adjusted by the self-tuning or non-self-tuning.

In FIG. 34, it is represented that the transference ratio of the spreading part should be defined and not be subject to unexpected alterations, as expressed by the dashed curve of a desired transference ratio with linear stroke on the x-axis over the angle on the y-axis. The actual contact point of the rotated contact surface 0591 on a non-rotated contact surface 0592 should therefore always be well defined, which can be achieved e.g. with exactly finish-capable round parts (e.g. cylindrical pins), but only worse, if roundings are caused e.g. by chamfering. On the left in FIG. 34, it is represented that a rolling circle, which is rotating around the spreading part pivot 057, provides such a defined relationship between angle and linear stroke for an e.g. circular contact pressure movement. When, however, no circle rolls off, rather something else occurs, such as e.g. the represented stairs, which could have been created e.g. by chamfering, a distortion is superimposed on the relationship between angle and travel. This disruption, of course, influences the press-on force, because the force transference ratio is disturbed (by lever length alteration) and the contact pressure resulting from the contact pressure path and the elasticity, because the contact pressure path is disturbed (by lever length alteration). Controlling the brake is therefore disturbed. For this reason, it is proposed here to utilize well, accurately and inexpensively manufacturable rolling parts such as, for example, cylindrical pins or parts for this purpose, which naturally provide geometric specifications due to their load-compliant dimensioning. This geometrical specification can be deliberately accepted here, even when a minimum of lateral compensation movement is not thereby achieved. The proportion of the disturbance will, of course, depend on the measure of the geometric inaccuracy to the total stroke of the contact pressure movement. Therefore, for example, in the case of with a short stroke, a geometry as precise as possible (e.g. circular shape) by e.g. ground cylinders can be advantageous, but with a longer stroke, e.g. a forged, pressed, cast etc. contour can be sufficient for this purpose.

In an embodiment which is not represented in this current example, the braking device comprises an actuator 04, in particular an electric actuator 04, a transmission unit 045, a brake lining 063 and a friction surface.

The actuator 04 moves within a limited actuator operating range. In at least a part of its actuator operating range, the actuator 04 rotates the spreading device about at least one pivot point via the transmission unit.

According to this current embodiment, the actuator 04 presses the brake lining 063 in the direction of, and against the friction surface for braking, at least in one part of its actuator operation area via the spreading device for generating a press-on force as well as therefore for a resulting braking torque.

Furthermore, the transmission unit indicates a non-linearity 03, which is not constant over at least a portion of the actuator operating range and rotates the spreading device in accordance with the non-linearity.

The invention is not hereby limited to the embodiments which are represented, rather it only comprises the braking device and any machine according to the following patent claims.

The invention claimed is:

1. A braking device comprising:
an actuator;
a transmission unit;
a spreading device;
a wear readjustment device arranged between the transmission unit and the spreading device;
a brake lining; and
a friction surface, wherein:
the actuator moves in a limited actuator operating range;
the actuator, in a minimum of part of its actuator operating range, rotates the spreading device about at least one pivot point via the transmission unit;
the actuator presses the brake lining in the direction of the friction surface via the spreading device for generating a contact force as well as a braking torque;
the transmission unit has a non-linear transmission ratio that is not constant over at least part of the actuator operating range;
the transmission unit rotates the spreading device according to the non-linear transmission ratio; and
wherein the wear readjustment device is actuated by one of the actuator, the transmission unit, and the spreading device.

2. The braking device according to claim 1, wherein:
the spreading device is at least partially enclosed by the braking device.

3. The braking device according to claim 1, wherein
in at least one part of the actuator operation range, the spreading device executes a relative movement with respect to the transmission unit, wherein:
the relative movement of the spreading device is executed essentially as substantially normal to the direction of rotation of the spreading device.

4. The braking device according to claim 1, wherein:
the spreading device has at least one contact surface,
the brake device comprises at least one abutment surface;
a minimum of at least one contact surface presses against at least one abutment surface area in at least one portion of the actuator operation area, thereby causing the spreading device to move; and
the contact surface and the abutment surface area are designed in such a way that these surface areas perform a relative movement with respect to one another.

5. The braking device according to claim 1, wherein:
the actuator, in at least one part of the actuator operation range, rotates the spreading device via the transmission unit with an initial rotation point; and
the actuator, in at least one part of the actuator operation range, rotates the spreading device via the transmission unit with an additional rotation point; and
the position of the initial rotation point and the additional rotation point deviate from one another; and
the braking device is designed in such a way that the rotation point displacement of at least one of the initial rotation point and the additional rotation point of the spreading device is opposed by an elastic resistance.

6. The braking device according to claim 4, wherein:
the spreading device comprises at least two spreading device parts and at least one spreading device part is one of a pin, a spigot, and a prefabricated part;
the minimum of at least one contact surface of the spreading device is arranged at least partially on at least one of the at least two spreading device parts; and
the at least two spreading device parts are connected to one another.

7. Braking device according to claim 1, wherein:
the spreading device is designed as non-linear; and
the spreading device is rotated by the actuator via the transmission unit in a limited range of rotation, whereby the spreading device has a non-linear spreading device ratio that is not constant over at least part of the range of rotation.

8. The braking device according to claim 1, wherein:

the transmission ratio for the transmission unit is selected in such a way that the actuator is operated in at least one partial range of its actuator operating range at an operating point that deviates from an optimal operating point of the actuator; and the actuator is operated in at least one partial range of its actuator operating range at an operating point that deviates from an operating point of maximum power of the actuator.

9. The braking device according to claim 1, wherein:

the transmission unit, starting from an initial position converts a movement of the actuator to a second direction for adjusting an air gap.

10. The braking device according to claim 1, wherein:

the wear readjustment device comprises a drive unit.

11. The braking device according to claim 1, wherein:

the braking device only comprises one actuator for braking and for wear readjustment.

12. The braking device according to claim 1, wherein:

the actuator comprises numerous parts;

the actuator comprises a spring and an electric motor, whereby the spring and the electric motor are independent of each other; and the spring interacts with the electric motor via the transmission unit.

13. The braking device according to claim 1, wherein:

the transmission unit comprises a cam.

14. The braking device according to claim 1, wherein:

the transmission ratio for the transmission unit when active can be altered by rotating a ratchet.

15. The braking device according to claim 1, wherein:

the transmission unit is designed in such a way that at least two partial sections with differently acting non-linearities are formed along the actuator operating range and that at least one non-linearity is selected from the following non-linearities:

a. Non-linearities for overcoming an air gap between brake lining and friction surface, b. non-linearity for determining the contact point of the friction surface and the brake lining, c. non-linearity for achieving a minimum braking effect, d. non-linearity for generating an increasing braking torque, e. non-linearity for operation with lowered electrical power requirement, f. non-linearity for rapidly achieving high braking effects, g. non-linearity for measuring parameters and setting parameters, h. non-linearity for reducing electrical stresses and mechanical stresses during lining stroke start, i. non-linearity for compensation for brake fading, j. non-linearities for wear readjustment.

* * * * *